US012343691B2

(12) United States Patent
Kerton

(10) Patent No.: US 12,343,691 B2
(45) Date of Patent: Jul. 1, 2025

(54) VENTURI DEVICE WITH FORCED INDUCTION SYSTEMS AND METHODS

(71) Applicant: Zero Nox, Inc., Porterville, CA (US)

(72) Inventor: James Matthew Kerton, Duncan (CA)

(73) Assignee: Zero Nox, Inc., Porterville, CA (US)

( * ) Notice: Subject to any disclaimer, the term of this patent is extended or adjusted under 35 U.S.C. 154(b) by 0 days.

(21) Appl. No.: 18/712,643

(22) PCT Filed: Nov. 22, 2022

(86) PCT No.: PCT/US2022/050797
§ 371 (c)(1),
(2) Date: May 22, 2024

(87) PCT Pub. No.: WO2023/096938
PCT Pub. Date: Jun. 1, 2023

(65) Prior Publication Data

US 2024/0350989 A1 Oct. 24, 2024

Related U.S. Application Data

(63) Continuation-in-part of application No. PCT/US2022/026399, filed on Apr. 26, 2022.
(Continued)

(51) Int. Cl.
*B01F 25/312* (2022.01)
*B01F 23/2326* (2022.01)

(52) U.S. Cl.
CPC ...... *B01F 25/3124* (2022.01); *B01F 23/2326* (2022.01)

(58) Field of Classification Search
CPC ................ B01F 25/312; B01F 25/3124; B01F 25/3131; B01F 25/31232; B01F 25/31233
See application file for complete search history.

(56) References Cited

U.S. PATENT DOCUMENTS

| | | | | |
|---|---|---|---|---|
| 1,626,487 A * | 4/1927 | Warren | ................. | B01F 25/311 366/178.2 |
| 2,396,290 A * | 3/1946 | Schwarz | ................. | F04F 5/467 417/170 |

(Continued)

FOREIGN PATENT DOCUMENTS

| | | |
|---|---|---|
| CN | 106532178 B | 5/2019 |
| CN | 114243848 | 3/2022 |

(Continued)

OTHER PUBLICATIONS

International Preliminary Report on Patentability and Written Opinion, dated Oct. 24, 2023; in International Application No. PCT/US2022/026399, filed Apr. 26, 2022; in 12 pages.

(Continued)

*Primary Examiner* — Elizabeth Insler
(74) *Attorney, Agent, or Firm* — Knobbe, Martens, Olson & Bear, LLP

(57) ABSTRACT

A Venturi device with a primary flow path and a secondary flow path introduced into the primary flow path, wherein a flow of one or more flowable mediums in the primary flow path and the secondary flow path creates a vortex generating a suction at an inlet of the Venturi device. A particulate burner system can be used to combust fuel emission byproducts by injecting fuel and air into a housing having a bottom plate with a round bottom opening for burners to inject fuel into a combustion chamber and a top plate with a round top opening for exhausting fuel emissions. A thruster system can be used to propel munition for deep earth penetration by using a thruster system having a transfer cone connected to a munition body.

26 Claims, 27 Drawing Sheets

Related U.S. Application Data

(60) Provisional application No. 63/282,556, filed on Nov. 23, 2021, provisional application No. 63/265,478, filed on Dec. 15, 2021, provisional application No. 63/265,483, filed on Dec. 15, 2021, provisional application No. 63/265,484, filed on Dec. 15, 2021, provisional application No. 63/265,486, filed on Dec. 15, 2021, provisional application No. 63/265,489, filed on Dec. 15, 2021, provisional application No. 63/268,053, filed on Feb. 15, 2022, provisional application No. 63/381,905, filed on Nov. 1, 2022, provisional application No. 63/381,906, filed on Nov. 1, 2022.

(56) References Cited

U.S. PATENT DOCUMENTS

| | | | |
|---|---|---|---|
| 4,443,707 | A | 4/1984 | Scieri et al. |
| 6,267,106 | B1 | 7/2001 | Feucht |
| 6,886,545 | B1 | 5/2005 | Holm |
| 8,664,781 | B2 | 3/2014 | Alvi |
| 8,807,458 | B2 | 8/2014 | Al-Ansary |
| 9,564,664 | B2 | 2/2017 | Tanigaki et al. |
| 9,567,856 | B2 | 2/2017 | Faller |
| 9,827,872 | B1 | 11/2017 | Sloan et al. |
| 10,625,868 | B2 | 4/2020 | DaSilva et al. |
| 2009/0075160 | A1 | 3/2009 | Tezuka et al. |
| 2009/0183858 | A1 | 7/2009 | Williams et al. |
| 2010/0276517 | A1 | 11/2010 | Alansary |
| 2014/0292283 | A1 | 10/2014 | Timmons et al. |
| 2016/0319778 | A1 | 11/2016 | Shuto et al. |
| 2017/0373511 | A1 | 12/2017 | Jo |
| 2018/0016017 | A1 | 1/2018 | daSilva et al. |
| 2019/0097434 | A1 | 3/2019 | Kim |
| 2019/0198945 | A1 | 6/2019 | Machida et al. |
| 2019/0288527 | A1 | 9/2019 | Jaensch et al. |
| 2020/0171975 | A1 | 6/2020 | Ueda et al. |
| 2021/0135461 | A1 | 5/2021 | Wang et al. |
| 2021/0206290 | A1 | 7/2021 | Li et al. |
| 2022/0126724 | A1 | 4/2022 | O'Connor et al. |
| 2022/0140620 | A1 | 5/2022 | Kang et al. |
| 2024/0191650 | A1 | 6/2024 | Kerton |

FOREIGN PATENT DOCUMENTS

| | | | |
|---|---|---|---|
| EP | 2 093 475 | A1 | 11/2016 |
| EP | 3037300 | | 12/2019 |
| EP | 3895933 | | 10/2021 |
| GB | 552747 | | 4/1943 |
| GB | 2516612 | | 2/2015 |
| JP | 5760097 | B2 | 6/2015 |
| JP | 5841294 | B2 | 1/2016 |
| JP | 6267375 | B2 | 1/2018 |
| JP | 6325516 | B2 | 4/2018 |
| JP | 6763889 | B2 | 9/2020 |
| JP | 2021-522440 | A | 8/2021 |
| JP | 7033200 | B2 | 3/2022 |
| WO | WO 2008/136641 | | 11/2008 |
| WO | WO 2012/071632 | | 6/2012 |
| WO | WO 2012/100149 | | 7/2012 |
| WO | WO 2013/142469 | | 9/2013 |
| WO | WO 2014/031996 | | 2/2014 |
| WO | WO 2016/205057 | | 12/2016 |
| WO | WO 2019/079531 | | 4/2019 |
| WO | WO 2019/209542 | | 10/2019 |
| WO | WO 2022/026399 | | 11/2022 |
| WO | WO 2022/232182 | | 11/2022 |
| WO | WO 2023/096938 | | 6/2023 |
| WO | WO 2023/114873 | | 6/2023 |
| WO | WO 2023/114879 | | 6/2023 |
| WO | WO 2023/215526 | | 11/2023 |

OTHER PUBLICATIONS

International Search Report/Written Opinion dated Aug. 11, 2022; in International Application No. PCT/US2022/026399, filed Apr. 26, 2022; in 15 pages.

International Search Report and Written Opinion, re PCT Application No. PCT/US2022/050797, mailed Mar. 28, 2023.

International Search Report and Written Opinion, re PCT Application No. PCT/US/2022/081602, mailed Apr. 3, 2023.

International Search Report and Written Opinion, re PCT Application No. PCT/US2022/081594, mailed Apr. 5, 2023.

International Search Report and Written Opinion, re PCT Application No. PCT/US2023/021077, mailed Jul. 31, 2023.

* cited by examiner

VENTURI DEVICE WITH FORCED INDUCTION SYSTEMS AND METHODS

INCORPORATION BY REFERENCE

This application claims priority to U.S. Provisional Application No. 63/282,556, filed Nov. 23, 2021, entitled "PARTICULATE BURNER," U.S. Provisional Application No. 63/265,478, filed Dec. 15, 2021, entitled "VENTURI THERMAL ENERGY CONVERSION SYSTEM," U.S. Provisional Application No. 63/265,483, filed Dec. 15, 2021, entitled "NPR HYDRO TURBINE SYSTEM," U.S. Provisional Application No. 63/265,489, filed Dec. 15, 2021, entitled "PHASE SHIFTING THERMAL ENERGY CONVERSION SYSTEM," U.S. Provisional Application No. 63/265,484, filed Dec. 15, 2021, entitled "NPR MOTOR COOLING SYSTEM," U.S. Provisional Application No. 63/265,486, filed Dec. 15, 2021, entitled "NPR FORCED INDUCTION CHARGING AND HEATING SYSTEM," U.S. Provisional Application No. 63/268,053, filed Feb. 15, 2022, entitled "STEALTH ORDNANCE THRUSTER," U.S. Provisional Application No. 63/381,905, filed Nov. 1, 2022, entitled "VENTURI DEVICE WITH FORCED INDUCTION," U.S. Provisional Application No. 63/381,906, filed Nov. 1, 2022, entitled "VENTURI DEVICE WITH FORCED INDUCTION," and International Patent Application No. PCT/US2022/026399, filed Apr. 26, 2022, entitled "VENTURI DEVICE WITH FORCED INDUCTION," which claims priority to International Patent Application No. PCT/IB2021/000237, filed Apr. 27, 2021, entitled "HYBRID HYDRO-AERODYNAMIC FORCED INDUCTION SYSTEM," each of which is hereby incorporated by reference in its entirety and made part of this disclosure. Related German Application Nos. DE 102019003025.7, filed Apr. 26, 2019, and DE 102019006055.5, filed Sep. 4, 2019, are hereby incorporated by reference in their entireties and made part of this disclosure. Any and all applications for which a foreign or domestic priority claim is identified in the Application Data Sheet as filed with the present application are hereby incorporated by reference under 37 CFR 1.57.

FIELD

This disclosure relates to Venturi devices and applications thereof.

BACKGROUND

The demand for cleaner emissions and fluid mechanic drives has increased dramatically over the past century. Accordingly, a way to release cleaner emissions and fluid mechanic drives is needed.

SUMMARY

Neither the preceding summary nor the following detailed description purports to limit or define the scope of protection. The scope of protection is defined by the claims.

A Venturi device can receive a primary flow of air that is ejected through an outlet. The fluid flows through the Venturi device and passes through a converging portion and a diverging portion where a Venturi effect is produced, pulling the pulling the primary flow through the inlet of the venturi device. A first funnel can form of an annular space between the funnel and the body that creates a that creates a low-pressure area relative to the high-pressure fluid flow. The reduction in pressure can cause the low pressure in the annular space to flow towards the outlet. A second funnel can be located in the diverging portion and also extending from the body to create a second low pressure area relative the high-pressure fluid would flow. The reduction in pressure can cause the fluid in the low-pressure area to flow towards the outlet. A secondary input can be located between the converging portion and the outlet to direct a secondary flow fluid into the primary flow and create a vortex that pulls the primary flow through the inlet. A conical surface can be included in downstream of the secondary input that can direct the primary flow towards the outlet and which also has a cross sectional flow area that increases in size towards the outlet.

A particulate burner system can be used to combust fuel emission byproducts by injecting fuel and air into a housing having a bottom plate with a round bottom opening for burners to inject fuel into a combustion chamber and a top plate with a round top opening for exhausting fuel emissions. The round bottom opening and the top opening can be aligned along a central axis. A side wall can be positioned between the bottom plate and the top plate and include an opening for directing air tangentially into the combustion chamber. The air can be centrifugally directed along an inner periphery of sound wall and entrained fuel from the round bottom opening into the air flow. A deflection plate can be positioned in the combustion chamber and connected to at least one of the bottom plate or the top plate and located between the round bottom opening and the sidewall opening. The deflection plate can mitigate a flow of fuel from the round bottom open to the side wall as well as air from the sidewall to the round bottom opening. A plurality of fence can be included in the combustion chamber to direct the air flow along an inner periphery of the round sidewall and entrail fuel towards the inner periphery too. A Venturi device can be connected to the sidewall opening to inject compressed air into the combustion chamber.

A thruster system can be used to propel munition for deep earth penetration by using a thruster system having a transfer cone connected to a munition body. The transfer cone can direct a flow of fluid from the munition body to an inlet of a Venturi device. A storage tank can be located in the munition body to store a propellant that is injected into inlets attached to the Venturi device. Stabilizer fins can radially extend outward of the ammunition body and include one or more channels to connect the storage tank to the Venturi device. Movement of the primary flow through the convergence and divergence portions of the Venturia device can produce a Venturia effect. A secondary input can be located between the convergence portion and the outlet which directs a flow of fluid into the primary flow to create a vortex that creates a suction at the inlet to pull the primary flow into the inlet. The secondary input can be connected to the one or more channels in the stabilizers which can be used to provide thrust.

BRIEF DESCRIPTION OF THE DRAWINGS

The above mentioned and other features of the configurations disclosed herein are described below with reference to the drawings of the configurations. The illustrated configurations are intended to illustrate, but not to limit, the scope of protection. Various features of the different disclosed configurations can be combined to form further configurations, which are part of this disclosure. In the drawings, similar elements may have reference numerals with the same last two digits.

DETAILED DESCRIPTION

Figure 1A:
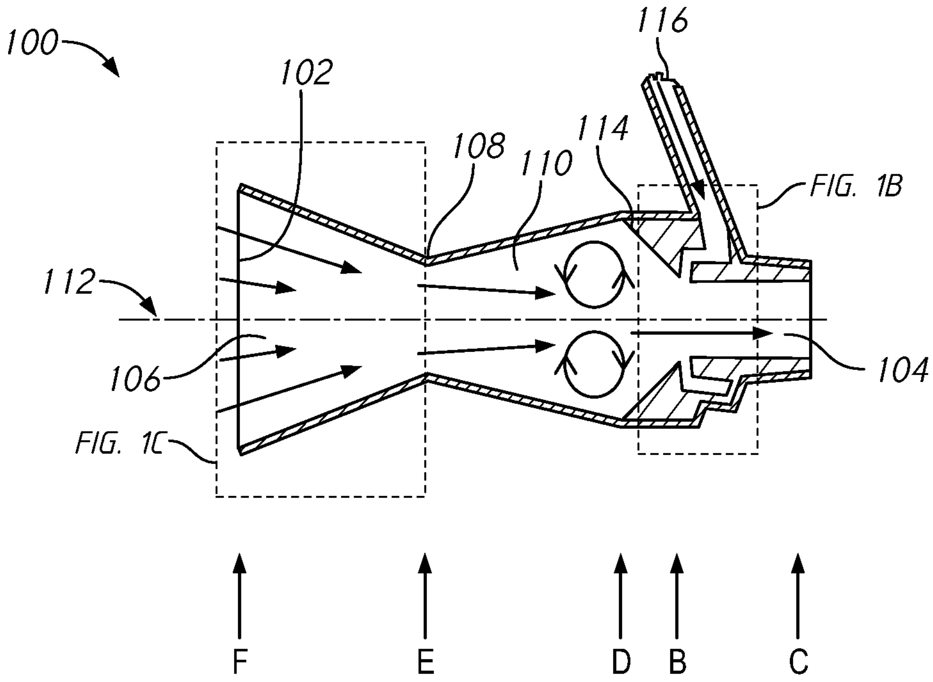
FIG. 1A illustrates a section view of an example Venturi device.
Figure 1B:
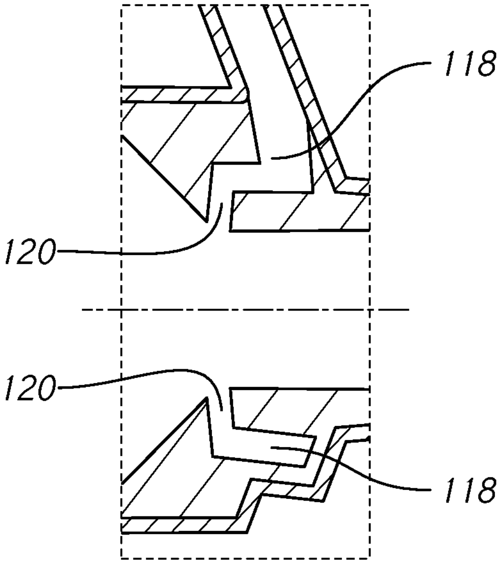
FIGS. 1B-1C illustrate an enlarged view of a portion of the Venturi device of FIG. 1A.

Although certain configurations and examples are described below, this disclosure extends beyond the specifically disclosed configurations and/or uses and obvious modifications and equivalents thereof. Thus, it is intended that the scope of this disclosure should not be limited by any particular configurations described below. Furthermore, this disclosure describes many configurations in reference to power generation or reducing emissions of an internal combustion engine but any configurations and modifications or equivalents thereof should not be limited to the foregoing.

According to the 1st Theorem of Thermodynamics, energy can neither be generated nor consumed. It can only be transformed in its form, that is, from one form of energy into another form. For this reason, the total energy in a closed system remains constant.

There are differences in valence between the forms of energy. Thus, as a possible form of energy, heat can never flow without action, which is to say, from a body of lesser temperature to a body of higher temperature, although the total amount of energy stored in the bodies in the form of heat may be equal. In the opposite direction, this is quite possible and inevitable, that is, the transition of heat from the warmer to the colder body takes place spontaneously and automatically (2nd Theorem of Thermodynamics). The heat in the warmer body is thus of higher value than the heat in the colder body. This heat can at least be partially converted into mechanical energy in heat engines, in which this automatic flow of heat from the warmer body to the colder body is exploited. The proportion of the mechanical energy which can be obtained can be shown by way of a ratio of the two temperatures according to the formula below.

$$Anteil_{Mech} = \frac{T_{warm} - T_{cold}}{T_{warm}}$$

This proportion can be referred to as the efficiency of the Carnot process.

As disclosed herein, thermal energy can be converted into mechanical energy by suctioning mechanisms. Described herein are systems and devices for providing energy chargers to a system. For example, Venturi devices are described herein that form one or more flow-induced vortices within a fluid (e.g., air, water, gas, etc.) flowing through the Venturi devices. The one or more vortices can occur at a location within the Venturi device where a secondary fluid flow merges (e.g., mixes, fuses) with a primary fluid flow through the Venturi device. The one or more vortices can form a suction, sucking or pulling the primary flow into the Venturi device through an inlet. In some configurations, the suction, and the Venturi effect, created by the flow of fluid through the Venturi device, can create high pressure charges into a system to maintain a high pressure. In some configurations, a secondary fluid flow can include a compressed fluid to aid in burning particulate matter. In some configurations, a thruster system can be configured to attach to a munition to provide a source of propulsion that has a higher efficiency and less traceability than conventional propulsion system. The thrust system can include a Venturi device to compress and expand a fluid accelerate the munition.

Venturi Device with Forced Induction

FIG. 1A illustrates a section view of an example Venturi device 100, which can also be referred to as a vortex fusion charger or VFC. The Venturi device 100 can, in some configurations, include a rotationally symmetrical inner periphery, which can include rotational symmetry about the central axis 112. The Venturi device 100 can be a tubular structure. The inner periphery of the Venturi device 100 can define primary flow path, which can be an inner region, cavity, lumen, etc., that receives a primary flow of a fluid (e.g., water, gas, air, exhaust gases, etc.). In some configurations, the inner periphery of the Venturi device 100 can be a circular shape. In some variations, the inner periphery may be other shapes, such as an oval, polygon, irregular, and/or others. The inner periphery may define a flow path for the primary flow of the fluid in the direction of the arrows in FIG. 1A. The inner periphery of the Venturi device 100 can define cross-sectional flow areas for the primary flow of fluid, which can be circular. The inner periphery can change such that the cross-sectional flow areas change in size and/or shape along a length of the Venturi device 100. For example, the inner periphery of the Venturi device 100 can include an inner diameter that assumes different sizes along its length or central axis 112.

Figure 1C:
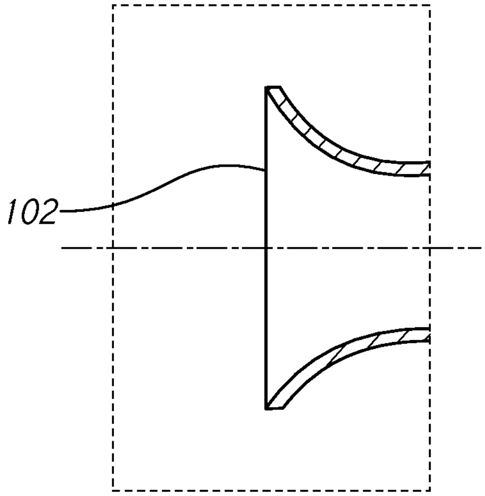

The primary flow of fluid can enter the Venturi device 100 through the inlet 102. The inlet 102 can be connected to a conduit (e.g., tube) that can circulate the primary flow. In some variants, the inlet 102 can be open to the ambient air. An inner periphery of the inlet 102 can be circular. In some variants, the inner periphery of the inlet 102 can be oval, polygonal, irregular, and/or others. The inlet 102 can, as shown in FIG. 1C, include a velocity stack, trumpet shape, and/or air horn shape. The inlet 102 can include an inner periphery that converges. The inlet 102 can include cross-sectional flow area that converges. The inlet 102 can include an inner periphery that decreases in size in the direction of flow of the primary flow. The inlet 102 can include an inner periphery that continuously decreases in size in the direction of flow of the primary flow. The inlet 102 can include cross-sectional flow areas that that decrease in size in the direction of flow of the primary flow. The inlet 102 can include cross-sectional flow areas that continuously decreases in size in the direction of flow of the primary flow. The inlet 102 can include a curved peripheral wall, as shown in FIG. 1C. The inner periphery of the inlet 102 can converge. The inlet 102 can increase the velocity of the primary flow through the inlet 102, decreasing a pressure of the primary flow.

The primary flow of fluid can exit the Venturi device 100 through the outlet 104. The outlet 104 can be disposed on an opposing side of the Venturi device 100 as the inlet 102. The outlet 104 can be connected to a conduit (e.g., tube) that can circulate the primary flow. In some variants, the outlet 104 can be connected to an engine, as described herein, to facilitate supercharging the engine with compressed gases. An inner periphery of the outlet 104 can be circular. In some variants, the inner periphery of the outlet 104 can be oval, polygonal, irregular, and/or others. The inner periphery of the outlet 104 can diverge. A cross-sectional flow area of the outlet 104 can diverge in the direction of flow of the primary flow. The inner periphery of the outlet 104 can increase in size in the direction of flow of the primary flow. The inner periphery of the outlet 104 can continuously increase in size in the direction of flow of the primary flow. The outlet 104 can include cross-sectional flow areas that increase in size in the direction of flow of the primary flow. The outlet 104 can include cross-sectional flow areas that continuously increase in size in the direction of flow of the primary flow. The inner periphery of the outlet 104 can diverge. The outlet 104 can decrease the velocity of the primary flow through the outlet 104, increasing a pressure of the primary flow.

The Venturi device 100 can include a body (e.g., tubular body) between the inlet 102 and the outlet 104. The primary flow path can flow through the body between the inlet 102 and the outlet 104. The body can include a converging portion 106. The converging portion 106 can increase the velocity of the primary fluid flowing through the converging portion 106. The converging portion 106 can decrease the pressure of the primary fluid flowing through the converging portion 106. An inner periphery of the converging portion 106 can be circular. In some variants, the inner periphery of the converging portion 106 can be oval, polygonal, irregular, and/or others. The converging portion 106 can include an inner periphery that converges. The converging portion 106 can include a cross-sectional flow area that converges. The converging portion 106 can include an inner periphery that decreases in size in the direction of flow of the primary flow. The converging portion 106 can include an inner periphery that continuously decreases in size in the direction of flow of the primary flow. The converging portion 106 can include cross-sectional flow areas that that decrease in size in the direction of flow of the primary flow. The converging portion 106 can include cross-sectional flow areas that continuously decreases in size in the direction of flow of the primary flow. The converging portion 106 can include a flow area having the shape of a cone. The cross-sectional flow area of the converging portion 106 can decrease at a consistent rate. A temperature of the primary flow flowing through the converging portion 106 can decrease as a result of the increased velocity and decreased pressure.

The body of the Venturi device 100 can include a throat 108, which can also be referred to as a constriction. The throat 108 can be disposed between the converging portion 106 and a diverging portion 110. The throat 108 can include an inner periphery that is smaller than that of the converging portion 106 and the diverging portion 110. For example, the throat 108 can include a diameter that is smaller than a diameter of the converging portion 106 and the diverging portion 110. The throat 108 can include a cross-sectional flow area that is smaller than that of the converging portion 106 and the diverging portion 110. In some configurations, the throat 108 can be the junction of the converging portion 106 and the diverging portion 110. In some configurations, the throat 108 includes a length. In some configurations, the inner periphery of the throat 108 is an inflection point between the converging portion 106 and the diverging portion 110. In some variants, the converging portion 106 converges to the throat 108 and immediately diverges to the diverging portion 110.

The body of the Venturi device 100 can include a diverging portion 110. The diverging portion 110 can be downstream of the inlet 102 and converging portion 106. The diverging portion 110 can be downstream of the throat 108. The diverging portion 110 can be disposed between the converging portion 106 and the outlet 104, second converging portion 114, and/or secondary input 120. The diverging portion 110 can decrease the velocity of the primary fluid flowing through the diverging portion 110. The diverging portion 110 can increase the pressure of the primary fluid flowing through the diverging portion 110. An inner periphery of the diverging portion 110 can be circular. In some variants, the inner periphery of the diverging portion 110 can be oval, polygonal, irregular, and/or others. The diverging portion 110 can include an inner periphery that diverges. The diverging portion 110 can include a cross-sectional flow area that diverges. The diverging portion 110 can include an inner periphery that increases in size in the direction of flow of the primary flow. The diverging portion 110 can include an inner periphery that continuously increases in size in the direction of flow of the primary flow. The diverging portion 110 can include cross-sectional flow areas that that increase in size in the direction of flow of the primary flow. The diverging portion 110 can include cross-sectional flow areas that continuously increases in size in the direction of flow of the primary flow. The diverging portion 110 can include a flow area having the shape of a cone. The cross-sectional flow area of the diverging portion 110 can decrease at a consistent rate. The diverging portion 110 can be longer than the converging portion 106. The size of the cross-sectional flow area of the converging portion 106 can change more rapidly than the size of the cross-sectional flow area of the diverging portion 110 per a unit of length. The angle of the periphery of the converging portion 106 relative to the central axis 112 and/or direction of flow of the primary flow can be larger than the angle of the periphery of the diverging portion 110 relative to the central axis 112 and/or direction of flow of the primary flow.

The flow of the primary flow through the converging portion 106, throat 108, and/or diverging portion 110 can produce a Venturi effect, which can create a suction at the inlet 102. The flow of the primary flow through the converging portion 106 and throat 108 can produce a Venturi effect, which can create a suction at the inlet 102. The flow of the primary flow through the converging portion 106 can produce a Venturi effect, which can create a suction at the inlet 102. The increase in the velocity and decrease in pressure of the primary flow through the converging portion 106 and/or throat 108 can decrease a temperature of the primary flow such that thermal energy (e.g., heat) from the ambient environment outside the body of the Venturi device 100 is transferred to the primary flow. In some variants, the body of the Venturi device 100 or at least the converging portion 106 and/or throat 108 can include a conductive material (such as a metal) to facilitate efficient transfer of thermal energy through the body.

The body of the Venturi device 100 can include a second converging portion 114. The second converging portion 114 can be downstream of the inlet 102, converging portion 106, throat 108, and diverging portion 110. The second converging portion 114 can be disposed between the diverging portion 110 and the secondary input 120 and the outlet 104. The second converging portion 114 can increase the velocity of the primary flow flowing through the second converging portion 114. The second converging portion 114 can decrease the pressure of the primary fluid flowing through the second converging portion 114. An inner periphery of the second converging portion 114 can be circular. In some variants, the inner periphery of the second converging portion 114 can be oval, polygonal, irregular, and/or others.

The second converging portion 114 can include an inner periphery that converges. The second converging portion 114 can include a cross-sectional flow area that converges. The second converging portion 114 can include an inner periphery that decreases in size in the direction of flow of the primary flow. The second converging portion 114 can include an inner periphery that continuously decreases in size in the direction of flow of the primary flow. The second converging portion 114 can include cross-sectional flow areas that that decrease in size in the direction of flow of the primary flow. The second converging portion 114 can include cross-sectional flow areas that continuously decreases in size in the direction of flow of the primary flow. The second converging portion 114 can include a flow area having the shape of a cone. The cross-sectional flow area of the second converging portion 114, converging portion 106, and/or diverging portion 110 can change at a consistent rate per unit of length. The angle of the periphery of the converging portion 114 relative to the central axis 112 and/or direction of flow of the primary flow can be larger than the angle of the peripheries of the diverging portion 110, converging portion 106, and/or outlet 104 relative to the central axis 112 and/or direction of flow of the primary flow.

A conduit 116, which can also be referred to as a tube, conduit, chamber, lumen, or the like, can circulate a secondary flow of a fluid (e.g., water, gas, air, exhaust gases, etc.) to the Venturi device 100. As described herein, the conduit 116 can recirculate a portion of the primary flow as a secondary flow into the primary flow. The conduit 116 can be connected to an annular chamber 118 of the body of the Venturi device 100 to direct the secondary flow to the annular chamber 118. In some configurations, multiple conduits 116 can connected to the annular chamber 118 at multiple locations to direct the secondary flow into the annular chamber 118.

The body of the Venturi device 100 can include an annular chamber 118. The annular chamber 118 can be ring shaped. In some configurations, the annular chamber 118 can be torus shaped. The annular chamber 118 can encircle the primary flow of fluid. The annular chamber 118 can encircle the central axis 112 of the Venturi device 100. The annular chamber 118 can circumferentially surround the primary flow of fluid. The secondary flow of fluid can spread throughout the annular chamber 118. A surface of the annular chamber 118 can include a Coandă surface or profile that can facilitate the secondary flow of fluid spreading throughout the annular chamber 118. The Coandă effect is the tendency of a fluid to stay attached to a curved surface, particularly a convex surface. A surface of the annular chamber 118 can be convex to facilitate the secondary flow of fluid spreading throughout the annular chamber 118. The secondary flow can adhere (e.g., molecular adhesion) to the surface(s) of the annular chamber 118 to spread throughout the annular chamber 118.

The body of the Venturi device 100 can include a secondary input 120. The secondary input 120 can be disposed downstream of the inlet 102, converging portion 106, throat 108, diverging portion 110, and/or second converging portion 114. The secondary input 120 can be disposed between the converging portion 106, throat 108, diverging portion 110, and/or second converging portion 114 and the outlet 104. The secondary input 120 can include one or more flow paths from the annular chamber 118 into the primary flow and/or inner region and/or primary flow path of the Venturi device 100 through which the primary flow travels. The secondary input 120 can be an annular passageway, one or more apertures, plurality of apertures, one or more slots, annular gap, and/or ring gap.

The secondary input 120 can encircle the primary flow through the body of the Venturi device 100. The secondary input 120 can circumferentially encircle the primary flow through the body. The secondary input 120 can include one or more openings circumferentially distributed about a flow path of the primary flow. The secondary input 120 can define an annular shaped opening in an inner periphery of the body of the Venturi device 100. The secondary input 120 can direct the secondary flow into the primary flow at an angle relative to the direction of flow of the primary flow and/or relative to the central axis 112 of the body of the Venturi device 100. The angle can, in some variants, be ninety degrees. The angle can, in some configurations, be between sixty and one hundred and twenty degrees. The secondary input 120 can direct the secondary flow, at least partially, against the direction of flow of the primary flow. The introduction of the secondary flow by way of the secondary input 120 into the primary flow can create a vortex, swirl(s), one or more vortices, and/or the like in the primary flow. The creation of the vortex can create a suction at the inlet 102 sucking the primary flow into the Venturi device 100 through the inlet 102. The suction of the primary flow into the Venturi device 100 can cause the velocity to increase and pressure to decrease of the primary flow through the converging portion 106 and throat 108, which can cause the temperature of the primary flow through the converging portion 106 and/or throat 108 to decrease such that thermal energy (e.g., heat) from the ambient environment outside the body of the Venturi device 100 is transferred to the primary flow through the body, charging the primary flow with the thermal energy. The temperature and pressure of the primary flow downstream of the throat 108 (e.g., in the diverging portion 110) can increase before exiting through the outlet 104. An opening of the secondary input 120 into the inner region of the body (e.g., the primary flow path) can be smaller than a cross-sectional flow area of an input from the conduit 116 into the annular chamber 118. The secondary input 120 can direct the secondary flow radially inward toward the primary flow of fluid and/or the central axis 112 of the body.

In some configurations, the body can include a check valve. The check valve can facilitate flow of the primary flow from the inlet 102 to the outlet 104 and impede and/or resist the primary flow from flowing out of the body by way of the inlet 102. In some configurations, the check valve can be a one-way check valve. In some configurations, the check valve can be a valvular conduit. In some configurations, the check valve can be a fixed-geometry passive check valve. In some configurations, the check valve can include a main channel and a series of loops oriented to facilitate flow of the secondary flow towards the Venturi device and resist flow away from the Venturi device.

In some configurations, the check valve can be a Tesla valve. In some configurations, the check valve can be disposed in the converging portion 106. In some configurations, the check valve can be disposed between the converging portion 106 and the diverging portion 110. In some configurations, the check valve can be disposed in the diverging portion 110. In some configurations, the check valve can be disposed at the throat 108. In some configurations, the check valve can be disposed between the diverging portion 110 and the second converging portion 114. In some configurations, the check valve can be disposed between the second converging portion 114 and the outlet 104. In some configurations, the check valve can be disposed at the outlet 104. In some configurations, the check valve can be disposed at the inlet 102.

As described herein, the Venturi device 100 can include three openings at the locations 116, 104, and 106. In some variants, these three openings can be open to the environment. The annular chamber 118 can be connected via the annular gap 120 with the inner region (e.g., primary flow path) of the Venturi device 100. The inner region of the body can taper at position E, thus having a smaller inner diameter than at positions F and D. The taper (reduction of the inner diameter) from position F to position E as well as the extension (enlargement of the inner diameter) from position E to position D can be continuous, such as conical. When a secondary flow is introduced into the opening 116, the secondary flow flows into the annular chamber 118 and is distributed radially there in the annular chamber, which can include an entirety of the annular chamber. From the annular chamber 118, the secondary flow flows via the secondary input 120 into the inner region of the body of the Venturi device 100 and generates there a vortex, which generates a suction effect at the inlet 102. As a result, the primary flow is sucked in through the inlet 102 and ejected toward the outlet 104. At position E (e.g., throat or constriction 108), according to the Venturi effect, the flow velocity of the sucked air increases. By combining the effects of the suction and Venturi effect, there can be a reduction in the temperature before the vortex, so that heat from the environment can be absorbed by the primary flow, charging the primary flow with energy from the ambient environment.

In some configurations, a rotationally symmetrical design for the Venturi device 100 may not be used, and no Venturi effect produced. In some configurations, a body may be used that creates a flow-induced formation of a vortex, with a suction on one side of the vortex and an ejection of a flowable medium surrounding the vortex on the other side of the vortex. The flowable medium sucked in during the sucking process can be cooled. The cooled flowable medium sucked in can absorb heat (e.g., thermal energy) from the environment, for example, and thus the internal energy of the flowable medium increases. The guidance of the free-flowing medium via heat exchangers may be used.

Figure 2:
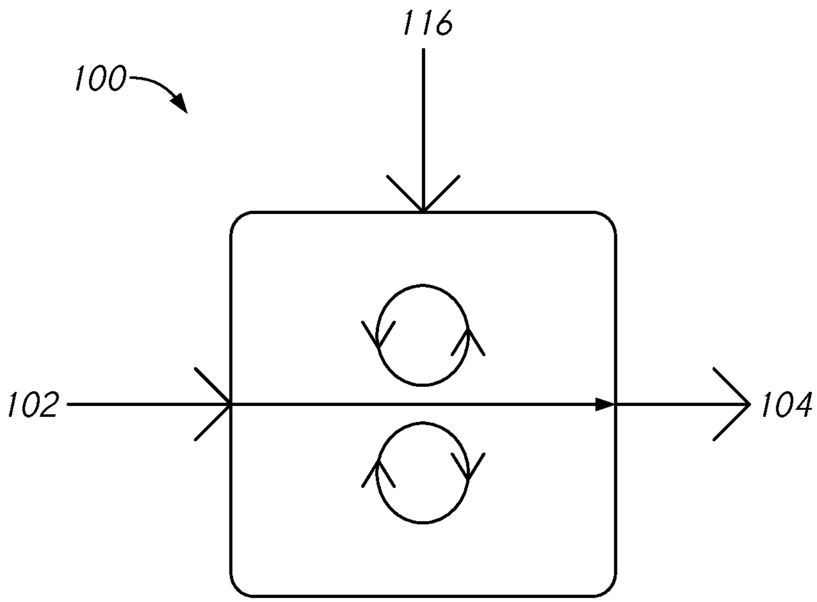
FIG. 2 illustrates a simplified schematic of the Venturi device illustrated in FIG. 1A.

For ease, FIG. 2 illustrates a simplified schematic of the Venturi device 100 of FIG. 1A. The reference numbers 116, 102 and 106 in FIG. 2 correspond to the openings at locations 116, 102, and 106 in FIG. 1A, respectively. Stated differently, inlet 102 corresponds with the inlet 102, conduit 116 corresponds with 116, and outlet 104 corresponds with outlet 104.

Particulate Burner

Figure 3:
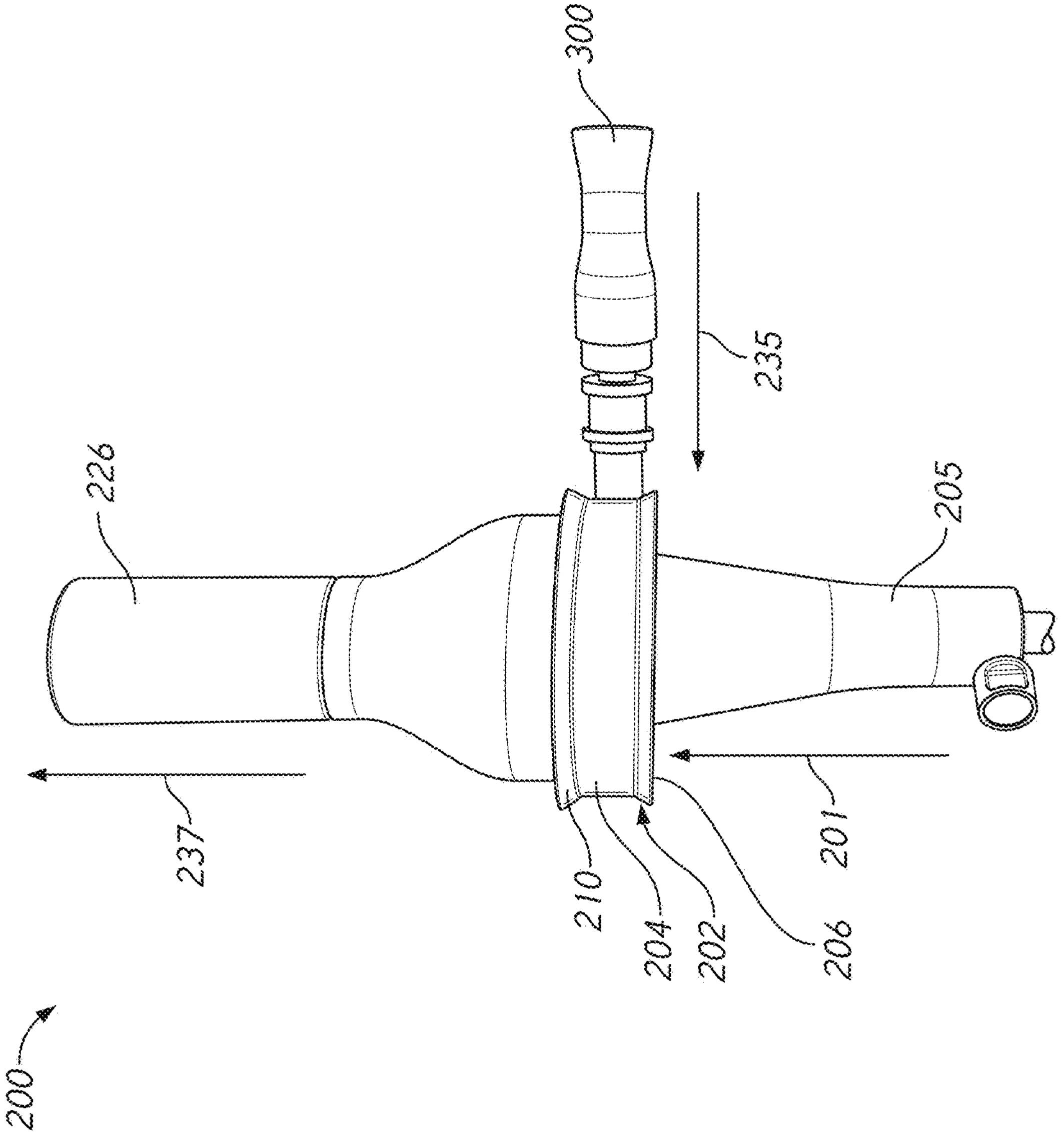
FIG. 3 illustrates a side view of a particulate burner for combustion of fuel emission byproducts. The particulate burner can incorporate one or more of the Venturi devices of FIG. 1A.

FIG. 3 illustrates a particulate burner system or NOx Particulate Burner (NPB) for combustion of fuel emission byproducts is described herein. Previous cyclone burners (also known as "cyclic burners") suffer from poor boundary layer formation along an inner wall, as the boundary layer can dissipate before a fuel source is completely burned. At times, the fluid flow separates from the boundary layer as the energy inserted into the burner to maintain the rotational force of the fluid is too low or cannot carry the momentum of the fluid through the end of the combustion chamber. The particulate burner system in the present disclosure can improve the prevention of the boundary layer separation by forcing the moving fluid from the sidewall opening to the boundary layer, which enables a more consistent and efficient burn.

As shown in FIGS. 3-6, the particulate burner system or fuel emission burner system 200 can include a housing 202 forming a combustion chamber 204. The housing 202 and associated components discussed herein can be the particulate burner, fuel emission burner, or fuel burner of the particulate burner system 200 discussed herein. The housing 202 can be positioned and/or connected to a flare stack (e.g., discussed herein as fuel delivery system 205). The particulate burner system 200 can utilize existing air and gas systems with regards to various flare stack and flue design applications. The combustion chamber 204 can be of a centrifugal type that uses centrifugal forces to flow fluid along a surface or boundary layer of the housing 202.

The housing 202 can include a bottom plate 206 with a round bottom opening 208 to allow for burners to inject a fuel and air mixture from a fuel delivery system 205 along fuel path 201 into the combustion chamber and a top plate 210 with a round top opening 212 for exhausting fuel emissions through exhaust path 237 from the combustion chamber through the round top opening 212, which can be aligned with the round bottom opening 208 along a central axis 207. Fuel can be injected into the housing 202 along fuel path 201. In some configurations, as shown in FIG. 3, a funnel 226 can be connected to the top plate 210 over the round top opening 212. The funnel 226 can direct exhaust from the round top opening 212 through the funnel 226 and around a top portion of the top plate 210 to facilitate retention of heat in the top plate 210 from combustion of fuel along the top plate 210. Additionally or alternatively, the funnel 226 can have a cross-sectional flow area that narrows in a direction of flow of exhaust from the round top opening 212.

Figure 14:
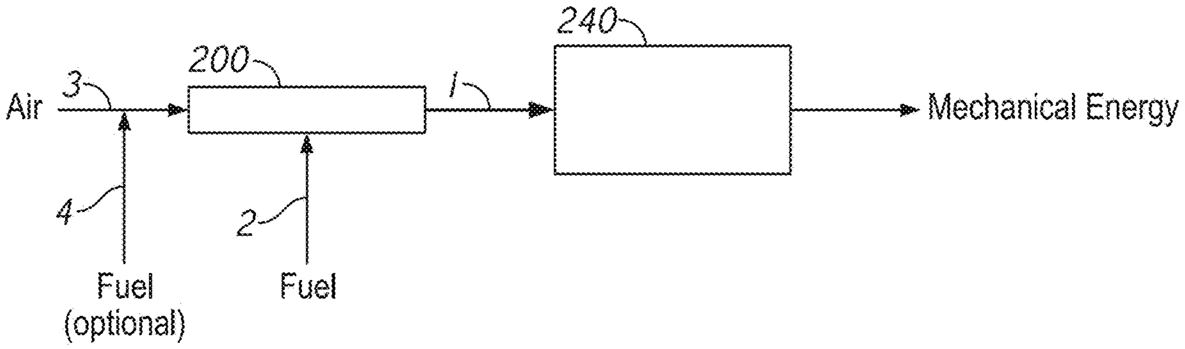
FIG. 14 illustrates a schematic of the particulate burning system and a heat engine.

As shown in FIG. 14, the exhaust exiting through the particulate burner system 200, particularly through the top plate 210, can then be directed towards a heat engine 240 to produce work. Energy from the exhaust gases 1 can be used to charge the heat engine 240 which then converts the thermal energy to mechanical energy. As fuel is introduced into the system through stream 2 and optional stream 4, the heat from combusting the fuels is transferred through stream 4. Air stream 3 can further assist in the combustion process. The particulate burner system 200 can be comprised of a 316 stainless steel construction with no moving parts providing for limited required maintenance.

The fuel entering through the round bottom opening 208 can be premixed with the air upstream of the round bottom opening 208. The bottom plate can have a width between 1 inch to 24 inches, between 3 inches to 18 inches, between 6 inches to 12 inches, between 7 inches to 11 inches, or between 8 inches to 10 inches. The bottom opening can have a width between 0.5 inches to 3.5 inches, between 1 inch to 3 inches, between 1.5 inches to 2.5 inches, or between 1.75 inches to 2.25 inches. The housing 202 of the particulate burner can also be modified to include multiple fuel burners and/or rack assemblies 209. Vent ports 214 can be disposed along the boundary of the bottom opening to allow for the control of air flow into the combustion chamber. The vent ports 214 can be curved to extend about the central axis along a curvature of the round bottom opening 208. In some configurations, the vacuum created by the Venturi device 300 can draw in pulverized solid fuel dust from the round bottom opening 208 of the bottom plate 206 and a mesh screen can be used to meter the pulverized solid fuel.

A round sidewall 216 can extend between and be connected to both the bottom and top plates 206, 210 about the central axis 207. The round sidewall 216 can have a thickness between 0.1 inches to 1 inch, between 0.25 inches and 0.75 inches, or between 0.3 inches and 0.5 inches. The sidewall can have a height between 1 inch to 5 inches, between 1.5 inches to 4.5 inches, between 2 inches and 4 inches, between 2.5 inches to 3.5 inches, or between 2.75 inches to 3.25 inches. A sidewall opening 218 can be positioned in an opening of the sidewall 216 and used for directing air into the combustion chamber tangential to an inner periphery or surface 220 of the round sidewall 216. The sidewall opening 218 can centrifugally direct the incoming fluid into the combustion chamber 204. The inner periphery 220 can exert centrifugal forces on the air incoming through the sidewall opening 218 such that the air travels around the combustion chamber 204 circularly along the inner periphery 220. The flow of air can create a vortex vacuum that pulls fuel from the round bottom opening 208 toward the inner periphery 220.

Figure 4:
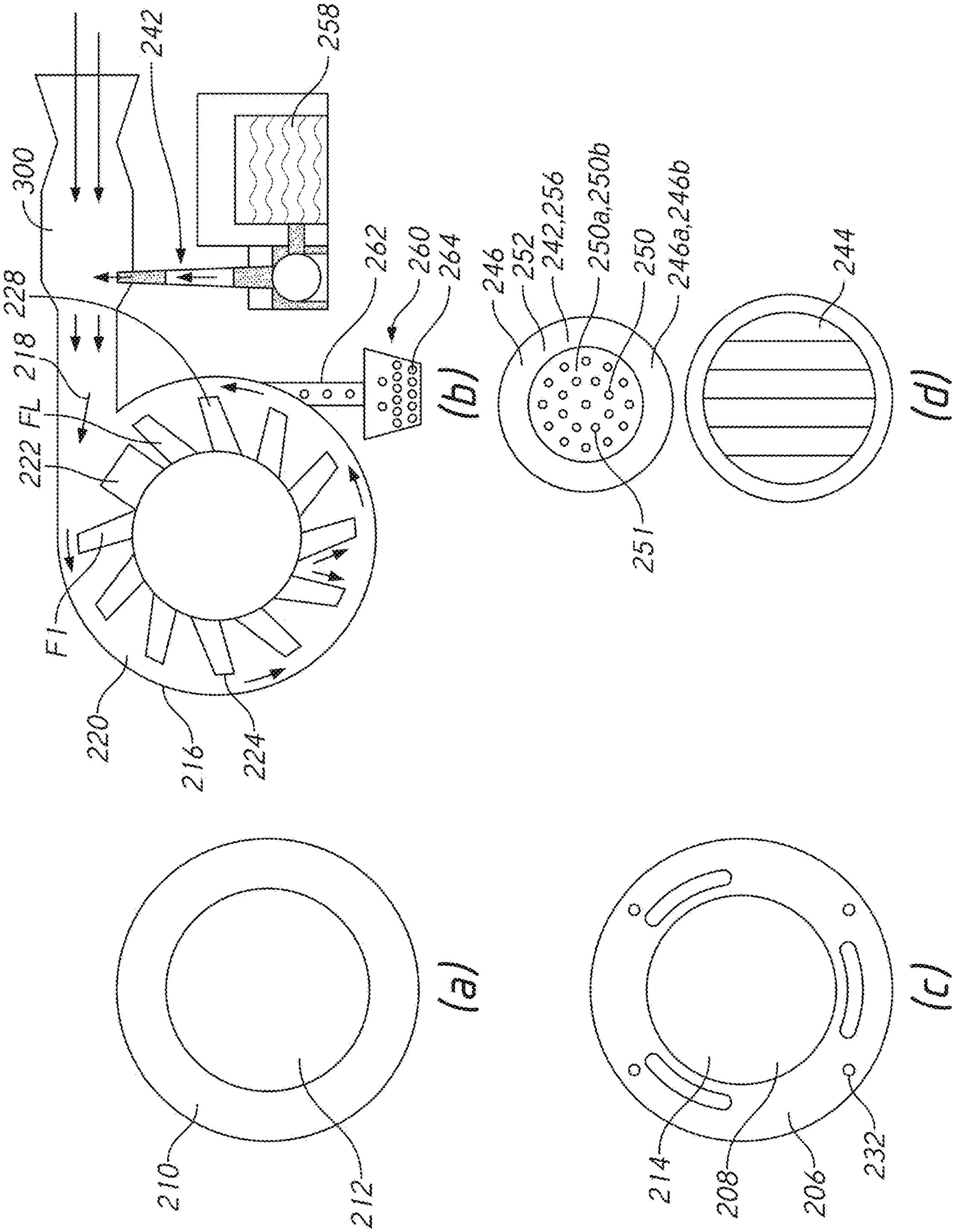
FIG. 4 illustrates a schematic of the particulate burner system illustrated in FIG. 3.
Figure 5:
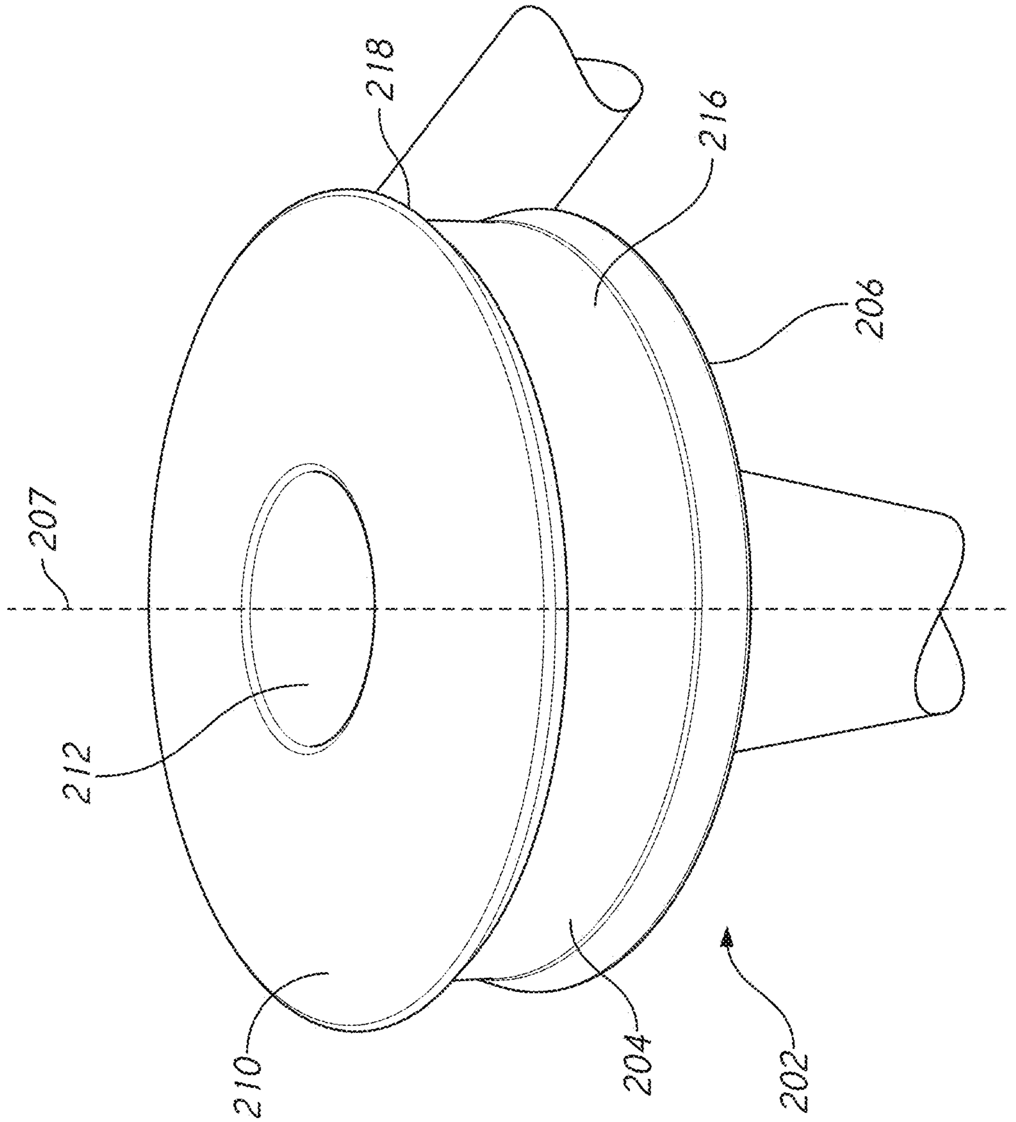
FIG. 5 illustrates a housing of the particulate burner illustrated in FIGS. 3 and 4.
Figure 6:
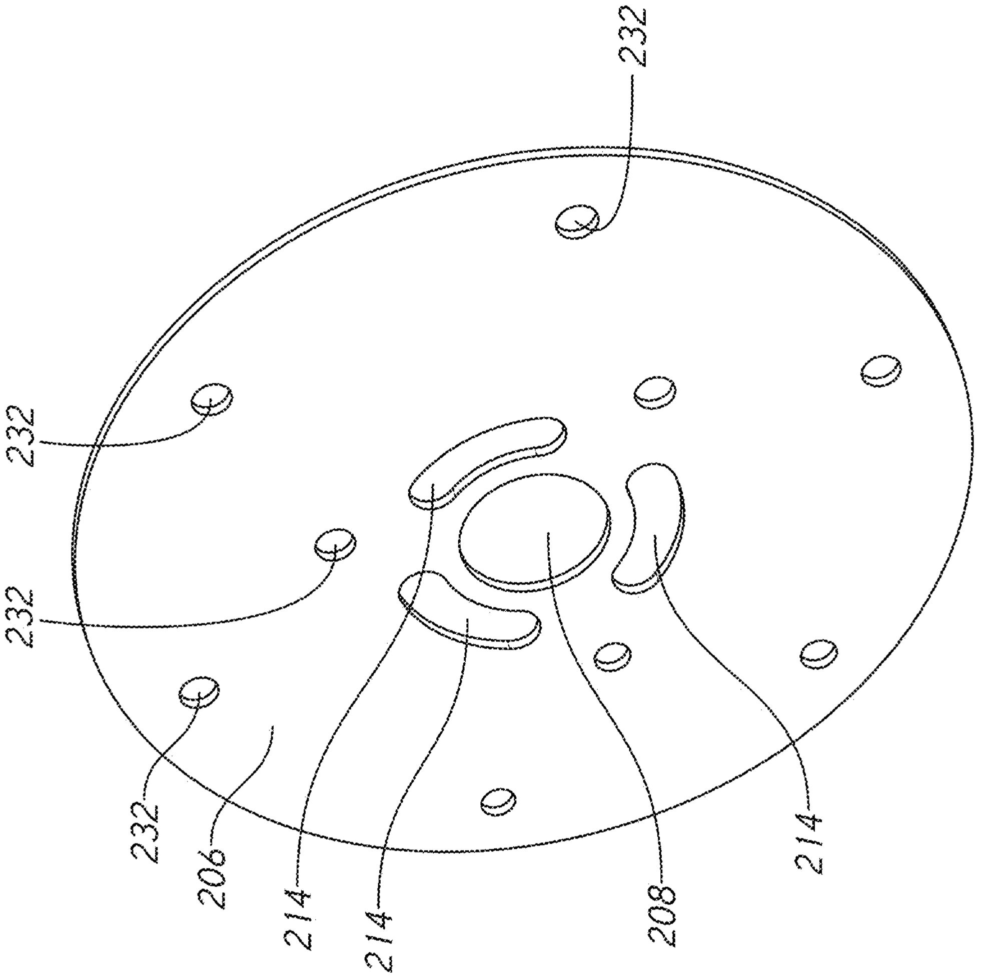
FIG. 6 illustrates a bottom plate of the particulate burner system.

Additionally or alternatively, the sidewall opening 218 can be positioned tangentially to an inner periphery 220 to allow the incoming fluid to flow in a direction along the periphery of the round sidewall 216 to entrain air and fuel from the round bottom opening 208 into the fluid moving along the inner periphery 220. Additionally or alternatively, the fuel flow from the round bottom opening 208 can entrain additional air into the system through the vent ports 214 of the bottom plate 206. The vent ports 214 can be adjusted to increase or decrease the amount of air entrained into the system. Also, the curvature of the vent ports 214 can aid in directing the air towards certain fins 228 and/or in a specific direction for the air to the enter the combustion chamber 204. One or more vent ports 214 can be closed or open depending of the fluid dynamics in the combustion chamber 204. In some configurations, a line 221 extending from a perimeter of the sidewall opening 218 along a central axis 223 of the sidewall opening 218 can be tangential to the inner periphery 220 of the round sidewall 216. As shown in FIGS. 3 and 4, the sidewall opening 218 can be formed on an input side of the combustion chamber 204 and connected to a Venturi device 300 to provide an incoming charge. The sidewall opening can have a height between 0.5 inches to 3.5 inches, between 1 inch to 3 inches, between 1.5 inches to 2.5 inches, or between 1.75 inches to 2.25 inches.

Figure 7:
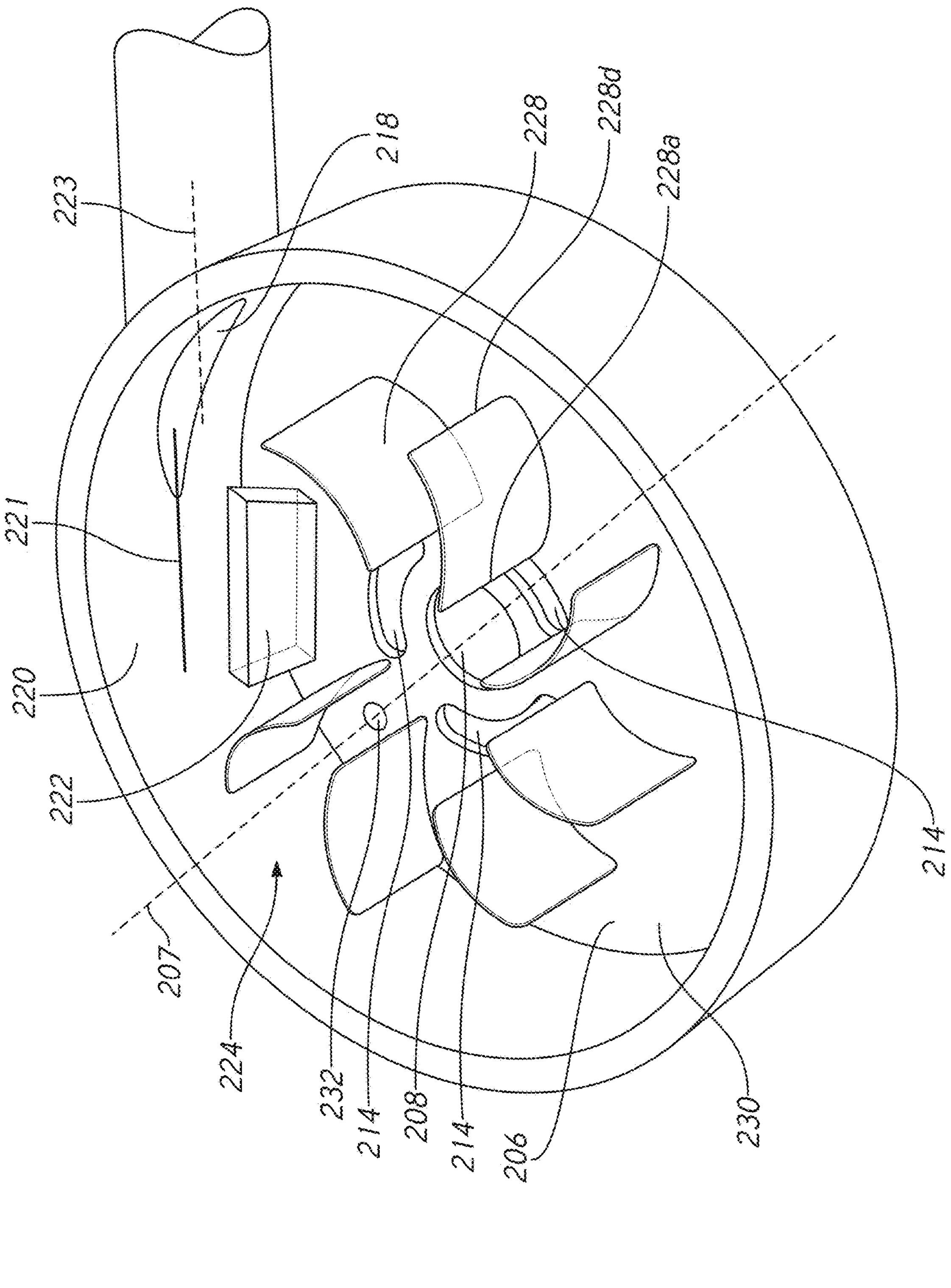
FIG. 7 illustrates a combustion chamber of the particulate burner system with a deflector plate.

As shown in FIG. 7, a deflection or deflector plate 222 can be positioned in the combustion chamber 204 at or near the opening of the sidewall opening 218 to mitigate the flow of fuel from the round bottom opening 208 to the sidewall opening 218 and/or to mitigate the fluid of air from the sidewall opening 218 to the round bottom opening 208. Additionally or alternatively, the deflection plate 222 can assist in preventing a pressure flashback through the Venturi device 300 and to guide the intake charge. A flashback can occur when the combustion chamber 204 is lit and the Venturi device 300 is not producing a flow into the combustion chamber 204. The deflection plate 222 can be connected to the bottom plate 206 and/or the top plate 210 and axially extend along the central axis 207 and along the round bottom opening 208. A perimeter of the deflection plate 222 can be at least partially within a perimeter of the sidewall opening 218 when the perimeter of the deflection plate 222 is radially projected along a path from the central axis 207 to the perimeter of the sidewall opening 218. In some configurations, as illustrated in FIG. 8, the deflection plate can be removed from the combustion chamber 204.

As show in FIGS. 3, 4, 7-10, and 12, the combustion chamber 204 can include a spiral runner 224 inside of the combustion chamber 204 that provides additional boundary layers along fuel fluid paths 233 for the fuel to interact with a flame as the fuel is pulled through the combustion chamber 204 and out of the round top opening 212. The high-speed flow 235 from the Venturi device 300 can create a vortex along combustion path 231 which creates a vacuum and draw in the fuel coming through the bottom opening 208 along fuel fluid paths 233. The spiral runner 224 can be made up of a plurality of fins, shovels, or blades 228 positioned within the combustion chamber 204 which have a curved shape in the direction of the fluid flow 229 such that a distal edge 228*d* extends in the direction of fluid flow 229 relative to a proximate edge 228*a* in relation to the round bottom opening 208. The fuel can flow along fuel fluid path 233 created at least in part because of the Coanda surfaces of the fins 228 discussed herein, where the fuel flow along the surfaces of the fins 228 due to the Coanda effect creating the fuel fluid path 233.

Figure 8:
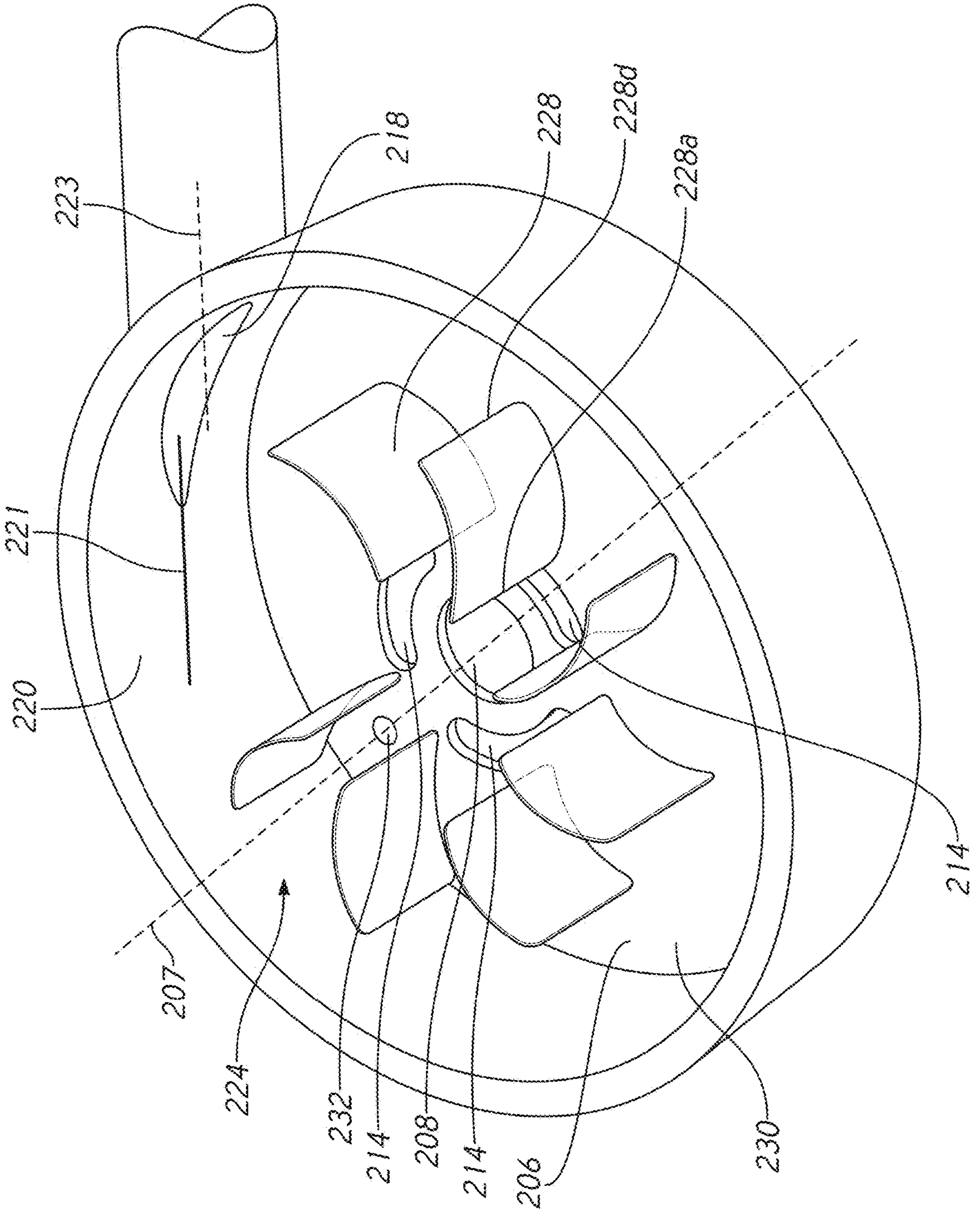
FIG. 8 illustrates a combustion chamber of the particulate burner system without a deflector plate.
Figure 9:
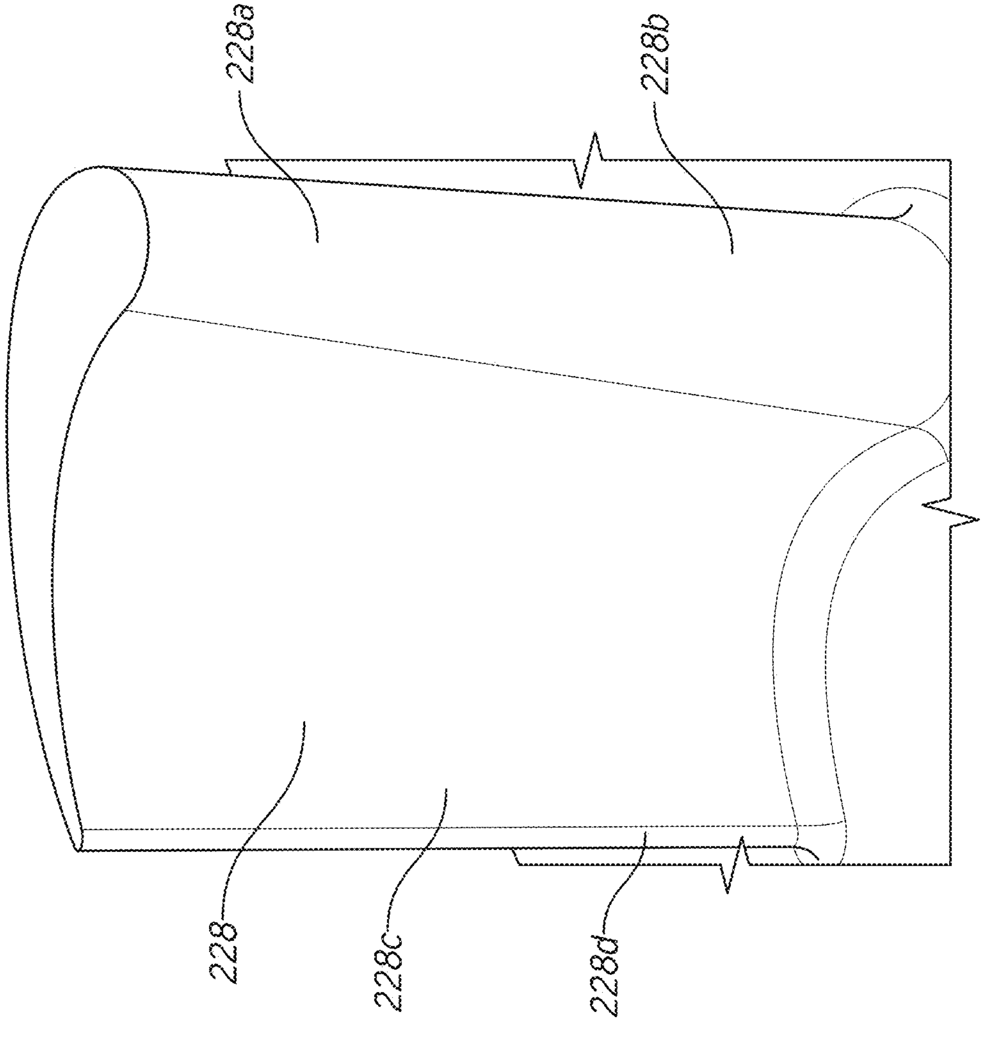
FIG. 9 illustrates a fin from a plurality of fins positioned in the combustion chamber.

Each of the fins 228, as illustrated in FIGS. 7-9, can have an edge 228*a* closest to the round bottom opening 208 relative to the inner periphery 220 that is rounded. The fins 228 can have a thickness 228*b* closest to the round bottom opening 208 and second thickness 228*c* closest to the inner periphery 220 of the sidewall 216. The first thickness 228*b* can be thicker than the second thickness 228*c*. The first and second thickness 228*b*, 228*c* can help define a camber of the fins 228 which can affect the speed of the fluid flow 233 as the fluid contacts the fins 228. Different cambers can increase or decrease the fluid attachment to the fins as well as the speed of the fluid flow 233 as the fluid passes through the fins 228. The fins 228 can further include a Coandă surface and/or a Venturi effect at fluid path 233 which can help in transferring the fuel along the fins 228 (and surfaces thereof) from the bottom opening 208 to the boundary layer of the inner periphery 220.

The fins 228 can have a variety of shapes depending on various factors. The fins 228 can have a tear-drop shape, a shape having a relatively flat side away from the fluid path 229 with a round side in the direction of the fluid path 229, an elliptical shape with a relatively symmetrical camber on each side of the fin 228, or the like. A concave shape and/or side of the fin 228 can face away relative to the fluid flow path 229 to guide the fluid along the length of the fin 228 in the direction of the fluid flow path 229. A convex side and/or shape of the fins 228 can face towards the fluid flow path 229 to direct the fluid towards the inner periphery 220. The fluid flow paths 299 can follow a curved corresponding concave or convex path along the surface of the fins 228 at least in part because of the Coanda effect and associated surfaces of the fins as discussed herein. The fins 228 can have a connection point along the side closest to the bottom plate 206 and/or the hub 230 for attaching the fins 228 to the bottom plate 206 and/or the hub 230. In some configurations, the fins 228 can have a connection point along the proximate edge 228*a* for connecting the fins 228 to the protrusion 234.

The fins 228 can be connected to the bottom plate 206 of the combustion chamber 204. In some configurations, the fins 228 can be connected to a hub 230 which can then be connected to fastener openings 232 of the bottom plate 206 (shown in FIGS. 5-7). The hub 230 can be removable form the combustion chamber 204 such that one or more hubs having different fin configurations can then be interchangeable. The different fin configurations can correspond to air/fuel mixture properties and/or the use of solid-state or gaseous fuel fluids.

Figure 11:
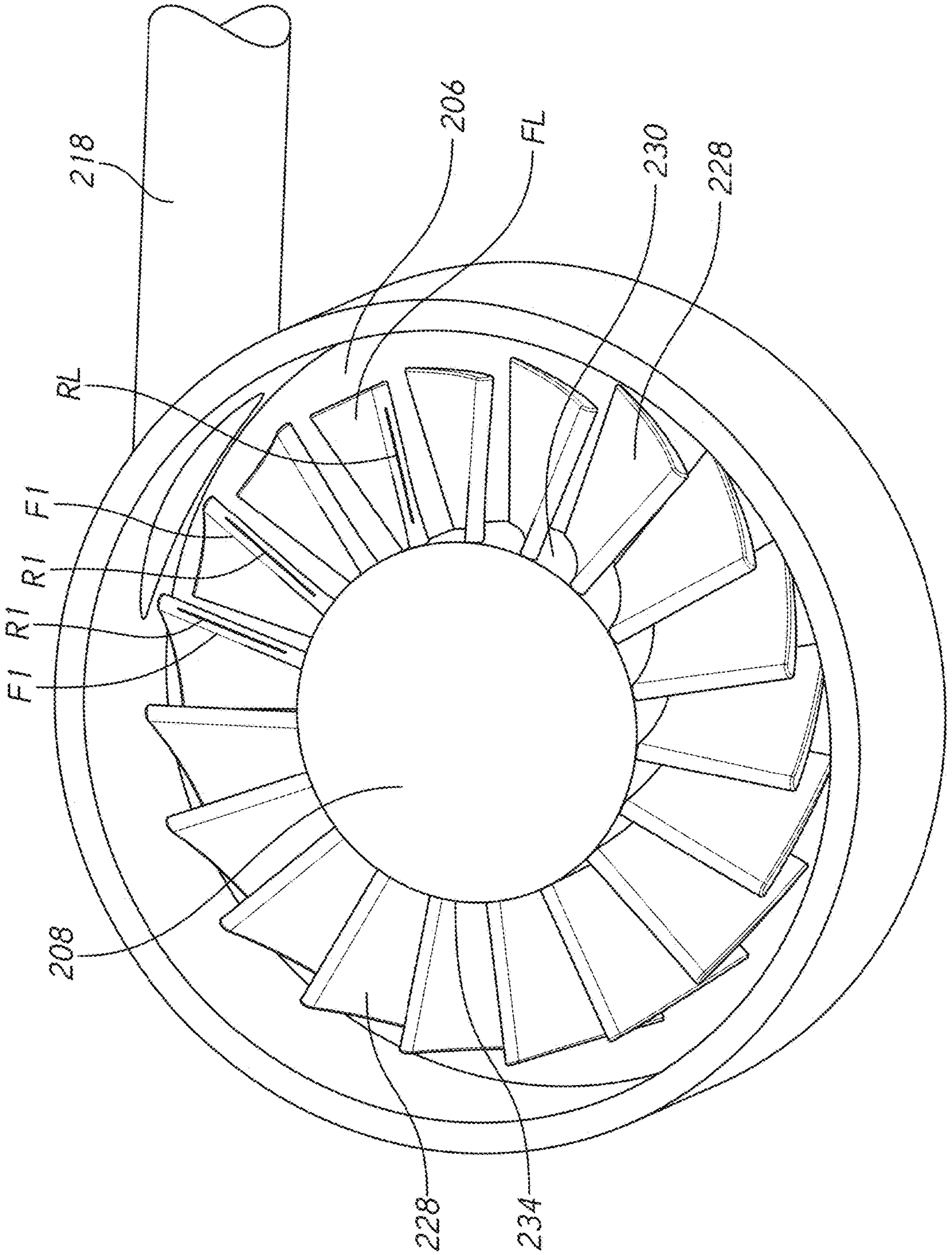
FIG. 11 illustrates a perspective view of the combustion chamber of the of the particulate burner system with a protrusion coming up from the round bottom opening.

In some configurations, as shown in FIG. 11, the fins 228 can be attached to a hub 230 positioned around a protrusion 234 of the bottom plate opening 208. FIG. 11 also illustrates another configuration without deflection plate 222. Rather than include the deflection plate 222, one or more first fins F1 can be shorter than the rest of the fins 228. The one or more first fins F1 can also be the farthest from the boundary layer along the inner periphery 220 and the top plate 210. The first fins F1 can allow the fluid to pass over the one or more first fins F1 without impeding the high-speed flow. In some configurations, the spiral runner 224 can provide at least 2 additional boundary layers, at least 5 additional boundary layers, at least 10 additional boundary layers, or at least 20 additional boundary layers for the combustion of fuel along the boundary layers. At the location of the deflection plate 222, a plurality of fins 228 can be removed. In some configurations, the deflection plate 222 can be flat. Additionally or alternative, the deflection plate 222 can be curved to follow at least the first radial extent of the first fin F1 which can be less than the second radial extent of the last fin.

Figure 10:
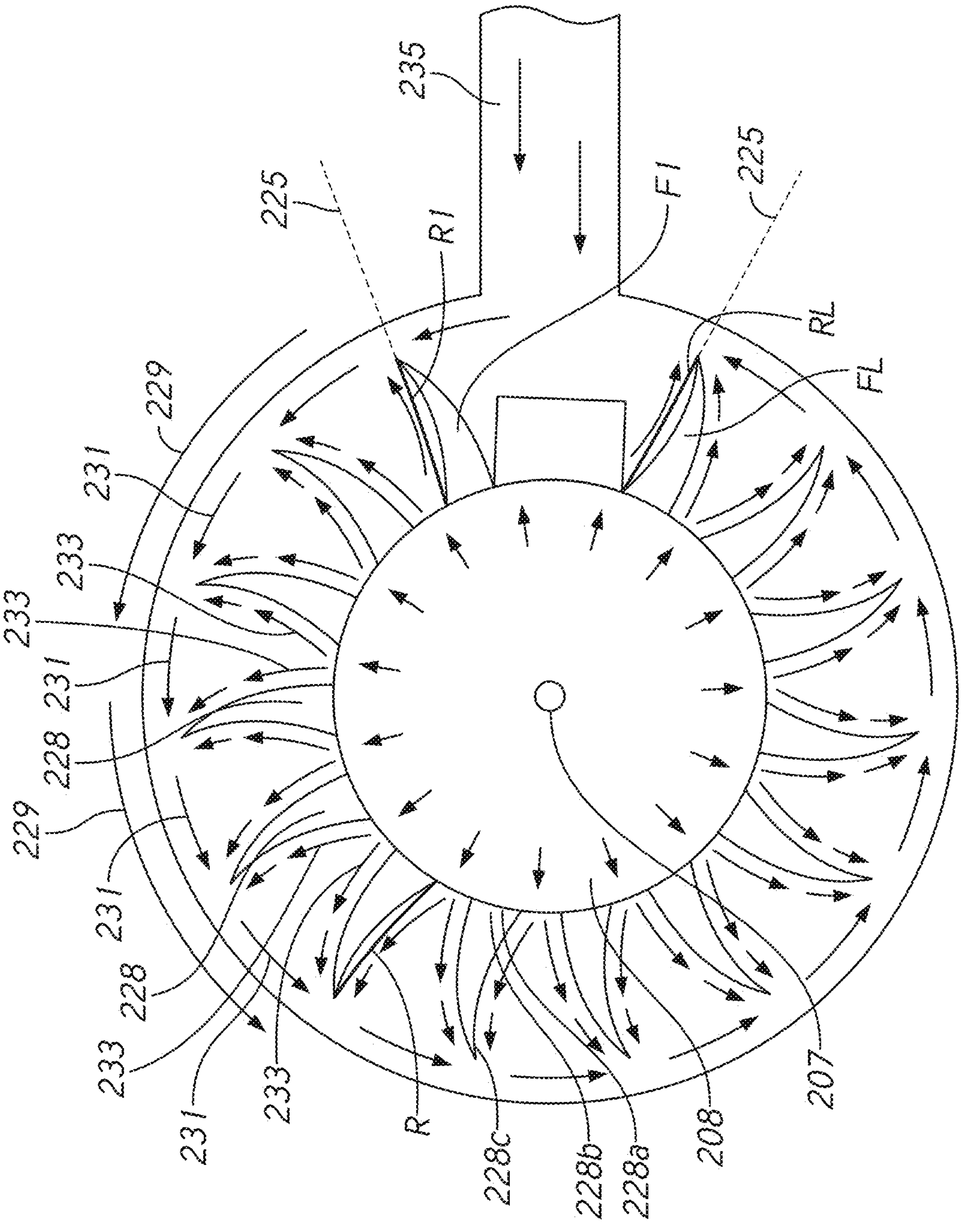
FIG. 10 illustrates a top-down view of the combustion chamber of the of the particulate burner system.
Figure 12:
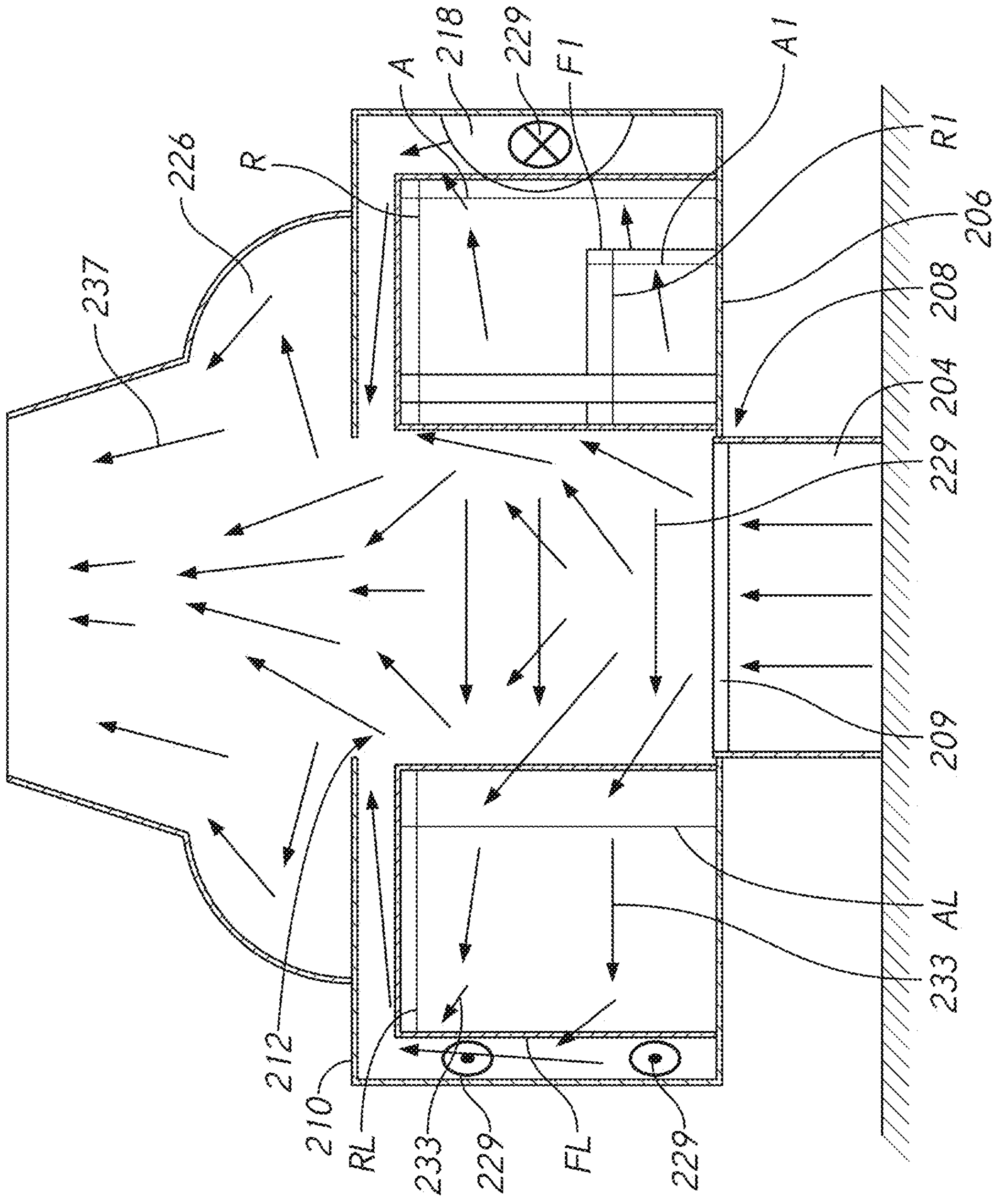
FIG. 12 illustrates a sectional side view of the particulate burning system.

As shown in FIGS. 10-12, the plurality of fins 228 can radially extend in the combustion chamber 204 from the round bottom opening 208 towards the inner periphery 220 in a direction of the moving air 229. A combustion flow path 231 along which combustion of the fuel occurs can extend along the inner periphery 220. A first radial extent R1 of a first fin F1 of the plurality of fins 228 from the central axis 207 can be less than a second radial extent RL of a last fin of the plurality of fins from the central axis 207. Also, the first axial extent R1 of the first fin F1 can be less than a second axial extend RL of the last fin FL along the central axis 207. The first fin F1 can be positioned adjacent and/or closest to the entry path of the air 235 coming from the sidewall opening 218 as well as downstream from the deflection plate 222 along the airflow direction 229. The last fin FL can be located adjacent to and upstream of the deflection plate 222 in the direction of the fluid flow 229.

As shown in FIG. 10, the first axial extent μl of the first fin F1 along the central axis 207 can be less than the second axial extent AL of the last fin FL along the central axis 207. By sizing the first fin F1 in such a configuration, back pressure or a stoppage of the fluid flow coming from the sidewall opening 218 can be reduced. The radial extents of the fins between the first fin F1 and the last fin FL can be longer relative to the first radial extent R1 of the first fin F1 to direct the fuel further toward the inner periphery 220 of the round sidewall 216 and entrail fuel toward the inner periphery 220. Directing the fuel towards the inner periphery 220 along fluid path 233 and can allow for the combustion of fuel emission products along the sidewall 216 along the combustion flow path 231.

In some configuration, the first fin F1 can also be smallest and/or shortest of the fins 228. Also, the last fin FL can be the tallest and/or longest relative to the other fins 228. The radial extents R of the plurality of fins can increase toward the inner periphery along the air flow 229 direction to direct fuel and entrain fuel towards the inner periphery 220 along fluid path 233. In some configurations, the radial extent R can increase gradually in the direction of the inner periphery 220 in the air flow direction. In some configurations, the radial extent R of two or more first fins can be the shortest relative to the other fins. The two or more shortest fins can include the first fin F1. In some configurations, the radial extent R of two or more of the last fins can be the longest relative to the other fins. The two or more longest fins can include the last fin FL.

The fins can be positioned such that there is gap between the end of the fin closest to the inner periphery and the inner periphery is between 0.1 inch to 1 inch, between 0.25 inches to 0.75 inches, or between 0.4 inches to 0.6 inches. As the fluid comes into contact with the fins 228 along path 233, at least a portion of the fluid will be redirected towards the boundary layer to increase the burning efficiency and completion. Increasing the size of the fins 228 and/or decreasing the gap between the sidewall 216 and/or top plate 210 can also increase the speed of the fluid. In some configuration, the radial extents R of the fins 228 can be the same toward the inner periphery 220 after the first fin F1 along the airflow direction.

In some configurations, the first axial extent μl of the first fin F1 can be the shortest relative to the other fins 228. In some configurations, the second axial extent AL of the last fin FL can be the longest relative to the other fins 228. The fins can have a height between 1 inch to 4 inches, between 1.5 inches to 3.5 inches, between 2 inches to 3 inches, or between 2.25 inches to 2.75 inches. In some configurations, the axial extents A of the fins 228 increases towards the top plate along the direction of the air flow to direct the fuel and/or air towards the inner periphery 220. By also angling the fins 228 towards the inner periphery 220 and closing the gap towards the top plate 210, the air flow is more effectively directed to the inner periphery 220 which improves entraining fuel along the fins 228. The axial extents A of the fins 228 can gradually increase towards the top plate 210 along the fluid flow path 229. In some configuration, the axial extents A of two or more of the first fins can be the shortest relative to other fins of the plurality of fins 228. The two or more first fins can include the first fin F1.

Additionally or alternatively, the axial extents A of two or more last fins can be the longest relative to the other fins 228. The two or more last fins can also include the last fin FL of the plurality of fins 228. In some configuration, the axial extents of the plurality of fins can be the same toward the top plate after the first fin along the airflow direction. In some configurations, the axial extents A of the other fins of the plurality of fins 228 are longer relative to the first axial extent A1 of the first fin F1 to direct fuel toward the inner periphery 220 of the sidewall 216. The lines 225 from the central axis 207 along radial extents of the plurality of fins can extend outside of a perimeter of the sidewall opening 218 for each of the plurality of fins 228. In some configurations, the axial extent A of the fins 228 can increase while the radial length R remains constant.

FIGS. 10 and 12, for illustration purposes, shows the fluid dynamics of the particulate burner system 200. As the fuel and air mixture enter through the round bottom opening 208 and around the deflection plate 222, the fuel and air mixture can travel along the fluid path 233 along surfaces of the fins 228 toward the combustion path 231. The fuel and air mixture can travel over the deflection plate 222 and along the combustion path 231 as the vacuum in the combustion chamber pulls the fuel and air mixture to the inner periphery 220. The fuel and air mixture can travel in the air flow path 229 until the combusted fuel and air mixture is exhausted from the round top opening 212 along exhaust path 237. As the air fuel mixture travels along the combustion path 231, the fuel air mixture can become compressed as the gaps between the fins 228 and the top plate 210 and inner periphery 220 decrease. An intake charge from the Venturi device 300 can enter the sidewall opening 218 along fluid flow path 235 in the direction of fluid flow path 229 in a centrifugal manner. Each of the flows path 233 between the fins 228 can isolate the fuel and transfer the fuel to the combustion path 231. The fins 228 can break up the fuel fluid flow into various compression zones along fluid paths 233 between the fins 228 to facilitate the fuel traveling along the Coanda surfaces of the fins 228 toward the inner periphery 220 and to combust more efficiently (including combustion of particulates). Additionally or alternatively, combustion of fuel and particulates can take place along the fluid flow path 233 along the fins 228.

Figure 13:
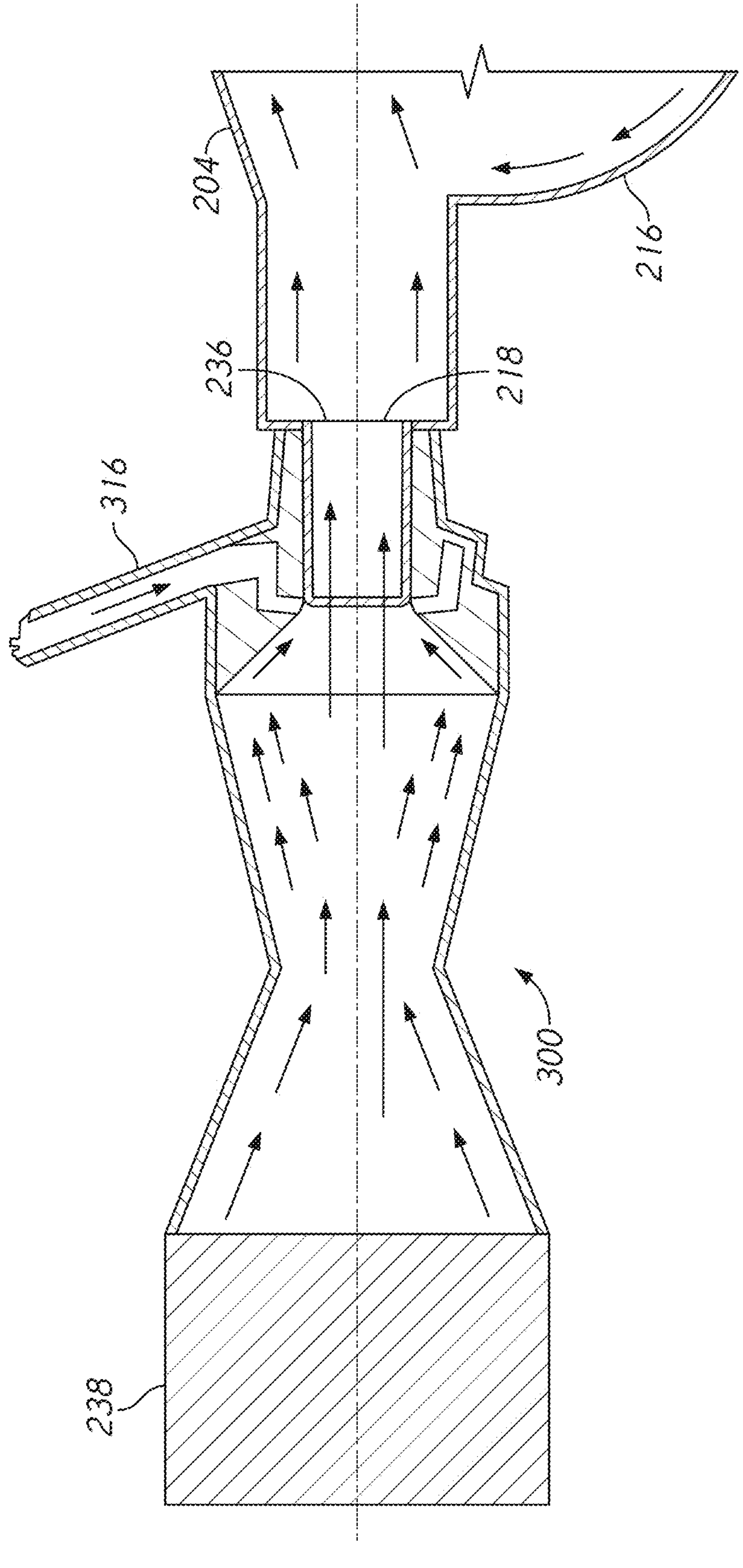
FIG. 13 illustrates a sectional side view of the venturi inlet.

FIGS. 4 and 13 illustrates a Venturi inlet 236 of the Venturi device 300 that can be attached and/or in fluid communication to the sidewall opening inlet 218 to provide a source of high-pressure fluid to the combustion chamber 204. In some configurations, the Venturi inlet 236 can be connected to the sidewall opening 218 by a tube, conduit, or the like. In some configurations, the Venturi device 300 can be fluidly and directly connected to the sidewall opening 218. The Venturi device inlet 236 can then be connected to a compressed-fluid source 238 that provides a primary flow to the Venturi device 300. A conduit 316 coming off the compressed-fluid source 238 and/or the fuel delivery system 205 can be connected to a secondary input 320 of the Venturi device 300 to create a suction effect to pull the primary flow through the Venturi device 300.

In some configurations, the secondary flow can include fuel injected into the secondary flow upstream of the secondary input 320. The fuel injected into the secondary flow can be of the same type or different from the fuel injected into the combustion chamber 204 the round bottom opening 208. In some configurations, the Venturi device 300 can also be used to mix fuel and air before the fluid enters the combustion chamber. The fuel delivery system 205 can deliver fuel into the sidewall opening 218 via an annular chamber 318 connected to the Venturi device 300 utilizing the Coandă Effect. The fluid (e.g., air and/or fuel) is delivered into the combustion chamber 204 through the sidewall opening 218 by utilizing hybrid hydro-acrodynamics at a specific velocity and flow rate (which are unassisted), which then mixes with the fuel from the fuel delivery system 205.

The fuel delivery system 205 can premix a predetermined and/or desired ratio of fuel to air before delivery to the combustion chamber. 204. The air flow and velocity of which the air will be delivered into the combustion chamber 204 via the sidewall opening 218 can be calculated to supply enough oxygen into the combustion chamber 204 to allow a substantially clean burn of the fuel delivered by the fuel delivery system 205. This provides kinetic energy into the system 200 so that adequate mixing of air and fuel can take place due to the introduced turbulence.

The fuel can be ignited and the particulate burner system 200 can be warmed up over an adequate period. The velocity and/or flowrates of the air and fuel mixture can be adjusted to achieve a desired temperature and/or burn rate. Once the particulate burner system 200 has reached its peak temperature and/or burn rate of operation, the particulate burner system 200 can burn any emission byproducts injected into the combustion system. The centrifugal housing shape of the combustion chamber 204 can allow a flame in the particulate burner to be recirculated and recycled which promotes complete combustion of the injected fuel. Sustaining a high heat of the housing 202 can allow for a clean burn of particulate matters. As an example, an acetylene torch requires a temperature of 5500 degrees Celsius to operate which causes long and short-term heat damage to the torch. Based on the type of fuel and various implementations, the lowest operating temperature that can produce a clean burn can be about 800 degrees Celsius. The dimensions of the particulate burner system 200 can vary based on the desired application. The width can be greater than the height (between a range of 2:1 to 4:1). The height can be between 6 inches to 6 feet based on its application.

The particulate burner system 200 can be capable of burning several different types of fuels with minor modifications to the production and operating process. In some configurations, possible primary fuel sources used to achieve a clean burn can comprise coke, fuel oil, and/or bunker oil. Besides fuel sources, the particulate burner system 200 can reduce and/or eliminate noxious forms of emissions. In some configurations, the emissions can be transformed into a usable material. The particles can be disposed of, but, in some configurations, the particles can be collected. For example, when burning used bitumen, the particulate burner can collect vanadium oxide. As shown in FIG. 4, the particulate burner system 200 can include a collection device 260 which can store by-products of the combustion process. The collection device can have a chute 262 attached to the combustion chamber at the bottom plate on one end and a storage container 264 on the opposite end. The bottom plate can include a chute opening connected to the chute. As the fluid travels around the combustion chamber, the by-products can be deposited and/or transferred to a low pressure of the combustion chamber due to the density of the remaining fluid. The by-product is then transferred down the tube and into the storage container 264. In some configurations, the combustion chamber can have a plurality of collection screens and tubes corresponding to a specific by-product. The by-product caught in one of the plurality of collection screens can then be deposited in a storage container 264 for that by-product. In some configuration, when the combustion chamber is burning bitumen, vanadium oxide can be the non-combustible particle.

The housing design can open on both sides (round bottom opening 208 and round top opening 212) of the combustion chamber 204 by utilizing a veined pathway for combustion. The design can allow for a new dimension to utilize the pressure differential of a flame vortex to create a vacuum on a flare gas stack or other flue-based systems emitting harmful pollutants to atmosphere. The housing design can also increase the overall system efficiency and can relieve energy costs on existing sub-structures, reducing the real estate footprint for future designs and exponentially lowering overall maintenance costs.

Figure 15:
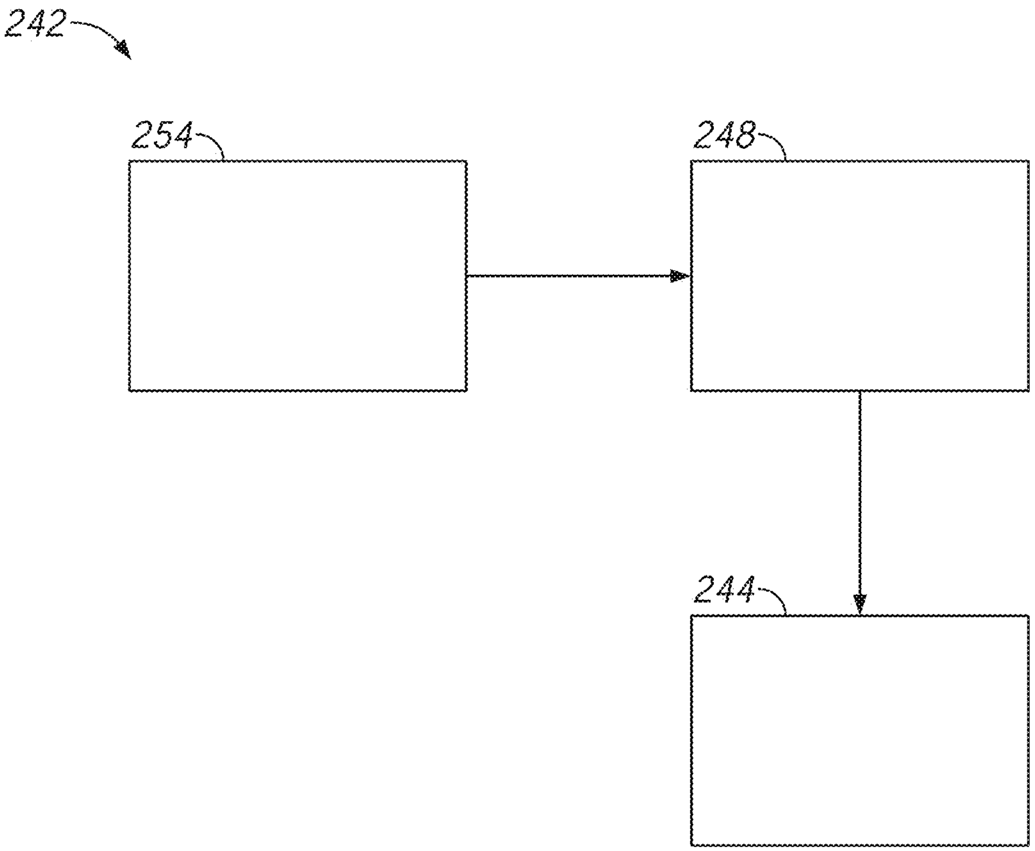
FIG. 15 illustrates a schematic of a fuel atomizer.

As shown in FIGS. 4 and 15, the Venturi device 300 of the particulate burner system 200, can be connected to and/or be in fluid communication with a fuel atomizer 242 to mix fuel with a primary flow passing through the Venturi device 300. The fuel atomizer 242 can be in fluid communication with the secondary input upstream of the secondary input 320. Fuel atomization can occur by using high pressure and/or an ultrasonic resonator using vibrations and/or electricity. The particulate burner system 200 can include an ultrasonic resonance atomizer 242 that uses high frequency vibrations applied to a disperser plate 244 which then vibrates a piezoelectric ring and/or transducers 246 to cause a static shock. Piezoelectric devices under compression, such as when experiencing vibrations, can emit an electric charge. A factor in creating the droplet size of fuel is the frequency of the vibration.

The ultrasonic resonance atomizer can enable operation with solid-state fuels (e.g., liquids such as diesel, gasoline, kerosene, etc.) at a high level of efficiency. By atomizing the incoming fuel fluid, the fuel can combust more efficiently and thoroughly. The ultrasonic resonance atomizer 242 can be adapted to the sidewall input 218 and can function with other configurations.

The ultrasonic resonance atomizer 242 can include a disperser ring 244 (also mentioned herein as a "disperser plate"), an RF frequency generator or oscillator 248 to vibrate the disperser ring 244, a mesh screen 250 having micro-tapered apertures 251 disposed along the surface of the mesh screen 250, one or more piezoceramic rings 246 as the atomizer and stacked on top of and/or connected to the disperser ring 244 to discharge electricity into the fluid stream coming through the mesh screen 250, one or more copper washer 252 positioned between each piezoceramic ring 246, and a controller 254 to control the RF frequency generator 248. The mesh screen 250 can either be disposed in the center of the disperser plate 244 and/or the piezoelectric ring 246. A 120 volt and/or 110 volt system can be used to power the RF frequency generator 248. A 120-volt system can be used to power the RF frequency generator 248. The RF frequency generator 248 can be connected to the disperser plate 244 by a negative and a positive connection to apply a frequency to disperser ring 244, causing the disperser ring 244 to vibrate which also causes the piezoceramic ring 246 to vibrate. Depending on the frequency applied to the disperser ring 244 and piezoceramic ring 246, the applied frequency can create a higher or lower atomization rate. The mesh screen 250 acts like a nozzle to disperse the fuel source for atomization.

The controller 254 can switch the oscillator 248 between a low resonant frequency and a high resonant frequency by a switchable excitation circuit. The low resonant frequency can be for cold-start conditions of the system. The high resonant frequency can be for hot operation conditions of the system. The controller 254 can be connected to a temperature sensor or other sensor in the system that determines the state of operation of the system, such as the temperature of the housing 202. Based on predetermined thresholds, such as predetermined temperature thresholds, the controller 254 can switch between low resonant frequency and high resonant frequency to increase system efficiency and minimize system startup time from cold to hot operating conditions. The excitation circuit can exhibit a phase-locked loop circuit with a voltage-controlled oscillator and a frequency filter switching between the low or the high resonant excitation frequency.

The controller 254 can be part of a computer system that operates the devices and system discussed herein. The computer system can include a processor or controller, a main memory, a storage, a bus, and an input. The processor may be one or more processors. The processor executes instructions that are communicated to the processor through the main memory. The main memory feeds instructions to the processor. The main memory is also connected to the bus. The main memory may communicate with the other components of the computer system through the bus. Instructions for the computer system are transmitted to the main memory through the bus. Those instructions may be executed by the processor. Executed instructions may be passed back to the main memory to be disseminated to other components of the computer system. The storage may hold large amounts of data and retain that data while the computer system is unpowered. The storage is connected to the bus and can communicate data that the storage holds to the main memory through the bus. Sensors can communicate with the computer system through the input that receives data from the sensors associated with operation of the systems discussed herein.

Typical fuel atomizers create a fuel mist by applying a high pressure in front of the atomizing nozzle. Pressures can be in the range of 10 to 20 bars. For a nozzle bore, the throughput of fuel and the heating output increase with increasing pressure. Due to safety and because of the risk of clogging by dirt, the nozzle diameter cannot be reduced which can result in pressure atomizer burners having a lower output limit around 15 kW.

For ultrasonic atomizing burners, ultrasonic atomizers can be used with an ultrasonic oscillator having an ultrasonic transducer coupled to an amplitude transformer. The amplitude transformer can be provided at the free end of the transducer with an atomizing plate or an atomizing plate. The surface of the atomizing plate can be supplied with liquid fuel to be atomized via bores and channels which can be dimensioned large and therefore are not subject to the risk of clogging with dirt. The fuel supply transfer can takes place via a metering pump that works almost without back pressure, which can be simpler and cheaper than the high-pressure pump with pressure regulator required in a pressure atomizer.

For atomizing solid-state fuel, as the resonate frequency is applied to the disperser plate 244, the piezoelectric ring vibrates 246 as well. As the piezoelectric ring 246 vibrates, a static charge is discharged from the piezoelectric ring 246. The static charge causes the molecular structure of the fluid flowing through the mesh screen 250 to become destabilized and more susceptible to complete combustion. The resonance atomizer 242 can also include one or more piezoelectric ring 246 stacked on top of one another. A copper ring 252 (also mentioned herein as a "copper washer") can then be placed in between each piezoelectric ring 246 (and disperser plate 244 assembly) to act as a dampener and inhibit the piezoelectric rings 246 from vibrating against each other. The copper rings 252 can inhibit or prevent transfer or resonance between the piezoelectric rings 246.

In some configurations, the particulate burner system 200 can have the capability to ionize the incoming fuel stream to also improve the overall combustibility of lesser productive waste gasses, such as ammonia ($NH_3$) gas, which can allow for more efficient and broader industry applications using a fuel or gas ionizer 256. Further, the ionization capability can limit the primer fuels needed for ignition and maintenance temperatures. With the ionization physical interaction on a pressurized gas stream, the particulate burner system 200 can utilize $NH_3$ gas. This can be used in lieu of or with similar Hydrogen based primer reaction systems. The gas ionizer 256 can include a similar structure to the solid-state fuel atomizer 242. The gas ionizer 256, in fluid communication with the secondary input 320, can include a disperser plate 244 and one or more piezoelectric rings 246 in connected to the disperser plate 244.

The piezoelectric rings 246 can ionize the fuel passing through the opening of the piezoelectric ring 246 by discharging an electrical charge into the fuel path. In some configurations, the gas ionizer 256 can include up to 10 piezoelectric rings, up to 8 piezoelectric rings, up 5 piezoelectric rings, up to 4 piezoelectric rings, up to 2, or 1 piezoelectric ring. The number of piezoelectric rings is based on system configurations to allow for ionization while mitigating preignition of the gas. The number of piezoelectric rings is based on achieving a desired molecular destabilization of the fuel.

A Copper ring 252 can be disposed between each pair of piezoelectric rings 246, similar to the configuration of the solid-state fuel atomizer 242. The copper rings 252 can attenuate resonance between the piezoelectric rings 246. In some configurations, the gas ionizer 256 can include one more disperser plates 244 connected to one or more piezoelectric rings 246. Rather than using a resonate frequency generator to cause vibrations to atomize the fluid, static pressure built between one or more layers of mesh screens 250 to generate static electricity to destabilize the gas and lower the required ignition energy. A first mesh 250*a* can be fitted into the ring opening of the first piezoelectric device 246*a*, a second screen 250*b* mesh can be fitted into a second ring opening of a second piezoelectric device 246*b*, and so on.

Additionally or alternatively, the first mesh screen 250*a* can have a plurality of mesh opening having a larger cross-sectional flow area than a second plurality of mesh openings on the second mesh screen 250*b*. By reducing the cross-sectional flow area, the flow of fuel through the first mesh screen 250*a* and the second mesh screen 250*b* creates a pressure difference between fuel flowing downstream of the first mesh screen 250*a* and upstream of the second mesh screen 250*b*. The fuel flowing downstream of the second mesh screen 250*b* can cause at least one of the piezoelectric rings 246 of the fuel ionizer 256 to resonate and to discharge the electrical charge into fuel path. The mesh screens 250 can include a finer mesh relative to the input gas density. Energy from a compressed cylinder can inject a gas through one or more openings located on the mesh screens 250 and one or more piezoceramic rings 246. The gas cylinder can be plugged into a reservoir 258 that possesses the appropriate gas fittings. A low-pressure regulator can be installed to the gas cylinder to manage the flow rate of the gas to be ionized. A high-pressure regulator could also be installed for a higher volume system. The more times the fluid passes through the mesh screens 250, the more time the fluid interacts with the static discharge and gets ionized.

The particulate burner can be a forced inducted vortex burner that will run on the existing flare stack air and fuel lines. The system utilizes hybrid hydro-aerodynamics and round geometry engineering to produce a three-dimensional efficiency, which will result in a substantially complete combustion-fuel burn. The three-dimension system is opposed to the current inefficient two-dimensional approach having higher levels of particulate matter and harmful compartmentalized gas emissions.

The particulate burner can bolt onto an existing flare gas stack pipe after removal of an existing pilot burner system. The burn chamber design and non-mechanical forced induction system can utilize the existing energy in the system more efficiently without needing an additional energy input. The formed flame vortex can spin in the conical exhaust port. As the flame is heated, the flame can recycle the waste gasses prior to discharging into to atmosphere, resulting is a clear blue flame at the flare stack exit with minimal pollutants or particulate matter.

The suction effect of the vortex formed at the system chamber housing can also create vacuum on the stack, said vacuum improving the gas flow through the stack and increasing efficiency. Evacuation of gasses at a higher rate, without adding electrical pumping mechanisms, can increase the productivity net gain for current cost conversion. The evacuation of gasses can also enable a reduction in size for new stack construction with exponential savings on material cost, maintenance, and space.

Figure 16A:
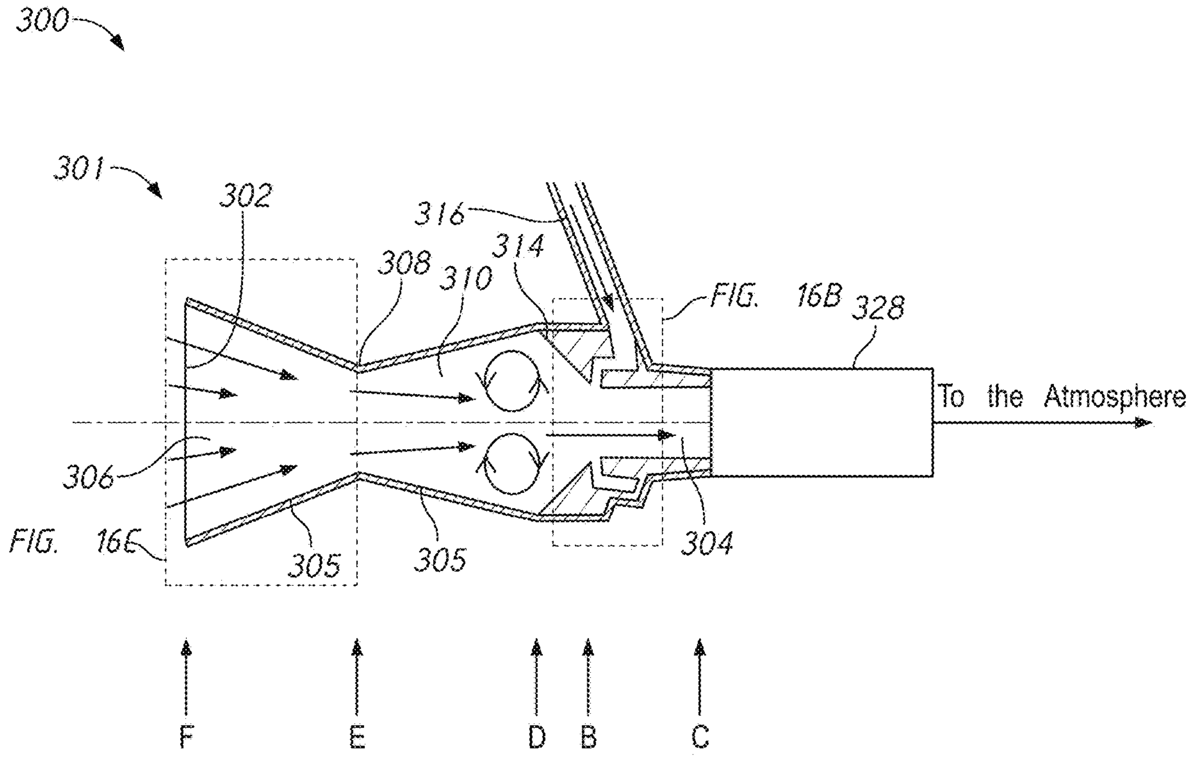
FIG. 16A illustrates a Venturi device of the particulate burner illustrated in FIGS. 3, 4, and 13.
Figure 16B:
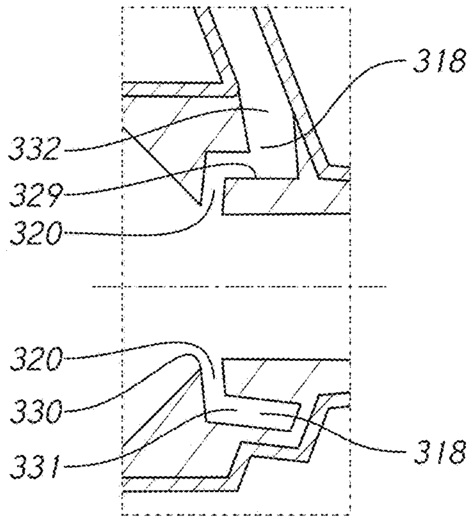
FIGS. 16B-16C illustrate an enlarged view of a portion of the particulate burner of FIG. 16A.
Figure 16C:
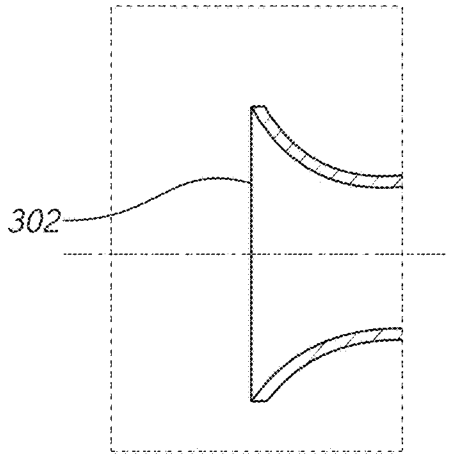
Figure 16D:
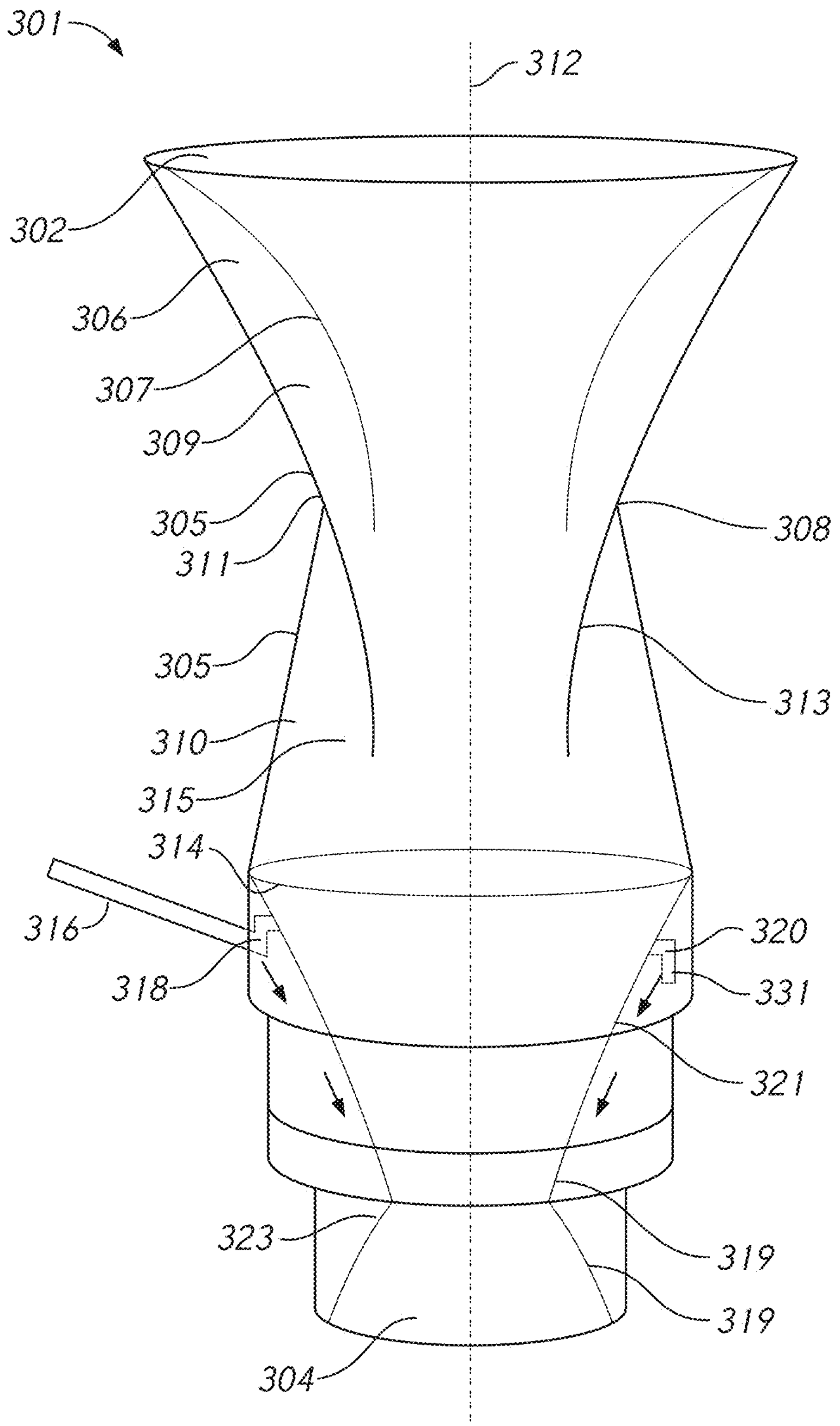
FIG. 16D illustrates another configuration of the particulate burner

A configuration of the Venturi device 300 is shown schematically in FIGS. 16A-16D. FIG. 16A illustrates a sectional view of the Venturi device 300. The Venturi device 300 can have a similar layout to that of the Venturi device 100 which changes noted below. Distinctive positions of the axis are marked by arrows and the letters B, C, D, E and F. As described above, gases can be introduced from the conduit 316 via the annular chamber 318 and the secondary input 320, which can include a ring gap 330, into the interior of the Venturi device 300. In some configurations, the ring gap 330 can be fixed once the chosen fluid is identified. In field adjustment may not be necessary to adjust a ring gap 330. In some configurations, a tapered machine union can be applied to the ring gap 330 to seal the Venturi device 300. In the area of D of the charging element (e.g., Venturi device 300) a vortex may be formed, as described in reference to FIG. 1A. This vortex creates a vacuum at the inlet 302 (location F). As a result, ambient air can be sucked into the Venturi device 300 via the inlet 302 and the throat 308 (e.g., constriction).

Since this air is compressed on the other side of the vortex (in direction C), the area of the pipe between B and E may be called a compression chamber. In sizing the Venturi device 300, the volume of the annular chamber 318 can be equal to than circumference times the area of the ring gap 330. The annular chamber 318 can be configured to receive and direct the secondary flow to the secondary input 320. In some configurations, the Venturi device 300 can include a single point annular chamber 318 for compressible fluids. In some configurations, the annular chamber 318 can include multiple uniform chambers inputs for non-compressible fluids. In some configurations, the annular chamber 318 can encircle the primary flow in a body 311 of the Venturi device 300. The annular chamber 318 can include a Coandă surface (s) configured to distribute incoming secondary flow throughout the annular chamber 318 by the secondary fluid flowing along the Coandă surface(s).

The secondary input 320 can be an annular passageway, one or more apertures, plurality of apertures, one or more slots, annular gap, and/or ring gap fluidly connected to the annular chamber 318. The annular passageway 331 can be configured to direct the secondary flow from the annular passageway 331 into the primary flow. Ambient air and exhaust gases are fused at the position corresponding to B and are pressed into the combustion chamber by passing through the outlet 304 at location C. The diameter of the outlet 304 can be similar and/or equal to the to distance between the inlet 302 and the throat 308 to produce a ratio for sizing the Venturi device 300. Also, a cross-sectional flow area of the outlet 304 can be smaller than a cross-sectional flow area of the inlet 302.

As mentioned above, the body of the Venturi device 300 can also include a throat 308, which can also be referred to as a constriction. The throat 308 can be disposed between a converging portion 306 and a diverging portion 310. The cross-sectional flow area of the converging portion 306 can be circular. In some configurations, the converging portion 306 can define a flow area having a conical shape. Further, the cross-sectional flow area of the diverging portion 310 can be circular. In some configurations, the diverging portion 310 can define a flow area having a conical shape. The converging portion 306 can be configured to increase a velocity of the primary flow and decrease a pressure of the primary flow. The diverging portion 310 can be configured to decrease the velocity of the primary flow and increase the pressure of the primary flow. A size of a cross-sectional flow area of the converging portion 306 can change more rapidly than a size of a cross-sectional flow area of the diverging portion 310 per a unit of length.

The Venturi device 300 can include a body wall 305 forming the convergence portion 306 and the diverging portion 310. An outer shell of the body wall 305 can utilize a fixed reduction angle ration between 1.25:1 to 5:1, between 1.5:1 to 4:1, between 1.75:1 to 3:1, or 2:1 to 2.5:1. The throat 308 can include a diameter that is smaller than a diameter of the converging portion 306 and a diameter of the diverging portion 310. The converging portion 310 can include a cross-sectional flow area that continuously decreases in size in the direction of flow of the primary flow. The diverging portion 310 can have a cross-sectional flow area that continuously increases in size in the direction of flow of the primary flow. A length of the diverging portion 310 can be greater than a length of the converging portion 306. The outer wall of the diverging portion 310 of the Venturi device 300 can be smaller than the outer wall of the converging portion 306. The outer wall of the diverging portion 310 of the Venturi device 300 can be 1% to 50%, 5% to 45%, 10% to 40%, 15% to 35%, 20% to 30%, or 22.5% to 27.5% smaller than the outer wall of the converging portion 306. The outer wall of the diverging portion 310 can be attached to the outer layer of the converging portion 306. The diverging portion 310 entrance can be inset into the body of the Venturi device 300 between inlet 302 and outlet 304 at a similar and/or equal distance as the length of the outlet 304 between locations B and C. Additionally or alternatively, the internal nozzle reduction angle between the throat 308 and the second converging portion 314 can be variable such that the flow rate of the fluid can be increased and create a vacuum at the first fluid dynamic check valve.

A first funnel 307 can be disposed at least partially in the converging portion 306. The first funnel 307 can be configured to attach to the converging portion 310. In some configurations, the first funnel 307 can be welded to the converging portion 310. An end of the first funnel 307 can also be configured to attach to the inlet 302 as well as along the converging portion 310. In some configuration, section 1 and the first funnel 307 can comprise a single piece that is attached to sections 3 and 4. The first funnel 307 can form a first annular space 309 between the first funnel 307 and the body wall 305.

The first funnel 307 can provide a high-pressure and low-pressure stage to capture back pressure from engine pulse waves in the exhaust. The captured back pressure can be circled back to the high-pressure primary flow. The high-pressure fluid stream can push the low-pressure back pressure against the boundary layer along the inner side of the body wall 305 to be in the first annular space 309, said fluid behavior acting as a fluid dynamic check valve. The low-pressure fluid can then be utilized to fill in the primary flow once there is a pulse, and the high-pressure fluid flow is reduced through first funnel 307, allowing the low-pressure fluid to exit from the first annular space 309 and fill in the fluid flow when the high-pressure fluid flow is reduced through the first funnel 307 because of the pulse in primary flow. The first funnel 307 can provide a higher tuned intake resonance to help amplify an intake charge (e.g., substantially continuous intake sucking/pulling of the primary flow through the inlet 302. The first funnel 307 can extend from the body wall 305 toward the central axis 312 of the body 311.

In some configurations, the Venturi device 300 can include a pseudosphere-shaped entrance comprising the first funnel 307 which can improve impulse resonance, fluid velocity, and/or the internal geometry by functioning a first fluid dynamic check valve. The first funnel 307 can be configured to create a first low pressure fluid in the first annular space 309 relative to a high-pressure fluid flow of the primary flow flowing through the first funnel 307 to pull the primary flow through the inlet 302 and into the body 311. In some configurations, the first funnel 307 can be connected to the body wall 305 at the inlet 302. The reduction in the high-pressure fluid flow of the primary flow through the first funnel 307 can cause the first low pressure fluid to at least partially exit the first annular space 309 for the first low pressure fluid to flow toward the outlet 304. A cross-sectional flow area of the first funnel 307 can continually decrease in size toward the central axis 312 in the direction of flow of the primary fluid.

A second funnel 313 can be disposed at least partially in the diverging portion 310. The second funnel 313 can function as an internal extended transition that creates a second low pressure gap. In some configurations, Section 1 and 3 of FIG. 16D can comprise one, single, and/or monolithic continuous piece of material that is attached to section 4. Section 4 can be welded to sections 1 and 3. The space between sections 1 and 3 and section 4 can create the second funnel 313. In some configurations, section 3 and 4 can comprise a one, single, and/or monolithic continuous piece of material that is configured to be attached to section 1 and 2. The second funnel 313 can extend from the body wall 305 toward the central axis 312 of the body 311, said second funnel 313 forming a second annular space 315 between the second funnel 313 and the body wall 305. The second funnel 313 can also act as a dynamic check valve similar to the first funnel 307.

The first funnel 307 and the second funnel 313 amplify the suction created by the intake charge creating a high-speed jet of fluid as well as recycling any backpressure created by the intake pulse waves from, for example, the combustion process in an internal combustion engine or other pulses in the primary flow. The second funnel 313 can be connected to the body wall 305 at a junction between the converging portion 306 and the diverging portion 310. The second funnel 313 can be configured to create a second low pressure fluid in the second annular space 315 relative to the high-pressure fluid flow of the primary flow flowing through the second funnel 313 to pull the primary flow through the inlet 302 and into the body 311. The reduction in the high-pressure fluid flow of the primary flow through the second funnel 313 can cause the second low pressure fluid to at least partially exit the second annular space 315 for the second low pressure fluid to flow toward the outlet 304. A cross-sectional flow area of the second funnel 313 can continually decreases in size toward the central axis 312 in the direction of flow of the primary fluid. Additionally or alternatively, a cross-sectional flow area at an exit of the first funnel 307 can be substantially the same as a cross-sectional flow area at an exit of the second funnel 313. The second annular space 315 can act as a second dynamic check valve. The second annular space 315 can be larger than the first annular space 309. An axial extent of the first funnel 307 can be substantially equal to an axial extent of the converging portion 306 along the central axis 312. An axial extent of the second funnel 313 is less than an axial extent of the diverging portion 310 along the central axis 312.

A secondary input 320 can be disposed between the converging portion 306 and the outlet 304. The secondary input 320 can be disposed downstream of the diverging portion 310. The secondary input 320 can be configured to direct a secondary flow of the fluid into the primary flow to create a vortex, pulling the primary flow through the inlet 302 and into the body 311. The secondary input 320 can further include a Coandă surface. In some configurations, the secondary input 320 can be configured to direct the secondary flow of the fluid into the primary flow at an angle relative to a direction of flow of the primary flow. The angle can be between 10 degrees to 170 degrees, between 20 degrees to 160 degrees, between 30 degrees to 150 degrees, between 40 degrees to 140 degrees, between 50 degrees to 130 degrees, or between 60 degrees to 120 degrees. In some configurations, the secondary input 320 can include one or more apertures 332. In some configurations, the secondary input 320 can include a plurality of apertures 332. The one or more apertures 332 can direct the secondary flow to the annular chamber 318. The annular chamber 318 can distribute the secondary flow throughout the annular chamber 318 as discussed herein via, for example, a Coandă surface.

The secondary input 320 can include an annular gap 329 which can similar or identical to the annular gap 120. The annular gap 329 can be in fluid communication with the annular chamber 318. The annular gap 329 can distribute the secondary flow through the annular gap via, for example, a Coandă surface, and direct the secondary flow into the primary flow. The secondary input 320 can also include a ring gap 330, which can be the annular gap 329. The secondary input 320 can be configured to encircle the primary flow through the body 311. In some configurations, the secondary input 320 can be configured to circumferentially encircle the primary flow through the body 311. The secondary input 320 can also include one or more openings (e.g., one or more gaps 329) circumferentially distributed about a flow path of the primary flow, said secondary input 320 configured to direct the secondary flow radially inward toward the primary flow. In some configurations, the Venturi device 300 can include a plurality of secondary inputs 320.

A conical interior surface 319 can be disposed downstream of the secondary input 320 relative to the primary flow of the fluid. The conical interior surface 319 can be configured to direct the primary flow toward the outlet 304. The conical interior surface 319 can also include a cross-sectional flow area that increases in size toward the outlet 304.

The cross-sectional flow area of the conical interior surface 319 can increase up to the outlet 304. The conical interior surface 319 can be a first conical interior surface 319 the Venturi device 300 can include a second conical interior surface 321 disposed between the diverging portion 310 and the first conical interior surface 319. The second conical interior surface 321 can be part of the second converging portion 314. The second conical interior surface 321 can be configured to direct the primary flow toward the outlet 304. The second conical interior surface 321 can include a cross-sectional flow area that decreases in size toward the outlet 304. The secondary input 320 can be configured to direct the secondary flow through the second conical interior surface 321. The secondary input 320 can be configured to direct the secondary flow between the first conical interior surface 319 and the second conical interior surface 321.

The cross-sectional flow area of the second conical interior surface 321 can converge to a size that is smaller than a cross-sectional flow area of the converging portion 306 and a cross-sectional flow area of the diverging portion 310. The first conical interior surface 319 and the second conical interior surface 321 can converge to form a throat 323 having a smallest diameter and smallest cross-sectional flow area relative to the first conical interior surface 319 and second conical interior surface 321.

As shown in FIG. 16A, a combustion chamber 328 can be disposed at the outlet 304. The combustion chamber 328 can include one or more fuel burners and/or racks to burn the incoming primary and secondary flows as discussed herein. The centrifugal housing shape of the combustion chamber 328 can allow a flame in the combustion chamber 328 to be recirculated and recycled such that there is complete combustion of the injected flows. The combustion chamber can be configured to sustain a high heat that can allow for a clean burn of particulate matters. Once the primary and secondary flows are passed through the combustion chamber and burned completely, the primary and secondary flows can flow into the internal combustion chamber. The combustion chamber can reach temperatures between 400° C. to 1200° C., between 1600° C. to 1900° C., between 600° C. to 1000° C., or between 700° C. to 900° C. to produce a clean burn of the particulate matter.

The diameter of the inlet opening 302 may be different depending on driving speed (if the particulate burner is to be used in a vehicle). At higher driving speeds, the inlet opening 302 may be reduced. At lower driving speeds, the inlet opening may be enlarged. The size of the inlet may also be adjusted with relation to engine size, horsepower, and vehicle top speed. The diameter of the inlet opening 302 can differentiate depending on the driving speed (in case the particulate burner is used in a vehicle) to optimize the flow rate of the primary fluid and to assist in the burning of emissions. The geometry of inlet opening 302 can be directly related to mathematical volume induction of the engine or mechanical device the particulate burner is connected to. These measurements can be adjusted with relation to engine size, horsepower, and vehicle top speed. For example, in cases of an overall top speed of 180 mph, an induction force can be utilized to magnify the output effect of the particulate burner. The same applies to the opposite end of the spectrum in example such that a 30-mph top speed will require a smaller point inlet opening 302 with a less aggressive reduction angle to achieve desired results.

Further, the inlet of ambient air (FIG. 16C in FIG. 16A) could be formed like velocity stack allowing smooth and even entry of air at high velocities. Here, also resonance effects can be observed which promote the induction of the generation of the vortex. In addition, the inside wall of the Venturi device 300 can include a radius entry and/or "plenum." A velocity stack, trumpet, or air horn, is a trumpet-shaped design having differing lengths which can be used at the inlet 302. These designs can allow smooth and even entry of air at high velocities with the flow stream adhering to the walls—known as laminar flow. Additionally or alternatively, modifications can be made to the dynamic tuning range of the intake tract by functioning as a resonating pipe which can adjust the frequency of pressure pulses based on its length within the tract. Modern engines can have tuned intake tract volumes and associated resonance frequencies designed to provide higher than atmospheric intake air pressure while the intake valves are open. These intake tract volumes can increase the density of the trapped air in the combustion chamber providing for higher compression.

The systems, particulate burner, particulate burner systems, and Venturi devices 300 can be made with varying dimensions. Some non-limiting example dimensions for the particulate burner according to FIG. 16A are below:

- Length between (D) and (C)=between 6.00 inches and 7.00 inches
- Ring gap 120=between 0.001 inches and 0.003 inches
- Inner diameter (further referred as "I.D.") at B=between 1.57 and 1.68 inches
- Reduction angle between (D) and (B)=between 35° and 55°
- Reduction angle between (C) and (B)=between 55° and 65°
- I.D. at (C)=between 1.63 inches and 2.05 inches
- I.D. at (D)=between 3.25 inches and 4.01 inches
- Length between (D) and (E)=between 4.50 and 6.00 inches
- Reduction angle between (D) and (E)=30° and 53°
- I.D. at (E)=between 1.25 inches and 2.35 inches
- Reduction angle between (F) and (E)=between 33° and 41°
- Length between (F) and (E)=between 4.00 inches and 6.00 inches
- Conduit 316 is steel tubing with I.D. of between 0.75 inches to 1.00 inches
- Converging portion 306 is modified pressure activated heat riser butterfly valve
- (F), the inlet 302, can be made of elastic polymer or programmable metallic polymer to adjust opening in correspondence to incoming intake pressure. Area between (E) and (F) can be made of an elastic polymer or a programmable metallic polymer to adjust the opening according to the input pressure applied (e.g., different dynamic pressure at different driving speeds if the particulate burner should be installed in a vehicle).
- At the ring gap 330, a Coandă effect profile of 35° to 80° can be applied.
- The ring gap 330 can have a 70-degree angle cut into the edge of the ring.

The Venturi device 300 can be constructed out of dissimilar metals. By doing so, the dissimilar metals can create friction at internal points of compression. Further, the dissimilar metals can reduce friction to create higher efficiency boundary layers for fluid acceleration of compressed fluid to the intake charge.

A method for converting thermal energy into electrical energy or another form of energy, characterized in that for the conversion of heat into electrical energy or another form of energy, a heat engine is used, which is based on a suction effect. The suction effect can be generated by a vortex in a flowable medium. The generation of the vortex can be caused directly by the flow of a free-flowing medium. Due to the suction effect, flowable medium can be sucked in, there can be a drop in temperature in the flowable medium sucked in, and the flowable medium sucked in can absorb energy in the form of heat and thus increases its internal energy. The energy absorbed in the flowable medium can be withdrawn from the medium again. The energy stored in the flowable medium can be withdrawn via a combination of turbine and electric generator. The energy withdrawn can be withdrawn in the form of electrical energy. The generation of the vortex can take place in a component (hereinafter referred to as "VFC"), which resembles a tube and whose inner diameter can assume different values along its axis. The component can have an opening into which a flowable medium can be introduced. A vortex can be generated in the interior of the component, which can cause the suction effect. Flowable medium can be sucked in on one side of the vortex and expelled on the other side of the vortex. The flowable medium can flow through the component by flowing in at the front and out at the back. Thermal energy can be transferred to a flowing fluid medium by one or more VFC's. By increasing the internal energy of the fluid medium, this process can be referred to as "charging." Internal energy can be withdrawn from the flowing fluid medium, which can be referred to as "discharge." A part of the energy withdrawn by means of discharge can be fed to the apparatus to compensate for energy losses in such a way that the cycle of charging and discharging of the flowing flowable medium is maintained.

A method in which the energy from the exhaust gases of internal combustion engines is used to charge them with ambient air or to charge them with a mixture of ambient air and fuel (particulate burner). In some configurations, no mechanically moving components or mechanically moving device compartments may be used. A vortex may be generated in an apparatus by means of a gas flow. This vortex may create a vacuum or negative pressure on one side. Ambient air or a mixture of ambient air and fuel may be sucked in by means of this negative pressure. This ambient air or mixture of ambient air and fuel can be expelled or compressed on the other side of the vortex and directed into the internal combustion engine. The vortex can be induced by exhaust gases from the internal combustion engine.

The systems, devices, and components thereof can be made of a variety of materials such metals (such as steel, aluminum, and/or others), metal alloys, polymers (such as plastic), ceramics, shape memory materials, and/or other suitable materials. The systems, devices, and components thereof can be galvanized, painted, zinc coated, powder coated, vinyl coated, plastic dripped, textured, and/or finished with other materials or methods.

Although the systems and methods have been disclosed in the context of certain configurations and examples, it will be understood by those skilled in the art that the systems and methods extend beyond the specifically disclosed configurations to other alternative configurations and/or uses of the configurations and certain modifications and equivalents thereof. Various features and aspects of the disclosed configurations can be combined with or substituted for one another to form varying modes of the conveyor. The scope of this disclosure should not be limited by the particular disclosed configurations described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Stealth Ordnance Thruster System

Figure 17:
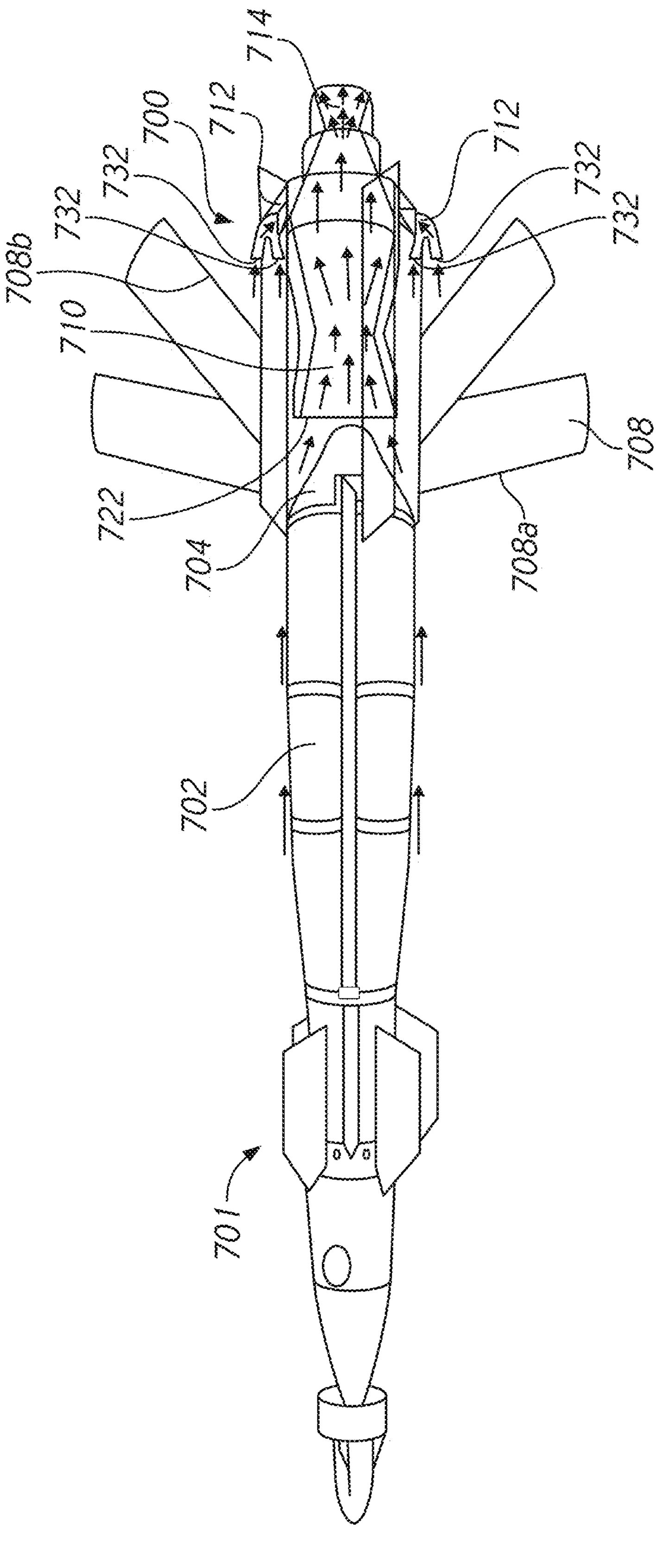
FIGS. 17 and 18 illustrate a stealth ordinance munition system.
Figure 18:
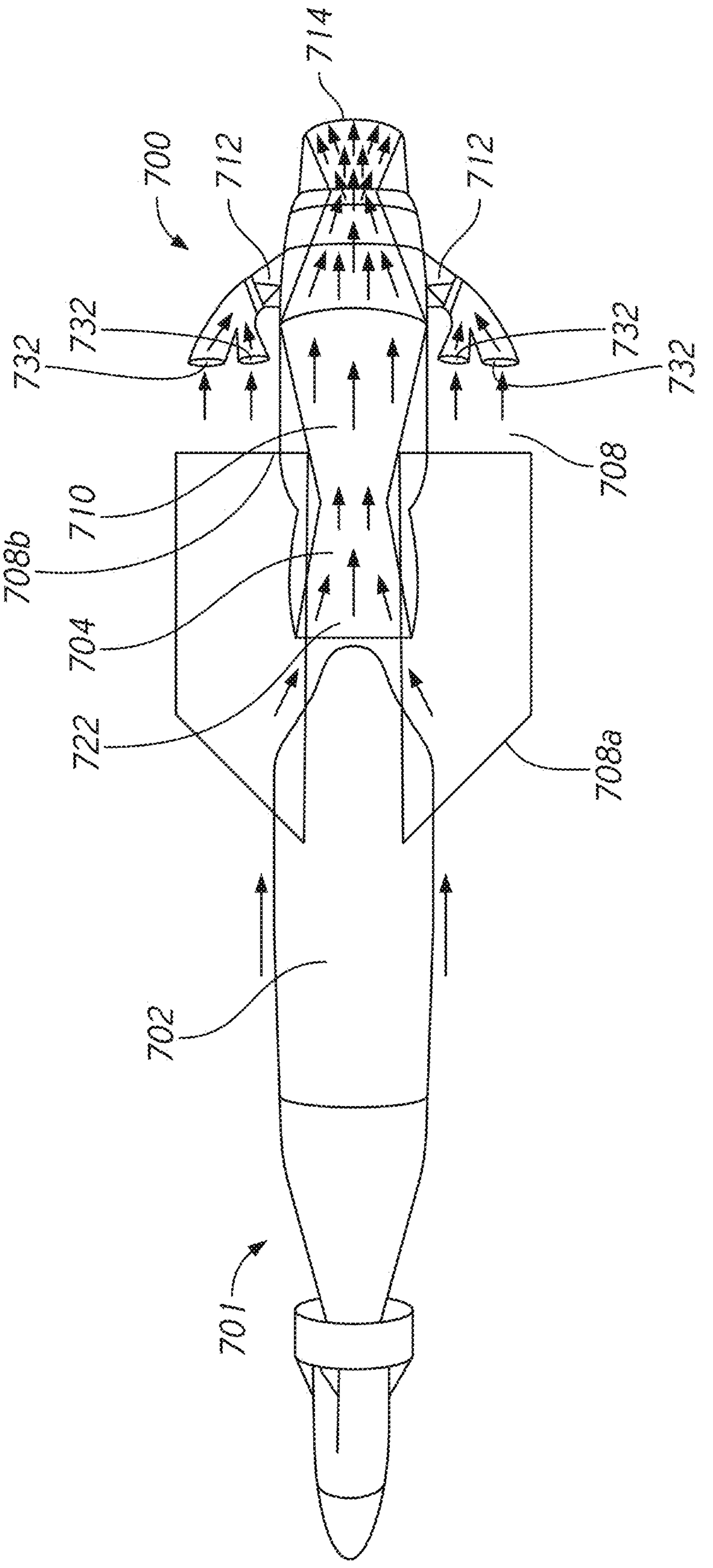
Figure 19A:
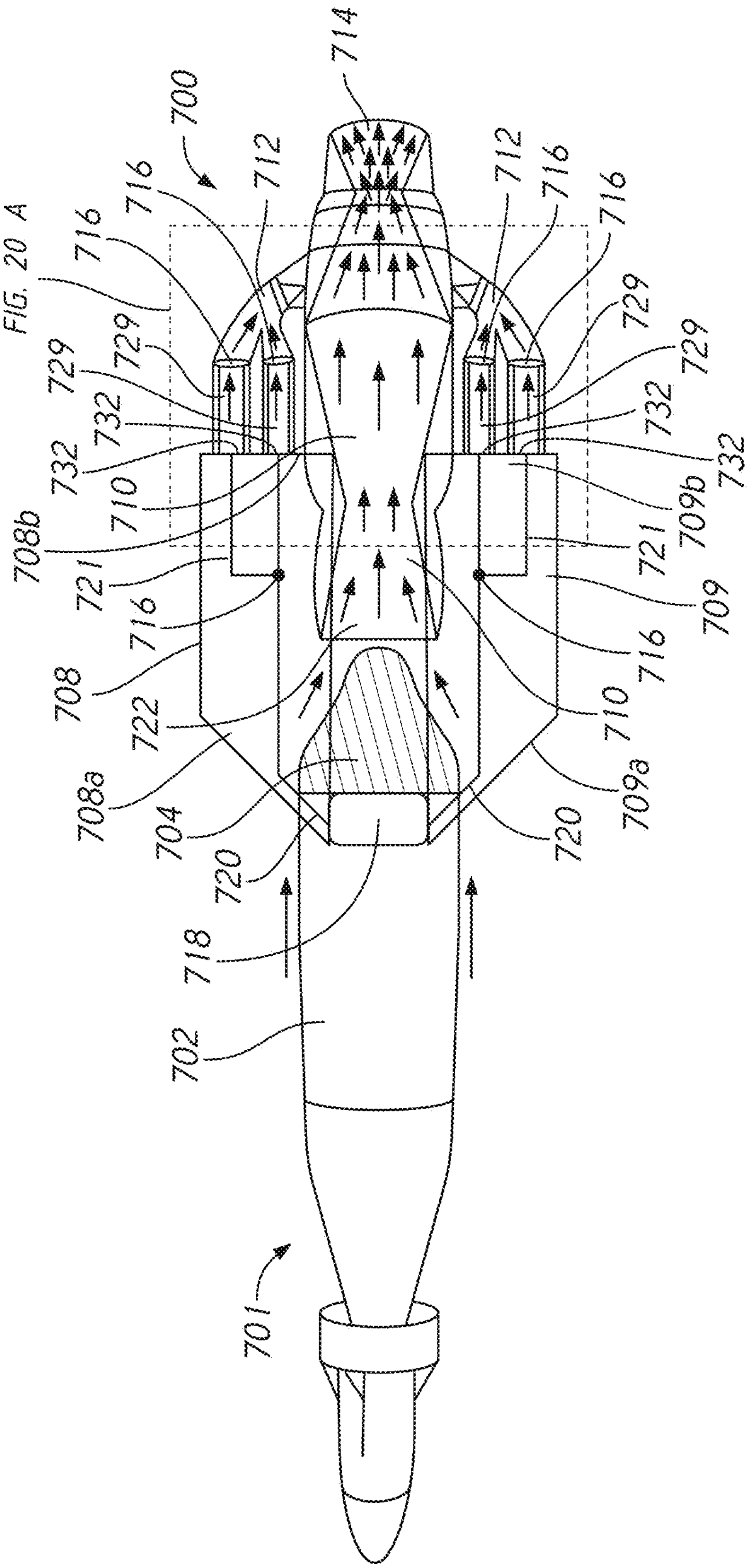
FIGS. 19A-19D illustrate various configurations of a stealth ordinance munition system.
Figure 19B:
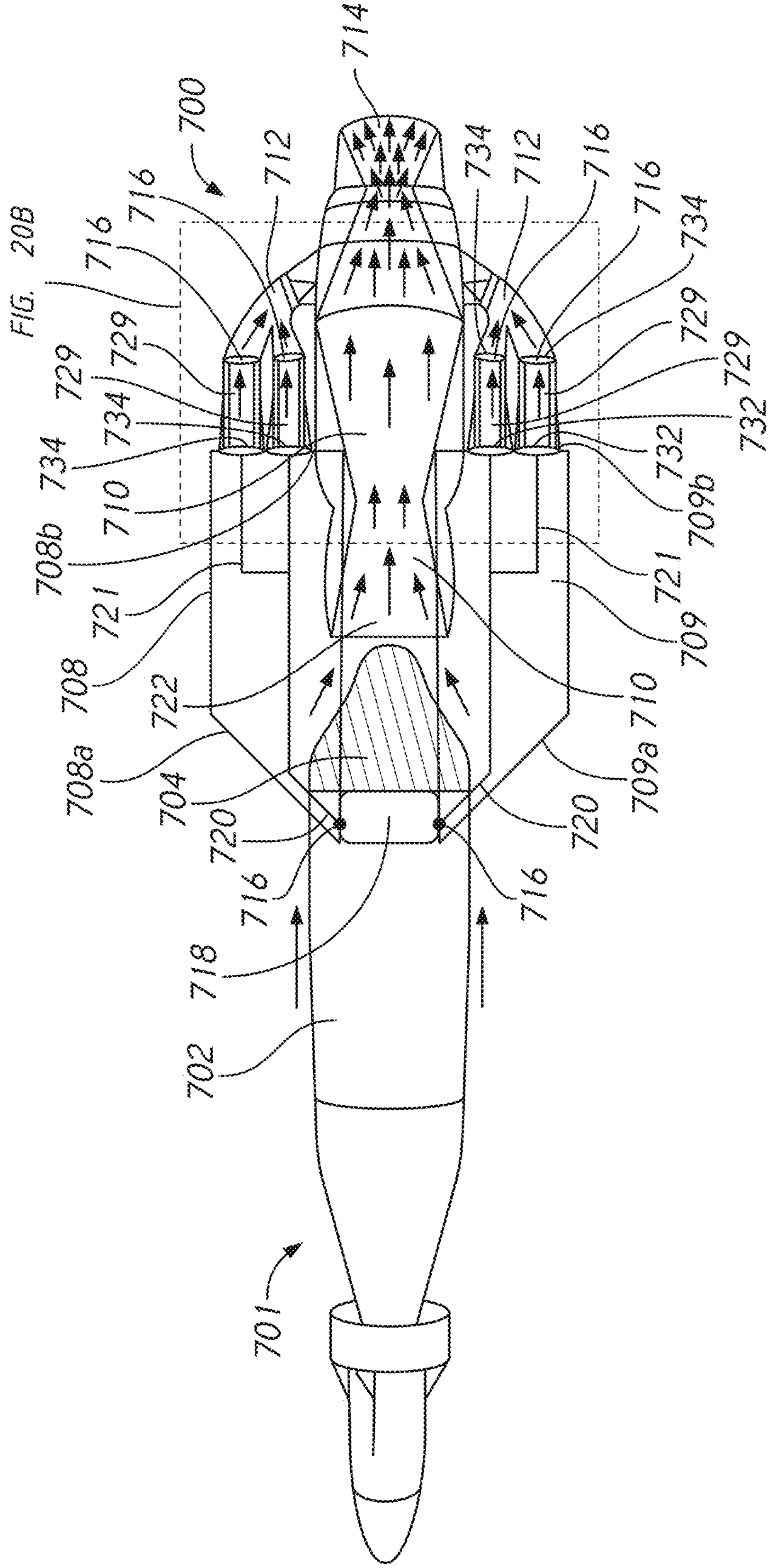
Figure 19C:
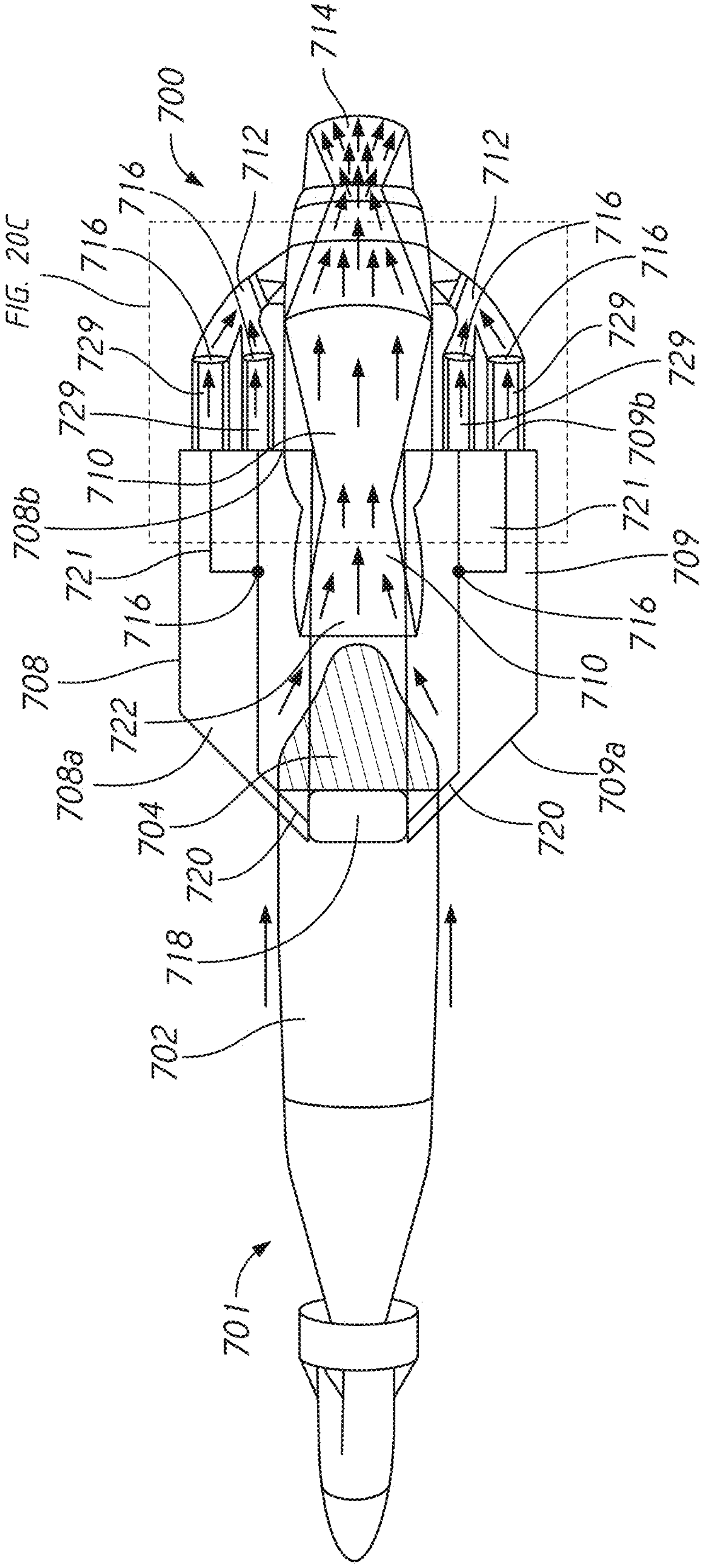
Figure 19D:
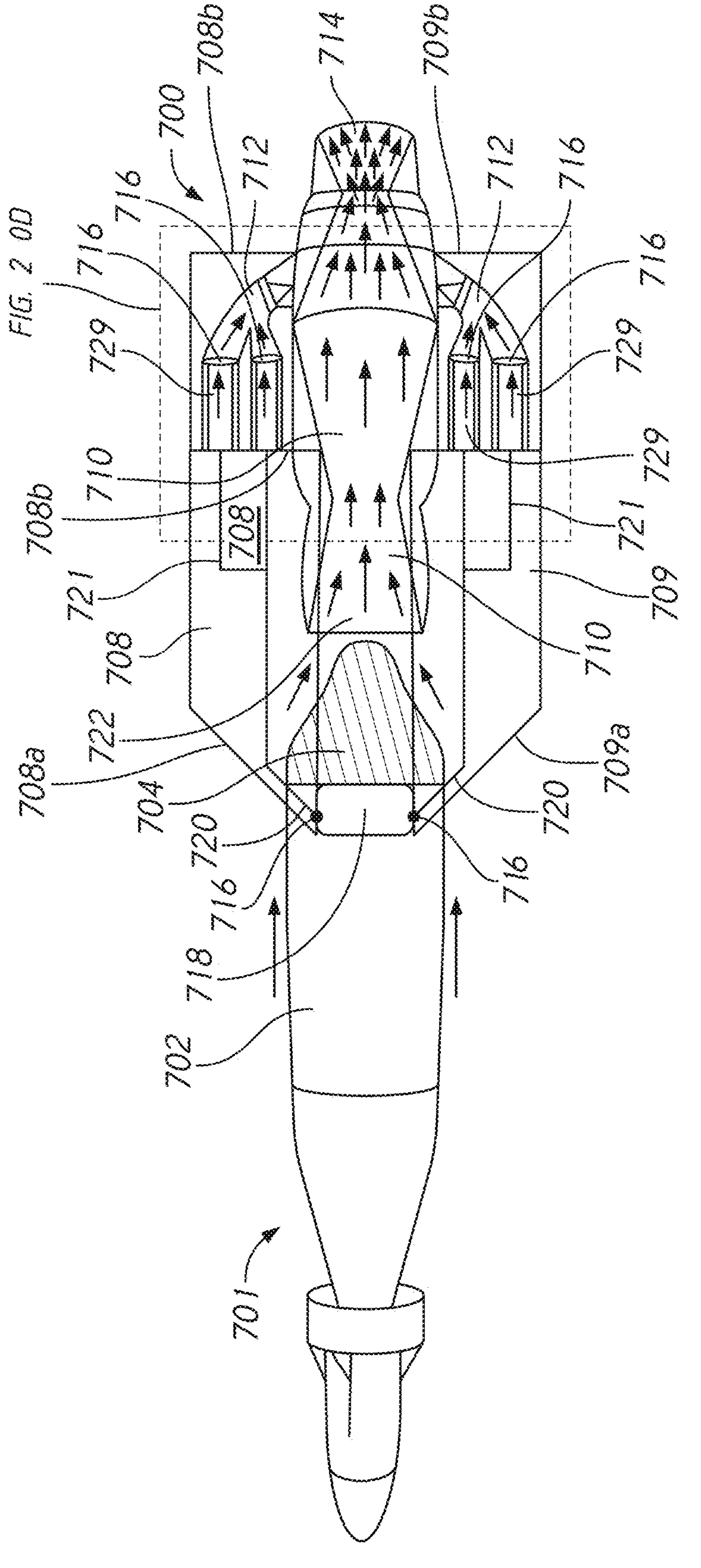
Figure 20B:
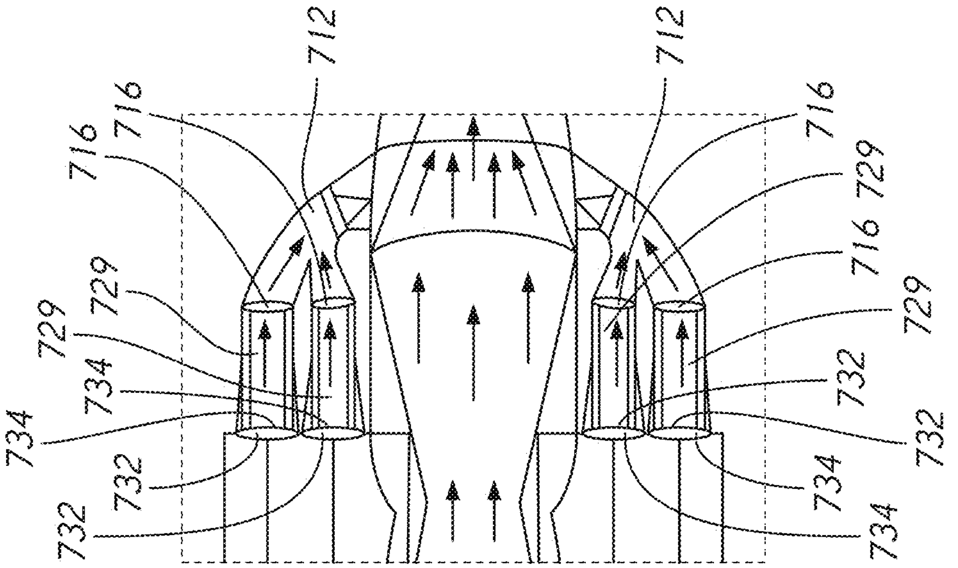
FIGS. 20A-20D illustrate enlarged views of a portion of the stealth ordinance munition system of FIGS. 19A-19D.
Figure 20A:
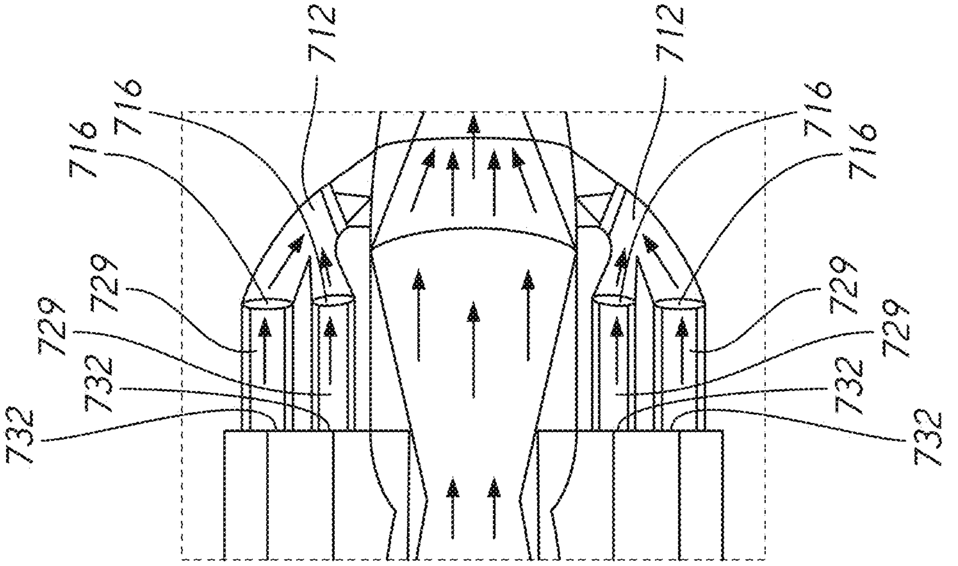
Figure 20D:
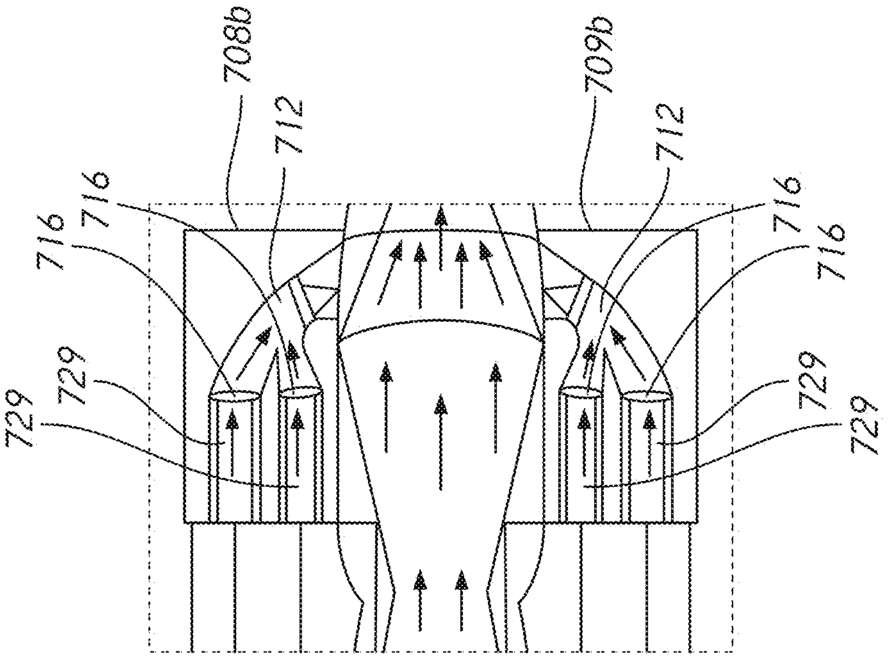
Figure 20C:
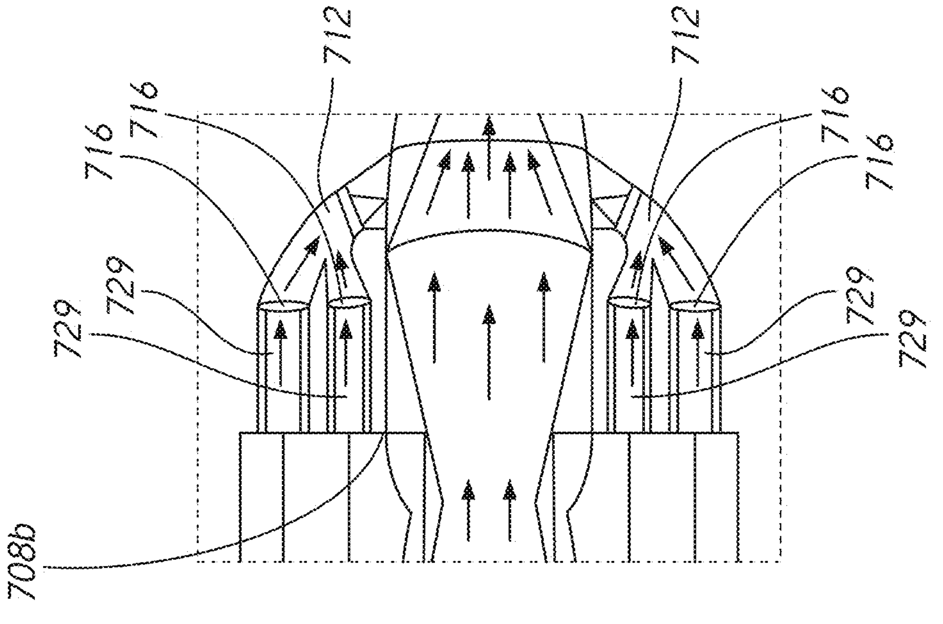
Figure 21:
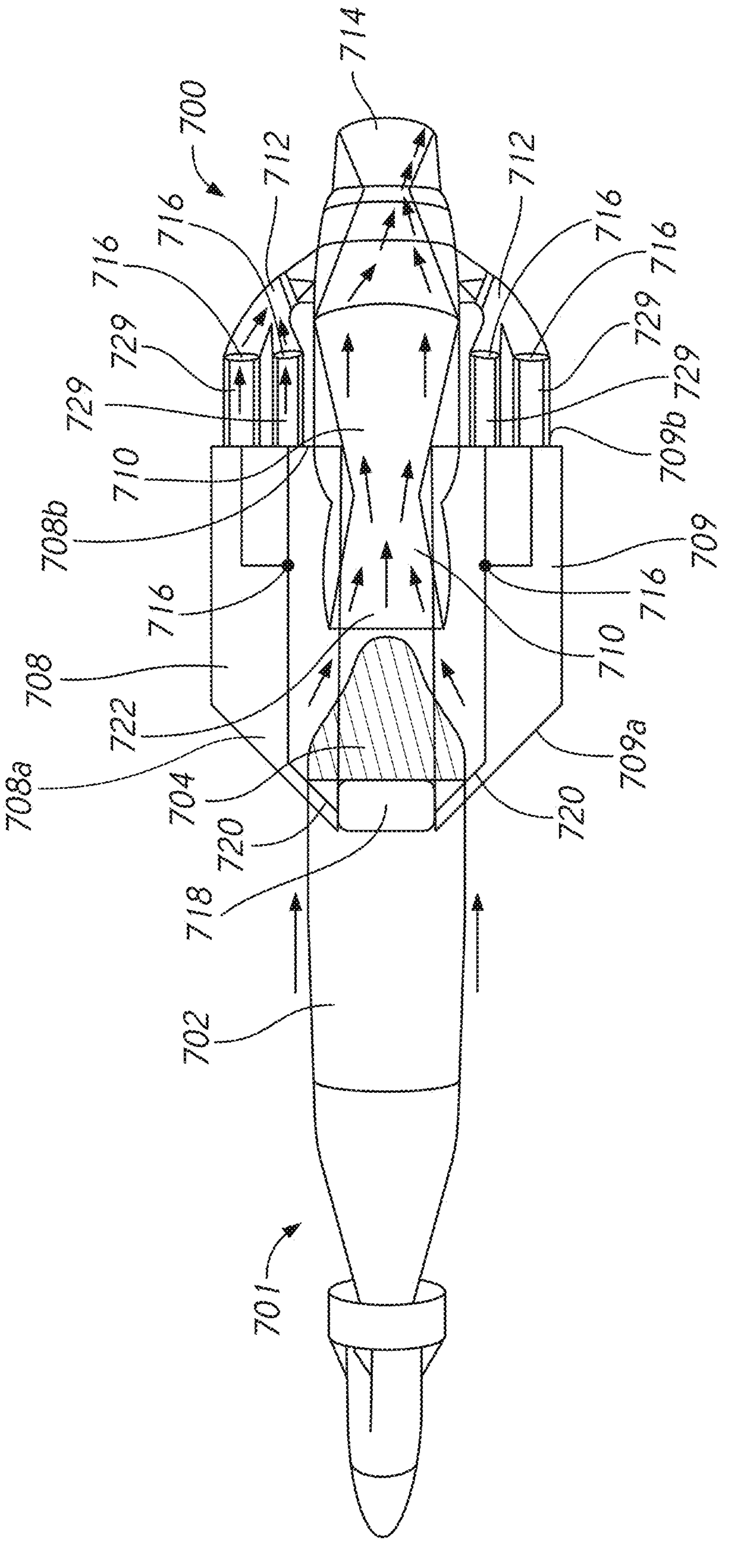
FIG. 21 illustrates a thrust vectoring maneuver of the stealth ordinance munition system of FIGS. 17 and 19.
Figure 22A:
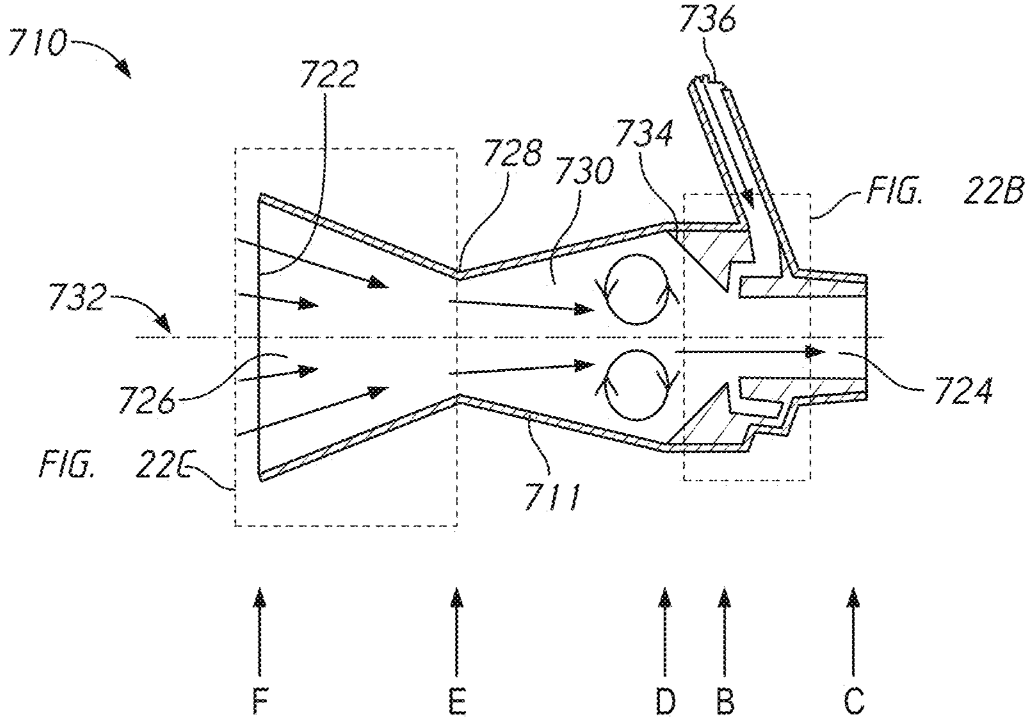
FIG. 22A-22C illustrates a detailed schematic of the stealth ordinance munition system in FIGS. 17 and 18.
Figure 22B:
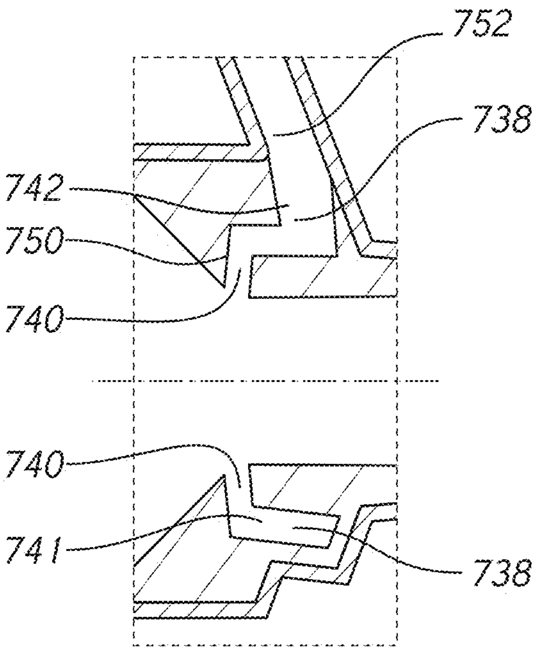
Figure 22C:
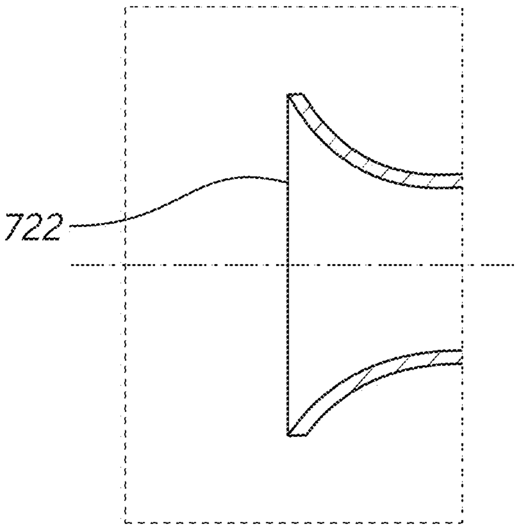

FIGS. 17-18 illustrate a section view of a thruster system 700 configured to propel a munition for deep earth penetration, which can also be referred to as a stealth ordinance thruster system, with FIGS. 19A-20D illustrating different configurations of the stealth ordinance munition system in FIGS. 17 and 18, with FIG. 21 illustrating a thrust vectoring maneuver, and with FIG. 22A-22C illustrating schematic views of the Venturi device 710. The thruster system 700 and Venturi device 710 can utilize the combination of the Coandă effect, Venturi effect, and improvements in boundary layer dynamics in closed and/or open systems to improve propulsion and power generation by non-mechanical means.

The thruster system 700 can be configured to be integrated with a munition 701 having an aerodynamic body 702. The thruster system 700 can include a transfer cone 704 connected to the munition body 702 directing a primary flow of a fluid along a surface of the transfer cone 704 from a surface of the munition body 702, one or more stabilizer fins 708 having a leading edge 708*a* and a trailing edge 708*b*, a Venturi device 710 (which can be similar and/or identical to the Venturi device 100 described in FIG. 1A and/or identical to the Venturi device 300 described in FIG. 16A-16C) positioned downstream of the transfer cone 704, one ore more side inlets 712, an exit nozzle 714, one or more valves 716, a storage tank 718, one or more propellant passage ways 720 (also mentioned herein as "channels"), and one or more pipes 729. In some configurations, the Venturi device 710 is connected to the stabilizer fin 708. In some configurations, the Venturi device 710 is connected to at least one of the transfer cone 704 and/or the munition body 702 via the stabilizer fin 708. In some configurations, Venturi device 710 is connected to at least one of the transfer cone 704 and/or the munition body 702 without being connected to the stabilizer fin 708.

The stabilizer fins 708 can be connected to at least one of the transfer cone 704 and/or the munition body 702. The stabilizer fins 708 can extend radially outward relative to at least one of the surface of the transfer cone 704 or the surface of the munition body 702 to stabilize the munition body 702. The stabilizer fins 708 can be of any shape and/or size to provide control and/or maneuverability of the munition 701 to its intended target. Any number of stabilizer fins 708 can be used to maneuver the munition 701 such as two stabilizer fins, four stabilizer fins, six stabilizer fins, and so on. Control surfaces can be disposed along the leading and/or trailing edges to assist in longitudinal and/or directional maneuvering of munition as well as to provide precise adjustments to the flight path. The control surfaces can be powered by a fuel cell embedded in the thruster system 700 at any suitable location. While being airborne, the stabilizer fins 708 can provide additional lift forces during storage onboard the host aircraft which can assist in increasing the range and/or flight performance of the host aircraft. Stabilizer fins 708 can also be positioned on a forward section of the munition body 702 provide additional stability and control.

The thruster system 700 can also include an other stabilizer fin 709 connected to at least one of the transfer cone 704 and/or the munition body 702 which can be similar or identical to the stabilizer fin 708. The other stabilizer fin 709 can extend radially outward relative to at least one of the surface of the transfer cone 704 and/or the surface of the munition body 702 to stabilize the munition body 702. The other stabilizer fin 709 can include one or more channels 720 along the other stabilizer fin 709. The one or more channels 720 of the other stabilizer fin 709 can be connected to the storage tank 718 to direct propellant (e.g., nitrogen) from the storage tank 718 along an extent of the other stabilizer fin 709. The secondary flow can include the propellant (e.g., nitrogen) directed from the storage tank 718 to the secondary input 740 through the one or more channels 720 of the other stabilizer fin 709 along the other stabilizer fin 709 to provide thrust to the munition 701.

In some configurations, the propellant stored in the storage tank can be a liquid that vaporizes into a gas before the liquid reaches the side inlets 712. In some configurations, the propellant flowing from the storage tank can be a gas that remains a gas that is exhausted from the exit nozzle 714. In some configurations, the other stabilizer fin 709 can be positioned 180 degrees apart from the stabilizer fin 708 about a central axis of the munition body 702.

The storage tank 718 can be positioned in a hollowed portion of the munition body 702 in the forward and/or aft area. In some configurations, the storage tank 718 can be in at least one of the transfer cone 704 and/or the munition body 702. The storage tank 718 can store a pressurized propellant such as a gas and/or liquid that can be expelled from the storage tank 718. By releasing a propellant, such as nitrogen or inert gasses, through the thruster system 700, the thruster system can disappear to thermal imaging as the munition 701 approaches the target. In storing a propellant that is not a combustible element such as in a typical combustion-propelled ordinance, any unspent combustible material exploding before the munition 701 reaches the intended depth of its target can be avoided. In some configurations the storage tank 718 can be of a bladder type that changes shape as the propellant is transferred form the storage tank.

Additionally or alternatively, the storage tank 718 can be compartmentalized such that different compartments can store different propellants contemporaneously. The storage tank 718 can be pressurized prior to loading onto the host vehicle and/or while the munition 701 is being attached to the host aircraft. The storage tank 718 can store a propellant that can be used to stealthily propel the munition 701 towards a target at a high rate of speed. The thruster system 700 can increase the speed of the munition by a factor of at 1, of at least 2, of at least 3, of at least 4, of at least 5, or of at least 10 times the normal operating speed. The storage tank 718 can contain a sufficient quantity of propellant to propel the munition 701 for at least 5 seconds, for at least 10 seconds, for at least 30 seconds, for at least 60, for at least 90 seconds, for at least 180 seconds, or for at least 600 seconds. The storage tank 718 can store a variety of propellants such as inert gases (e.g., nitrogen), liquids (e.g., liquid nitrogen), and/or solid propellants. The munition 701 can reach its top speed between 20 to 30 seconds after jettison from the host aircraft before any propellant is released. Releasing the propellant just before impact can isolate the event and can lower the possibility of collateral damage. In some configurations, the storage tank 718 can store liquid nitrogen that phase changes into a gas for injection into the primary flow from the secondary input.

The stabilizer fins 708 can include one or more channels 720 along the stabilizer fins 708. The channels 720 can be connected to the storage tank 718 in such a way that the channels 720 can direct a propellant from the storage tank 718 along an extent of the stabilizer fins 708. The channels 720 can diverge from one main channel to a plurality of channels. This can advantageously allow the propellant to be diverted to different channels to influence the amount of propellant reaching the thruster system 700. In some configurations, the channels 720 can be connected to the to the side inlets 712 by passing the propellant (e.g., nitrogen) through the pipes 729. The pipes 729 can be round, oval, square, rectangular, or any other shape depending on its positioning along the stabilizer fin 708. In some configurations, the one or more channels 720 include one or more tubes 721 extending along the extent of the stabilizer fin 708. The one or more tubes 721 can be in the stabilizer fin 708.

The one or more channels 720 can also be positioned in the stabilizer fin 708 to reduce any turbulent forces at hypersonic speeds. In some configurations, the channels 720, tubes 721, tubes 729, and/or inlet 712 can be positioned in the stabilizer fin 708 to reduce turbulent forces at high speeds. By positioning the channels 720, tubes 721, tubes 729, and/or inlet 712 in the stabilizer fins 708, 709, the stabilizer fin 708 can maintain a consistent profile with limited irregularities and disturbances along the surfaces of the munition 701. Housing the components withing the stabilizer fins 708 and/or munition body 702 can assist in maintaining a laminar flow along the surface of the munition 701 and limit any turbulent effects or separating of the air flow from the surfaces of the stabilizer fin 708 and/or any control surfaces connected to the stabilizer fins. Additionally or alternatively, housing the channels 720, tubes 721, tubes 729, and/or inlet 712 in the stabilizer fins 708, 709 can the reduce turbulence at Mach 2, Mach 3, Mach, 4, Mach 5, and higher as slight movements can cause large changes in direction or orientation. Higher Mach ranges above Mach 2 can be achieved by jettisoning the munition 701 at altitudes of 100,000 feet or more, which can allow the munition 701 to achieve a sufficient speed to classify munition 701 as a hypersonic ordinance.

The pipes 729 can include inlet openings 732 which draw in ambient air as well as the propellant transported though the channels 720. The secondary flow flowing through the secondary input can include ambient air directed from the surface of the stabilizer fins 708 into a secondary input 740. In some configurations, the secondary input 740 can include one or more pipes 729 extending from the body 711 of the Venturi device 710 to a trailing edge **708*b* of the stabilizer fin 708, the one or more pipes 729 each comprising an opening 732 at the trailing edge 708*b* of the stabilizer fin 708 to draw ambient air into the one or more pipes 729 to direct ambient air into the secondary input 740. In some configurations, the one or more pipes 729 of the secondary input 740 each comprise a funnel 734 at the trailing edge 708*b* of the stabilizer fin 708, said funnel 734 configured to draw in ambient air around the surface stabilizer fin 708 into the one or more pipes 729. The funnel 734 can have a larger diameter than a diameter of the corresponding pipe 729 of the secondary input 740**.

FIG. 21 illustrates a thrust vectoring maneuver by the munition 701. In some configurations, four sets of inlets 712 spaced 90 degrees apart can be used for thrust vectoring, but any number can be used. A valve 716 can be disposed on each of the one more channels 720 in the stabilizer fin 708 and/or the other stabilizer fin 709. The valve 716 can be configured to control flow of the propellant from the storage tank 718 to the secondary input 740. In some configurations, the propellant can be nitrogen and/or liquid nitrogen. In some configurations, the valve 716 can be disposed on the secondary input 740 such that the valve 716 is configured to control flow of the secondary flow through the secondary input 740.

Adjusting the flow of the secondary flow through the secondary input 740 can control the direction and force of the thrust of the munition 701. The valves 716 can opened and/closed to regulate the flow of propellant to the Venturi device 710. By stopping and/or limiting the flow of propellant from one side of the thruster system 700, a low-pressure area can form the low-pressure side causing the propellant flow from the high-pressure side to start flowing to the low-pressure side. The flow of pressure from the high-pressure side to the low-pressure side alters the direction of the thrust flowing through the exit nozzle 714. Depending on the amount of propellant needed for a specific maneuver, the valves 716 can open or close to adjust the rate of to the thruster system 700. The thrust vectoring capabilities can act in a pitch direction or a yaw direction depending on which of the valves are opened and/or closed and the orientation of the munition 701. In one configuration, reducing the secondary flow through the secondary input 740 closest the other stabilizer fin 709 can cause a lower pressure area to form in the Venturi device 710 at side of the other stabilizer fin 709 relative to pressure in the Venturi device 710 at the stabilizer fin 708. Thus, propellant flowing through the Venturi device 710 flows toward the other stabilizer fin 709 to result in a greater propellant flow proximate the other stabilizer 709 through the exit nozzle 714 to provide thrust to the munition 701 in a direction of the stabilizer fin 708.

As described above, propellants are introduced from the conduit 736 via the annular chamber 738 and the secondary input 740, which can include a ring gap 750, into the interior of the Venturi device 710. In the area of D of the Venturi device 710, a vortex may be formed, as described in reference to FIG. 1A. This vortex creates a vacuum at the inlet 722 (location F). As a result, ambient air can be sucked into the Venturi device 710 via the inlet 722 and the throat 728 (e.g., constriction).

Since this air is compressed on the other side of the vortex (in direction C), the area of the pipe between B and E may be called a compression chamber. The annular chamber 738 can be configured to receive and direct the secondary flow to the secondary input 740. In some configurations, the Venturi device 710 can include a single point annular chamber 738 for compressible propellants. In some configurations, the annular chamber 738 can include multiple uniform chambers inputs for non-compressible propellants. In some configurations, the annular chamber 738 can encircle the primary flow in a body 711 of the Venturi device 710. The annular chamber 738 can include a Coandă surface(s) configured to distribute incoming secondary flow throughout the annular chamber 738 by the secondary fluid flowing along the Coandă surface(s).

The secondary input 740 can be an annular passageway, one or more apertures, plurality of apertures, one or more slots, annular gap, and/or ring gap fluidly connected to the annular chamber 738. The annular passageway 741 can be configured to direct the secondary flow from the annular passageway 741 into the primary flow. Incoming fluids from the inlets 712 and conduit 736 can fused at the position corresponding to B and are exhausted out of the thruster system 700 by passing through the outlet 724 at location C.

As mentioned above, the body of the Venturi device 710 can also include a throat 308, which can also be referred to as a constriction. The throat 728 can be disposed between a converging portion 726 and a diverging portion 730. The cross-sectional flow area of the converging portion 726 can be circular. In some configurations, the converging portion 726 can define a flow area having a conical shape. Further, the cross-sectional flow area of the diverging portion 730 can be circular. In some configurations, the diverging portion 730 can define a flow area having a conical shape. The converging portion 726 can be configured to increase a velocity of the primary flow and decrease a pressure of the primary flow. The diverging portion 730 can be configured to decrease the velocity of the primary flow and increase the pressure of the primary flow. A size of a cross-sectional flow area of the converging portion 726 can change more rapidly than a size of a cross-sectional flow area of the diverging portion 730 per a unit of length.

The Venturi device 710 can include a body wall 711 forming the convergence portion 726 and the diverging portion 730. An outer shell of the body wall 711 can utilize a fixed reduction angle ration between 1.25:1 to 5:1, between 1.5:1 to 4:1, between 1.75:1 to 3:1, or 2:1 to 2.5:1. The throat 728 can include a diameter that is smaller than a diameter of the converging portion 726 and a diameter of the diverging portion 730. The converging portion 726 can include a cross-sectional flow area that continuously decreases in size in the direction of flow of the primary flow. The diverging portion 730 can have a cross-sectional flow area that continuously increases in size in the direction of flow of the primary flow. A length of the diverging portion 730 can be greater than a length of the converging portion 726.

A secondary input 740 can be positioned between the converging portion 726 and the outlet 724. The secondary input 740 can be disposed downstream of the diverging portion 730. The secondary input 740 can be configured to direct a secondary flow of the fluid into the primary flow to create a vortex for producing a suction at the inlet to pull the primary flow through the inlet 722 and into the body 711 to increase the primary flow through the outlet to propel the munition for deep earth penetration. The secondary input 740 can connected to the one or more channels 720 such that the secondary flow of fluid comprises nitrogen directed from the storage tank 718 to the secondary input 740 through the one or more channels 720 along the stabilizer fin 708 to provide thrust to the munition 701. In some configurations, the secondary flow of fluid consists of nitrogen directed from the storage tank 718 to the secondary input 740 through the one or more channels 720 along the stabilizer fin 708 without other fluids passing through the secondary input 740. In some configuration, the stabilizer fin 708 extends along the body 711 of the Venturi device 710 axially to the secondary input 740 to connect to the body 711 of the Venturi device 710 at the secondary input 740, the one or more channels 720 connecting to the secondary input 740 at the connection between the stabilizer fin 708 and the body 711 of the Venturi device 710.

The secondary input 740 can further include a Coanda surface. In some configurations, the secondary input 740 can direct the secondary flow of the fluid into the primary flow at an angle relative to a direction of flow of the primary flow. The angle can be between 10 degrees to 170 degrees, between 20 degrees to 160 degrees, between 30 degrees to 150 degrees, between 40 degrees to 140 degrees, between 50 degrees to 130 degrees, or between 60 degrees to 120 degrees. In some configurations, the secondary input 740 can include one or more apertures 752. In some configurations, the secondary input 740 can include a plurality of pipes 752. The one or more apertures 752 can direct the secondary flow to the annular chamber 738. The annular chamber 738 can distribute the secondary flow throughout the annular chamber 738 as discussed herein via, for example, a Coandă surface. The one or more apertures 752 can be fluidly connected to the one or more channels 720 for the secondary input 740 to be in closed fluid communication with the one or more channels 720. In some configurations, the one or more apertures 752 can increase in cross-sectional flow area from the one or more channels 720 in a direction of flow of the secondary fluid through the secondary input 740.

The secondary input 740 can include an annular gap 742 which can similar or identical to the annular gap 120 and/or 320. The annular gap 742 can be in fluid communication with the annular chamber 738. The annular gap 742 can distribute the secondary flow through the annular gap via, for example, a Coandă surface, and direct the secondary flow into the primary flow. The secondary input 740 can also include a ring gap 750, which can the annular gap 742. The secondary input 740 can be configured to encircle the primary flow through the body 711. In some configurations, the secondary input 740 can be configured to circumferentially encircle the primary flow through the body 711. The secondary input 740 can also include one or more openings (e.g., one or more gaps 742) circumferentially distributed about a flow path of the primary flow, said secondary input 740 configured to direct the secondary flow radially inward toward the primary flow. In some configurations, the Venturi device 710 can include a plurality of secondary inputs 740.

Using precision round geometry, non-Euclidean engineering, and a ring gap 740 design in the Venturi device 710 (which can correspond to the ring gap 120 of the Venturi device 100), the thruster system 700 can recover pressure and create a higher output velocity and density when shutting off back pressure. Non-Euclidean engineering uses elliptical or hyperbolic lines instead of straight, parallel lines. The use of non-Euclidean lines can improve or limit the turbulence in a flow.

The Coanda effect combined with the Venturi effect occurring in the Venturi device 710 can create improvements in the transfer of momentum and density of a fluid, along with reduced energy losses, using the thruster system 700. The flow of the primary flow through the converging portion 726, throat 728, and/or diverging portion 730 can produce a Venturi effect, which can create a suction at the inlet 722. The suction at inlet 722 can accelerate the fluid flowing into the Venturi device 710 and thus causing the munition 701 to accelerate. The flow of the primary flow through the converging portion 726 and throat 728 can produce a Venturi effect, which can create a suction at the inlet 722. The flow of the primary flow through the converging portion 726 can produce a Venturi effect, which can create a suction at the inlet 722.

The increase in the velocity and decrease in pressure of the primary flow through the converging portion 726 and/or throat 728 can decrease a temperature of the primary flow such that thermal energy (e.g., heat) from the ambient environment outside the body of the Venturi device 710 is transferred to the primary flow. As the munition is propelled through a fluid, the Venturi device 710 can intake thermal energy and transfer the thermal energy to the primary flow to increase the thrust provided through the Venturi device 710. Additionally or alternatively, the absorbed thermal energy can be dissipated through the walls of the Venturi device 710 before the primary flow exits the exit nozzle 714. On the suction side, the intake of the primary flow, in combination with the Venturi effect, causes the primary flow to undergo cooling so that thermal energy is absorbed from the environment in the form of heat. Additionally or alternatively, a fluid, such as nitrogen, can be transferred from the pressured storage tank 718 through the channels 720 and inlet openings 732 to the side inlets 712 to further cool the primary flow through the Venturi device 710. The absorbed energy on the pressure side can cause the pressure to continue to increase. Regarding the Coandă effect, a surface of the annular chamber 738 can include a Coandă effect surface or profile that can facilitate the secondary flow of fluid spreading throughout the annular chamber 738. As mentioned herein, the Coandă effect is the tendency of a fluid to stay attached to a curved surface, particularly a convex surface.

A surface of the annular chamber 738 can be convex to facilitate the secondary flow of fluid spreading throughout the annular chamber 738. The secondary flow can adhere (e.g., molecular adhesion) to the surface(s) of the annular chamber 738 to spread throughout the annular chamber 738. The thruster system 700 can also reduce and/or minimize a heat signature of the munition 701 as the thruster system 700 of said munition 701 can use little to no combustion propulsions. This can further reduce the likelihood of detection by radar systems. Further, the application of the thruster system 700 can reduce the weight of the munition 701 improving flight time to a location and/or target. Additionally or alternative, the application of thruster system 700 can reduce the drag effect of the munition 701 during transit through the use of the Venturi device 710 and Coandă Effect, increasing the range of deployment and increasing the loitering time achievable by the vehicle.

The thruster system 700 can increase the impact velocity by a factor between 1 to 20, 1 to 15, 1 to 10, or 3 to 8 times without utilizing a combustible fuel source. Prior to impact, a fluid (e.g., nitrogen) can be transferred from the pressurized fuel storage 718 to the side inlets 712 of the Venturi device 710 to increase the thrust and velocity of the thrust system 700 by further pressuring the system. The thruster system 700 can thus evade detection on current radar systems by heat signature by using an inert gas, such as nitrogen, to further propel the munition 701 as the nitrogen cools the primary flow passing through the Venturi device 710. Additionally or alternatively, the use of an inert gas can reduce the likelihood of the munition 701 exploding prematurely. The thruster system 700 can also reduce the weight of a particular ordnance to accomplish bunker penetration as the combustible fuel may not be required. In some configurations, the thruster system 700 can reduce flight time to a target as the overall payload weight can be reduced. Additionally or alternatively, the thruster system 700 can improve the advanced fluid dynamic shape of the munition 701 to reduce drag in transit to a target via Venturi-Coandă effects enabled by transporting the munition. This can increase the range of the deployed aircraft as well as critical loitering time.

The output achieved by the thruster system 700 can produce much higher energy than a direct air inlet, thus enabling denser and higher velocity fluid flow exiting the thruster system. For example, the increase in pressure as the flow passes through the throat 728 of the Venturi device 710 and combines with a secondary flow from the side inlets 712 can increase with density and velocity of the incoming fluid as the fluid exits out of the exit nozzle 714.

Further, the output achieved by the thruster system 700 can create improved power production from the same and/or similar energy input. The increase in pressure and density can also provide improvements in efficiency. For example, the thruster system 700 can produce pressure and density outputs with higher energy values compared to initial velocity measurements without the thrust system 700 as the fluid undergoes a compression and expansion process in the Venturi device 710. In some configurations, the thruster system 700 can have an energy multiplier of six times the initially measured velocities in part because of the compression and expansion of the fluid through the Venturi device. Additionally or alternatively, noise levels can be reduced using the thruster system 700 as compared to conventional munitions because the thruster system 700 utilizes the Venturi device 710 to generate thrust instead of conventional munition combustion system.

The thruster system 700 can also provide a dynamic energy conversion in turbulent environments. A turbulent secondary flow coming through the one or more side inlets 712 can be organized by utilizing the Coanda effect to organize the molecular structure of the secondary fluid flow in the annular chamber 738 and ring gap 740 prior to the fluid combining with a primary flow and exiting the exit nozzle 714. The fluid organization can achieve, at a minimum, a 20-30 decibel reduction in noise as compared to an unassisted traditional ordnance. The thruster system 700 can also be applied to an unassisted laser guided ordnance by using a fuel cell to provide power for the laser guided system. The thruster system 700, in some configurations, can increase the velocity to target, reduce the overall weight and noise reduction. In some configurations, the system 700 can create a thrust vectoring ability to enhance the maneuverability of the munition 701 without any identifying heat signature. In some configurations, the thruster system 700 can be applied to navel munitions, creating a new naval torpedo jet thruster having improved efficiency and thrust vectoring maneuverability. The naval configuration with system 700 can increase the difficulty in detecting said torpedo.

Configurations of the thruster system 700 are shown in FIGS. 17 and 18. As the munition body 702 passes through a fluid, the fluid can travel along the munition body 702 to the transfer cone 704. The improvements in boundary layer dynamics can assist the fluid in forming a non-turbulent flow along the body 702. Additionally or alternatively, the improved boundary layer dynamics can guide the fluid along the body 702 and transfer cone 704 into the Venturi device 710. In some configurations, a perimeter of the transfer cone 704 can be outside the inlet 722 of the Venturi device 710. In some configurations, the the vertex of the transfer cone can be outside the inlet. In other configurations, the the the vertex of the transfer cone can be inside the inlet. The transfer cone 704 can allow the fluid to make a smooth transition from body 702 and transfer cone 704 into the Venturi device 710. In some configurations, the thruster system 700 can further include side inlets 712 on one or more sides of the Venturi device 710. Fluid separating from the munition body 702 and transfer cone 704 and surrounding fluid can flow into the side inlets 712 as the secondary flow of fluid. This can allow the pressure inside inlets 710 to increase which can be passed into the Venturi device 710 to create vortices therein. As a result, the vortices are formed in the Venturi devices 710. which generate a suction on the back of the Venturi devices 710.

FIGS. 19A-20D Illustrate configurations of the stealth ordinance munition system in FIGS. 17 and 18. The stealth ordinance munition system in FIGS. 17 and 18 can be an open system, which can draw in ambient air through the inlets 712 or a closed system in which the inlets 712 are fluidly connected to a nitrogen tank by one or more tubing, conduits, pipes, etc.

The Venturi device 710 of FIGS. 17 and 18 is shown schematically in FIG. 22A-22C. A fluid be introduced to the Venturi system from the front inlet 722 and from the side inlet 712 through conduit 736 via the annular chamber 738 and the secondary input 740 (e.g., ring gap) into the interior of the Venturi device 710. In the area of D of the Venturi device 710, a vortex may be formed. This vortex creates a vacuum at the inlet 722 (location F). As a result, the fluid can be sucked into the Venturi device 710 via the inlet 722 and the throat 728 (e.g., constriction). Since this air is compressed on the other side of the vortex (in direction C. the area of the pipe between B and E may be called a compression chamber. Ambient air and exhaust gases are fused at the position corresponding to B and are discharged out of the exit nozzle 714.

The diameter of the opening of the inlet 722 can be different depending on the size and shape of the munition body 702 and/or if a combustible system is present. When combustible systems are present, the size of the opening of the inlet 722 may be reduced. The inlet opening 722 can be sized and adjusted to accommodate mission parameters.

Further, as shown in FIG. 22C, the inlet 722 of fluid could be formed like velocity stack allowing smooth and even entry of air at high velocities. Resonance effects can be observed which promote the induction of the generation of the vortex. In addition, the inside wall of the Venturi device 710 can include a radius entry and/or "plenum." A velocity stack, trumpet, and/or air horn, can be a trumpet-shaped design having differing lengths which can be used at the inlet 712. These designs can allow smooth and even entry of air at high velocities with the flow stream adhering to the walls, known as laminar flow.

LIST OF EXAMPLE OF NUMBERED EMBODIMENTS

The following is a list of example numbered embodiments. The features recited in the below list of example embodiments can be combined with additional features disclosed herein. Furthermore, additional inventive combinations of features are disclosed herein, which are not specifically recited in the below list of example embodiments and which do not include the same features as the embodiments listed below. For the sake of brevity, the below list of example embodiments does not identify every inventive aspect of this disclosure. The below list of example embodiments is not intended to identify key features or essential features of any subject matter described herein.

1. A Venturi device, the Venturi device comprising:
   - an inlet configured to receive a primary flow of a fluid;
   - an outlet configured to eject the primary flow; and
   - a body disposed between the inlet and the outlet, the body comprising:
     - a body wall comprising a converging portion and a diverging portion, wherein a movement of the primary flow through the converging portion and the diverging portion produces a Venturi effect, pulling the primary flow in through the inlet;
     - a first funnel disposed at least partially in the converging portion, the first funnel extending from the body wall toward a central axis of the body, the first funnel forming a first annular space between the first funnel and the body wall, the first funnel configured to create a first low pressure fluid in the first annular space relative to a high pressure fluid flow of the primary flow flowing through the first funnel to pull the primary flow through the inlet and into the body, wherein reduction in the high pressure fluid flow of the primary flow through the first funnel causes the first low pressure fluid to at least partially exit the first annular space for the first low pressure fluid to flow toward the outlet;
     - a second funnel disposed at least partially in the diverging portion, the second funnel extending from the body wall toward the central axis of the body, the second funnel forming a second annular space between the second funnel and the body wall, the second funnel configured to create a second low pressure fluid in the second annular space relative to the high pressure fluid flow of the primary flow flowing through the second funnel to pull the primary flow through the inlet and into the body, wherein reduction in the high pressure fluid flow of the primary flow through the second funnel causes the second low pressure fluid to at least partially exit the second annular space for the second low pressure fluid to flow toward the outlet, wherein the second annular space is larger than the first annular space;
     - a secondary input disposed between the converging portion and the outlet, the secondary input configured to direct a secondary flow of the fluid into the primary flow to create a vortex, pulling the primary flow through the inlet and into the body; and
     - a conical interior surface disposed downstream of the secondary input relative to the primary flow of the fluid, the conical interior surface configured to direct the primary flow toward the outlet, the conical interior surface comprising a cross-sectional flow area that increases in size toward the outlet.

2. The Venturi device of example 1, wherein the cross-sectional flow area of the conical interior surface increases up to the outlet.

3. The Venturi device of any of example 1 or 2, wherein the conical interior surface is a first conical interior surface and further comprising a second conical interior surface disposed between the diverging portion and the first conical interior surface, the second conical interior surface configured to direct the primary flow toward the outlet, the second conical interior surface comprising a cross-sectional flow area that decreases in size toward the outlet.

4. The Venturi device of example 3, wherein the secondary input is configured to direct the secondary flow through the second conical interior surface.

5. The Venturi device of example 3 or 4, wherein the secondary input is configured to direct the secondary flow between the first conical interior surface and the second conical interior surface.

6. The Venturi device of any of examples 3 to 5, wherein the cross-sectional flow area of the second conical interior surface converges to a size that is smaller than a cross-sectional flow area of the converging portion and a cross-sectional flow area of the diverging portion.

7. The Venturi device of any of the preceding examples, wherein an axial extent of the first funnel is substantially equal to an axial extent of the converging portion along the central axis.

8. The Venturi device of any of the preceding examples, wherein an axial extent of the second funnel is less than an axial extent of the diverging portion along the central axis.

9. The Venturi device of example 8, wherein the axial extent of the second funnel is half the axial extent of the diverging portion along the central axis.

10. The Venturi device of any of the preceding examples, wherein the first funnel is connected to the body wall at the inlet.

11. The Venturi device of any of the preceding examples, wherein the second funnel is connected to the body wall between the converging portion and the diverging portion.

12. The Venturi device of any of the preceding examples, wherein the secondary input is configured to direct the secondary flow of the fluid into the primary flow at an angle relative to a direction of flow of the primary flow.

13. The Venturi device of example 12, wherein the angle is ninety degrees.

14. The Venturi device of example 12, wherein the angle is between 60 and 120 degrees.

15. The Venturi device of any of the preceding examples, wherein the secondary input comprises an annular passageway.

16. The Venturi device of any of the preceding examples, wherein the secondary input comprises one or more apertures.

17. The Venturi device of any of the preceding examples, wherein the secondary input comprises a plurality of apertures.

18. The Venturi device of any of the preceding examples, wherein the secondary input comprises an annular gap.

19. The Venturi device of any of the preceding examples, wherein the secondary input comprises a ring gap.

20. The Venturi device of any of the preceding examples, wherein the secondary input is configured to encircle the primary flow through the body.

21. The Venturi device of any of the preceding examples, wherein the secondary input is configured to circumferentially encircle the primary flow through the body.

22. The Venturi device of any of the preceding examples, wherein the secondary input comprises one or more openings circumferentially distributed about a flow path of the primary flow, the secondary input configured to direct the secondary flow radially inward toward the primary flow.

23. The Venturi device of any of the preceding examples, further comprising a throat disposed between the converging portion and the diverging portion, the throat comprising a diameter that is smaller than a diameter of the converging portion and a diameter of the diverging portion.

24. The Venturi device of any of the preceding examples, further comprising an annular chamber configured to receive and direct the secondary flow to the secondary input.

25. The Venturi device of example 24, wherein the annular chamber is configured to encircle the primary flow in the body.

26. The Venturi device of example 24 or 25, wherein the annular chamber comprises a Coanda surface configured to distribute incoming secondary flow throughout the annular chamber.

27. The Venturi device of any of examples 24 to 26, further comprising an annular passageway fluidly connected to the annular chamber, the annular passageway configured to direct the secondary flow from the annular passageway into the primary flow.

28. The Venturi device of any of the preceding examples, wherein the secondary input comprises a Coanda surface.

29. The Venturi device of any of the preceding examples, further comprising a plurality of secondary inputs.

30. The Venturi device of any of the preceding examples, wherein the secondary input is disposed downstream of the diverging portion.

31. The Venturi device of any of the preceding examples, wherein the converging portion comprises a cross-sectional flow area that continuously decreases in size in the direction of flow of the primary flow.

32. The Venturi device of any of the preceding examples, wherein the diverging portion comprises a cross-sectional flow area that continuously increases in size in the direction of flow of the primary flow.

33. The Venturi device of any of the preceding examples, wherein a length of the diverging portion is greater than a length of the converging portion.

34. The Venturi device of any of the preceding examples, wherein a cross-sectional flow area of the outlet is smaller than a cross-sectional flow area of the inlet.

35. The Venturi device of any of the preceding examples, wherein the converging portion is configured to increase a velocity of the primary flow and decrease a pressure of the primary flow, and wherein the diverging portion is configured to decrease the velocity of the primary flow and increase the pressure of the primary flow.

36. The Venturi device of any of the preceding examples, wherein the cross-sectional flow area of the converging portion is circular.

37. The Venturi device of any of the preceding examples, wherein the converging portion defines a flow area having a conical shape.

38. The Venturi device of any of the preceding examples, wherein the cross-sectional flow area of the diverging portion is circular.

39. The Venturi device of any of the preceding examples, wherein the diverging portion defines a flow area having a conical shape.

40. The Venturi device of any of the preceding examples, wherein a size of a cross-sectional flow area of the converging portion changes more rapidly than a size of a cross-sectional flow area of the diverging portion per a unit of length.

41. The Venturi device of any of the preceding examples, wherein a length of the diverging portion is greater than a length of the converging portion.

42. The Venturi device of any of the preceding examples, wherein a cross-sectional flow area of the first funnel continually decreases in size toward the central axis in the direction of flow of the primary fluid.

43. The Venturi device of any of the preceding examples, wherein a cross-sectional flow area of the second funnel continually decreases in size toward the central axis in the direction of flow of the primary fluid.

44. The Venturi device of any of the preceding examples, wherein a cross-sectional flow area at an exit of the first funnel is substantially the same as a cross-sectional flow area at an exit of the second funnel.

45. A Venturi device, the Venturi device comprising:
- an inlet configured to receive a primary flow of a fluid;
- an outlet configured to eject the primary flow; and
- a body disposed between the inlet and the outlet, the body comprising:
  - a body wall comprising a converging portion and a diverging portion, wherein a movement of the primary flow through the converging portion and the diverging portion produces a Venturi effect, pulling the primary flow in through the inlet;
  - a first funnel disposed at least partially in the converging portion, the first funnel extending from the body wall toward a central axis of the body, the first funnel forming a first annular space between the first funnel and the body wall, the first funnel configured to create a first low pressure fluid in the first annular space relative to a high pressure fluid flow of the primary flow flowing through the first funnel, wherein reduction in the high pressure fluid flow of the primary flow through the first funnel causes the first low pressure fluid to at least partially exit the first annular space for the first low pressure fluid to flow toward the outlet;

a second funnel disposed at least partially in the diverging portion, the second funnel extending from the body wall toward the central axis of the body, the second funnel forming a second annular space between the second funnel and the body wall, the second funnel configured to create a second low pressure fluid in the second annular space relative to the high pressure fluid flow of the primary flow flowing through the second funnel, wherein reduction in the high pressure fluid flow of the primary flow through the second funnel causes the second low pressure fluid to at least partially exit the second annular space for the second low pressure fluid to flow toward the outlet; and a secondary input disposed between the converging portion and the outlet, the secondary input configured to direct a secondary flow of the fluid into the primary flow to create a vortex, pulling the primary flow through the inlet and into the body.

46. The Venturi device of example 45, further comprising a conical interior surface disposed downstream of the secondary input relative to the primary flow of the fluid, the conical interior surface configured to direct the primary flow toward the outlet, the conical interior surface comprising a cross-sectional flow area that increases in size toward the outlet.

47. The Venturi device of example 45 or 46, wherein the second annular space is larger than the first annular space 48. The Venturi device of any of examples 45 to 47, further comprising any of the features recited in examples 1-44.

49. A Venturi device, the Venturi device comprising:

an inlet configured to receive a primary flow of a fluid;

an outlet configured to eject the primary flow; and a body disposed between the inlet and the outlet, the body comprising:

a body wall comprising a converging portion and a diverging portion, wherein a movement of the primary flow through the converging portion and the diverging portion produces a Venturi effect, pulling the primary flow in through the inlet;

a funnel extending from the body wall toward a central axis of the body, the funnel forming a space between the funnel and the body wall, the funnel configured to create a low pressure fluid in the space relative to a high pressure fluid flow of the primary flow flowing through the funnel, wherein reduction in the high pressure fluid flow of the primary flow through the funnel causes the low pressure fluid to at least partially exit the space for the low pressure fluid to flow toward the outlet; and a secondary input disposed between the converging portion and the outlet, the secondary input configured to direct a secondary flow of the fluid into the primary flow to create a vortex, pulling the primary flow through the inlet and into the body.

50. The Venturi device of example 49, wherein the funnel is disposed at least partially in the converging portion.

51. The Venturi device of example 49 or 50, further comprising an other funnel extending from the body wall toward the central axis of the body, the other funnel forming an other space between the other funnel and the body wall, the other funnel configured to create an other low pressure fluid in the other space relative to the high pressure fluid flow of the primary flow flowing through the other funnel, wherein reduction in the high pressure fluid flow of the primary flow through the other funnel causes the other low pressure fluid to at least partially exit the other space for the other low pressure fluid to flow toward the outlet.

52. The Venturi device of example 51, wherein the other funnel is disposed at least partially in the diverging portion.

53. The Venturi device of example 51 or 52, wherein the other space is annular.

54. The Venturi device of any of examples 49 to 53, wherein the space is annular.

55. The Venturi device of any of examples 49 to 54, further comprising any of the features recited in examples 1-44.

56. A particulate burner system for combustion of fuel emission byproducts, the system comprising:

a housing forming a combustion chamber, the housing comprising:

a bottom plate with a round bottom opening for burners configured to inject fuel into the combustion chamber;

a top plate with a round top opening for exhausting fuel emissions from the combustion chamber, the round bottom opening and the round top opening aligned along a central axis of the housing; and a round sidewall extending between the bottom plate and the top plate about the central axis and connected to the bottom plate and the top plate, the round sidewall comprising a sidewall opening for directing air into the combustion chamber, the round sidewall opening tangential to an inner periphery of the round sidewall to inject air into the combustion chamber tangential to the inner periphery of the round sidewall to centrifugally direct air in an airflow direction along the inner periphery of the round sidewall and entrain fuel from the round bottom opening into the air moving in the airflow direction along the inner periphery;

a deflection plate positioned in the combustion chamber and connected to at least one of the bottom plate or the top plate, the deflection plate axially extending along the central axis and extending along the round bottom opening, the deflection plate positioned between the round bottom opening and the sidewall opening to mitigate flow of fuel from the round bottom opening to the sidewall opening and to mitigate flow of air from the sidewall opening to the round bottom opening;

a plurality of fins positioned in the combustion chamber and connected to the bottom plate, the plurality of fins radially extending in the combustion chamber proximate from the round bottom opening toward the inner periphery of the round sidewall, wherein a first radial extent of a first fin of the plurality of fins from the central axis is less than a second radial extent of a last fin of the plurality of fins from the central axis, wherein a first axial extent of the first fin along the central axis is less than a second axial extent of the last fin along the central axis, wherein the first fin is positioned adjacent the deflection plate downstream of the deflection plate along the airflow direction, and wherein the last fin is positioned adjacent the deflection plate upstream of the deflection plate along the airflow direction, wherein the first radial extent of the first fin of the plurality of fins is less than the second radial extent of the last fin of the plurality of fins and the first axial extent of the first fin along the central axis is less than the second axial extent of the last fin along the central axis to allow air to flow from the sidewall opening to minimize backpressure by the first fin on flow of air from the sidewall opening, wherein radial extents of other fins of the plurality of fins are longer relative to the first radial extent of the first fin to direct fuel further toward the inner periphery of the round sidewall as the air moves in the airflow direction along the inner periphery and entrains fuel toward the inner periphery along the plurality of fins for combustion of fuel emission byproducts along the round sidewall; and:

a Venturi device in fluid communication with the sidewall opening, the Venturi device comprising:

an inlet configured to receive a primary flow comprising compressed air;

an outlet in fluid communication with the sidewall opening to direct the primary flow through the sidewall opening into the combustion chamber; and a body disposed between the inlet and the outlet, the body comprising:

a converging portion and a diverging portion, wherein a movement of the primary flow through the converging portion and the diverging portion produces a Venturi effect, pulling the primary flow in through the inlet; and a secondary input disposed between the converging portion and the outlet, the secondary input configured to direct a secondary flow of fluid into the primary flow to create a vortex for producing a suction at the inlet to pull the primary flow through the inlet and into the body to increase the primary flow through the outlet.

57. The system of example 56, wherein the first radial extent of the first fin of the plurality of fins is the shortest relative to other fins of the plurality of fins.

58. The system of example 56 or 57, wherein the second radial extent of the last fin of the plurality of fins is the longest relative to other fins of the plurality of fins.

59. The system of any of examples 56 to 58, wherein radial extents of the plurality of fins increase toward the inner periphery along the airflow direction to direct fuel further toward the inner periphery as the air moves in the airflow direction along the inner periphery and entrains fuel toward the inner periphery along the plurality of fins for combustion of fuel emission byproducts along the round sidewall.

60. The system of example 59, wherein the radial extents of the plurality of fins gradually increase toward the inner periphery along the airflow direction.

61. The system of any of examples 56 to 60, wherein radial extents of two or more first fins of the plurality of fins are the shortest relative to other fins of the plurality of fins, and wherein the two or more first fins comprise the first fin of the plurality of fins.

62. The system of any of examples 56 to 61, wherein radial extents of two or more last fins of the plurality of fins are the longest relative to other fins of the plurality of fins, and wherein the two or more last fins comprise the last fin of the plurality of fins.

63. The system of any of examples 56 to 62, wherein the first axial extent of the first fin of the plurality of fins is the shortest relative to other fins of the plurality of fins.

64. The system of any of examples 56 to 63, wherein the second axial extent of the last fin of the plurality of fins is the longest relative to other fins of the plurality of fins.

65. The system of any of examples 56 to 64, wherein axial extents of the plurality of fins increase toward the top plate along the airflow direction to direct fuel further toward the inner periphery as the air moves in the airflow direction along the inner periphery and entrains fuel along the plurality of fins for combustion of fuel emission byproducts along the inner periphery.

66. The system of example 65, wherein the axial extents of the plurality of fins gradually increase along the airflow direction toward the top plate.

67. The system of any of examples 56 to 66, wherein axial extents of two or more first fins of the plurality of fins are the shortest relative to other fins of the plurality of fins, and wherein the two or more first fins comprise the first fin of the plurality of fins.

68. The system of any of examples 56 to 67, wherein axial extents of two or more last fins of the plurality of fins are the longest relative to other fins of the plurality of fins, and wherein the two or more last fins comprise the last fin of the plurality of fins.

69. The system of example 56 or 57 and/or any of examples 63 to 68, wherein radial extents of the plurality of fins are the same toward the inner periphery after the first fin along the airflow direction to direct fuel toward the inner periphery as the air moves in the airflow direction along the inner periphery and entrains fuel toward the inner periphery along the plurality of fins for combustion of fuel emission byproducts along the round sidewall.

70. The system of any of examples 56 to 63, wherein axial extents of the plurality of fins are the same toward the top plate after the first fin along the airflow direction to direct fuel toward the inner periphery as the air moves in the airflow direction along the inner periphery and entrains fuel along the plurality of fins for combustion of fuel emission byproducts along the inner periphery.

71. The system of any of examples 56 to 70, wherein axial extents of other fins of the plurality of fins are longer relative to the first axial extent of the first fin to direct fuel toward the inner periphery of the sidewall as the air moves in the airflow direction along the inner periphery and entrains fuel toward the inner periphery along the plurality of fins for combustion of fuel emission byproducts along the sidewall.

72. The system of any of examples 56 to 71, wherein lines from the central axis along radial extents of the plurality of fins extend outside of a perimeter of the sidewall opening for each of the plurality of fins.

73. The system of any of examples 56 to 72, wherein the plurality of fins each comprise a curved shape, the curved shape curving in the airflow direction along the inner periphery.

74. The system of any of examples 56 to 73, wherein the plurality of fins each have a first thickness proximate the round bottom opening and a second thickness proximate inner periphery of the round sidewall, wherein the first thickness is greater than the second thickness.

75. The system of any of examples 56 to 74, wherein the plurality of fins each comprise an edge that is rounded, the edge proximate the round bottom opening relative to the inner periphery of the round sidewall.

76. The system of any of examples 56 to 75, wherein the plurality of fins comprise a Coanda surface configured to direct fuel from the round bottom opening along the Coanda surface toward the inner periphery of the round sidewall.

77. The system of any of examples 56 to 76, wherein the deflection plate is flat.

78. The system of any of examples 56 to 76, wherein the deflection plate is curved to follow at least one of a curvature of a periphery of the round bottom opening or a curvature of the inner periphery of the round sidewall.

79. The system of any of examples 56 to 78, wherein a perimeter of the deflection plate is at least partially within a perimeter of the sidewall opening when the perimeter of the deflection plate is radially projected along a path from the central axis to the perimeter of the sidewall opening.

80. The system of any of examples 56 to 79, wherein the secondary flow is directed from the primary flow into the secondary input of the Venturi device.

81. The system of any of examples 56 to 80, wherein the secondary flow is directed into the secondary input of the Venturi device from flow of fuel injected into the combustion chamber.

82. The system of any of examples 56 to 81, wherein the secondary flow comprises fuel injected into the secondary flow upstream of the secondary input.

83. The system of example 82, wherein fuel injected into the secondary flow is a same type of fuel as fuel injected into the combustion chamber.

84. The system of example 82, wherein fuel injected into the secondary flow is a different type of fuel from fuel injected into the combustion chamber.

85. The system of any of examples 56 to 84, further comprising a fuel ionizer in fluid communication with the secondary input upstream of the secondary input, the fuel ionizer comprising a disperser and a piezoelectric ring in contact with the disperser, the piezoelectric ring of the fuel ionizer configured to pass fuel through a ring opening of the piezoelectric ring of the fuel ionizer, the piezoelectric ring of the fuel ionizer configured to discharge an electrical discharge into fuel passing through the ring opening of the piezoelectric ring of the fuel ionizer.

86. The system of example 85, wherein the fuel ionizer comprises an other disperser and an other piezoelectric ring in contact with the other disperser, the other piezoelectric ring of the fuel ionizer configured to pass fuel through an other ring opening of an other piezoelectric ring of the fuel ionizer, the other piezoelectric ring of the fuel ionizer configured to discharge an electrical discharge into fuel passing through the other ring opening of the other piezoelectric ring of the fuel ionizer, the other disperser and the other piezoelectric ring downstream of the disperser and the piezoelectric ring with respect to a direction of fuel flow through the fuel ionizer, wherein the fuel ionizer further comprises a first mesh screen and a second mesh screen, the first mesh screen at the ring opening of the piezoelectric ring of the fuel ionizer, the second mesh screen at the other ring opening of the other piezoelectric ring of the fuel ionizer, wherein the first mesh screen comprises a first plurality of mesh openings through which fuel passes, and wherein the second mesh screen comprises a second plurality of mesh openings through which fuel passes, the first plurality of mesh openings having a cross-sectional flow area larger than a cross-section flow area of the second plurality of mesh openings such that flow of fuel through the first mesh screen and the second mesh screen creates a pressure difference between fuel flowing downstream of the first mesh screen and upstream of the second mesh screen and fuel flowing downstream of the second mesh screen to cause at least one of the piezoelectric ring or the other piezoelectric ring of the fuel ionizer to resonate and to discharge the electrical discharge into fuel flowing through the fuel ionizer, and wherein the fuel ionizer comprises a copper ring positioned between the piezoelectric ring and the other piezoelectric ring of the fuel ionizer, the copper ring configured to attenuate resonance between the piezoelectric ring and the other piezoelectric ring of the fuel ionizer.

87. The system of example 86, wherein the piezoelectric ring of the fuel ionizer comprises the first mesh screen.

88. The system of example 86 or 87, wherein the other piezoelectric ring of the fuel ionizer comprises the second mesh screen.

89. The system of any of examples 85 to 88, wherein fuel passing through the ring opening of the fuel ionizer is a gas.

90. The system of any of examples 85 to 89, wherein fuel passing through the ring opening of the fuel ionizer comprises ammonia ($NH_3$).

91. The system of any of examples 85 to 90, further comprising a fuel atomizer in fluid communication with the secondary input upstream of the secondary input, the fuel atomizer comprising a disperser and a piezoelectric ring in contact with the disperser, the disperser of the fuel atomizer configured to be resonated to resonate the piezoelectric ring of the fuel atomizer, the piezoelectric ring of the fuel atomizer configured to pass fuel through a ring opening of the piezoelectric ring of the fuel atomizer, the piezoelectric ring of the fuel atomizer configured to discharge an electrical discharge into fuel passing through the ring opening of the piezoelectric ring of the fuel atomizer.

92. The system of example 91, wherein fuel passing through the ring opening of the fuel atomizer is a liquid.

93. The system of example 91 or 92, wherein the fuel atomizer comprises a mesh screen, the mesh screen comprising a plurality of mesh openings through which fuel passes, the mesh screen at the ring opening of the piezoelectric ring of the fuel atomizer.

94. The system of example 93, wherein the piezoelectric ring of the fuel atomizer comprises the mesh screen.

95. The system of any of examples 85 to 94, further comprising a controller and an oscillator connected to the disperser of the fuel atomizer or ionizer, the oscillator configured to resonate the disperser of the fuel atomizer or ionizer, the controller configured to switch the oscillator between a low resonant frequency and a high resonant frequency, the low resonant frequency for cold-start conditions of the system and the high resonant frequency for hot operation conditions of the system.

96. The system of any of examples 85 to 95, wherein the inner periphery is configured to exert centrifugal forces on air directed from the sidewall opening for the air to travel around the combustion chamber circularly along the inner periphery of the round sidewall, creating a vortex vacuum that pulls fuel from the round bottom opening toward the inner periphery.

97. The system of any of examples 85 to 96, wherein a line extending from a perimeter of the sidewall opening along a central axis of the sidewall opening is tangential to the inner periphery of the round sidewall.

98. The system of any of examples 85 to 97, wherein the bottom plate comprise a vent port configured to direct air into the fuel entering through the round bottom opening.

99. The system of example 98, wherein the vent port is curved to extend about the central axis along a curvature of the round bottom opening.

100. The system of any of examples 85 to 99, wherein the plurality of fins are connected to a hub, the hub configured to connect to the bottom plate to connect the plurality of fins to the bottom plate.

101. The system of example 100100, wherein the bottom plate comprises a plurality of fastener openings for connecting the hub to the bottom plate.

102. The system of any of examples 85 to 101, wherein fuel entering through the round bottom opening is premixed with air upstream of the round bottom opening.

103. The system of any of examples 85 to 102, wherein the housing is connected to a flare stack for combusting volatile compounds into atmosphere.

104. The system of any of examples 85 to 103, wherein exhaust from the round top opening is directed to a heat engine to produce work.

105. The system of any of examples 85 to 104, further comprising a chute connected to the bottom plate, the chute configured to capture non-combustible particles from fuel combusted in the combustion chamber, the chute configured to direct the non-combustible particles from the bottom plate to a container for storing the non-combustible particles.

106. The system of example 105, wherein the bottom plate comprises a chute opening connected to the chute for directing the non-combustible particles from the combustion chamber to the chute.

107. The system of example 105 or 106, wherein the non-combustible particles comprise vanadium oxide.

108. The system of any of examples 85 to 107, further comprising a funnel connected to the top plate over the round top opening, the funnel configured to direct exhaust from the round top opening through the funnel, wherein the funnel is configured to facilitate retention of heat in the top plate from combustion of fuel for combustion of fuel emission byproducts along the top plate.

109. The system of example 108, wherein the funnel has a cross-sectional flow area that narrows in a direction of flow of exhaust from the round top opening.

110. A particulate burner for combustion of fuel emission byproducts, the particulate burner comprising:

- a housing forming a combustion chamber, the housing comprising:
  - a bottom plate with a round bottom opening for burners configured to inject fuel into the combustion chamber;
  - a top plate with a round top opening for exhausting fuel emissions from the combustion chamber, the round bottom opening and the round top opening aligned along a central axis of the housing; and
  - a round sidewall extending between the bottom plate and the top plate about the central axis and connected to the bottom plate and the top plate, the round sidewall comprising a sidewall opening for directing air into the combustion chamber, the round sidewall opening tangential to an inner periphery of the round sidewall to inject air into the combustion chamber tangential to the inner periphery of the round sidewall to centrifugally direct air in an airflow direction along the inner periphery of the round sidewall and entrain fuel from the round bottom opening into the air moving in the airflow direction along the inner periphery;
- a deflection plate positioned in the combustion chamber and connected to at least one of the bottom plate or the top plate, the deflection plate axially extending along the central axis and extending along the round bottom opening, the deflection plate positioned between the round bottom opening and the sidewall opening to mitigate flow of fuel from the round bottom opening to the sidewall opening and to mitigate flow of air from the sidewall opening to the round bottom opening; and
- a plurality of fins positioned in the combustion chamber and connected to the bottom plate, the plurality of fins radially extending in the combustion chamber proximate from the round bottom opening toward the inner periphery of the round sidewall, wherein a first radial extent of a first fin of the plurality of fins from the central axis is less than a second radial extent of a last fin of the plurality of fins from the central axis, wherein a first axial extent of the first fin along the central axis is less than a second axial extent of the last fin along the central axis, wherein the first fin is positioned adjacent the deflection plate downstream of the deflection plate along the airflow direction, and wherein the last fin is positioned adjacent the deflection plate upstream of the deflection plate along the airflow direction,
- wherein the first radial extent of the first fin of the plurality of fins is less than the second radial extent of the last fin of the plurality of fins and the first axial extent of the first fin along the central axis is less than the second axial extent of the last fin along the central axis to allow air to flow from the sidewall opening to minimize backpressure by the first fin on flow of air from the sidewall opening, and
- wherein radial extents of other fins of the plurality of fins are longer relative to the first radial extent of the first fin to direct fuel further toward the inner periphery of the round sidewall as the air moves in the airflow direction along the inner periphery and entrains fuel toward the inner periphery along the plurality of fins for combustion of fuel emission byproducts along the round sidewall.

111. The particulate burner of example 110, further comprising:

- a Venturi device in fluid communication with the sidewall opening, the Venturi device comprising:
  - an inlet configured to receive a primary flow comprising air;
  - an outlet in fluid communication with the sidewall opening to direct the primary flow through the sidewall opening into the combustion chamber; and
  - a body disposed between the inlet and the outlet, the body comprising:
    - a converging portion and a diverging portion, wherein a movement of the primary flow through the converging portion and the diverging portion produces a Venturi effect, pulling the primary flow in through the inlet; and
    - a secondary input disposed between the converging portion and the outlet, the secondary input configured to direct a secondary flow of fluid into the primary flow to create a vortex for producing a suction at the inlet to pull the primary flow through the inlet and into the body to increase the primary flow through the outlet.

112. The particulate burner of example 111, wherein the primary flow comprises compressed air.

113. The particulate burner of any of examples 110 to 112, further comprising any of the features recited in examples 56-109.

114. A fuel emission burner for combustion of fuel emission byproducts, the fuel emission burner comprising:

- a housing forming a combustion chamber, the housing comprising:
  - a first plate with a first plate opening for burners configured to inject fuel into the combustion chamber;

a second plate with a second plate opening for exhausting fuel emissions from the combustion chamber, the first plate opening and the second plate opening aligned along a central axis of the housing; and a sidewall extending between the first plate and the second plate about the central axis and connected to the first plate and the second plate, the sidewall comprising a sidewall opening for directing air into the combustion chamber, the sidewall opening tangential to an inner surface of the sidewall to inject air into the combustion chamber tangential to the inner surface of the sidewall to direct air in an airflow direction along the inner surface of the sidewall and entrain fuel from the first plate opening into the air moving in the airflow direction along the inner surface; and a plurality of fins positioned in the combustion chamber and connected to the first plate, the plurality of fins radially extending in the combustion chamber proximate from the first plate opening toward the inner surface of the sidewall, wherein a first radial extent of a first fin of the plurality of fins from the central axis is less than a second radial extent of a last fin of the plurality of fins from the central axis, wherein a first axial extent of the first fin along the central axis is less than a second axial extent of the last fin along the central axis, wherein the first fin is positioned downstream of the sidewall opening along the airflow direction, and wherein the last fin is positioned upstream of the sidewall opening along the airflow direction, wherein the first radial extent of the first fin of the plurality of fins is less than the second radial extent of the last fin of the plurality of fins and the first axial extent of the first fin along the central axis is less than the second axial extent of the last fin along the central axis to allow air to flow from the sidewall opening to minimize backpressure by the first fin on flow of air from the sidewall opening, and wherein radial extents of other fins of the plurality of fins are longer relative to the first radial extent of the first fin to direct fuel further toward the inner surface of the sidewall as the air moves in the airflow direction along the inner surface and entrains fuel toward the inner surface along the plurality of fins for combustion of fuel emission byproducts along the sidewall.

115. The fuel emission burner of example 114, further comprising a deflection plate positioned in the combustion chamber and connected to at least one of the first plate or the second plate, the deflection plate axially extending along the central axis and extending along the first plate opening, the deflection plate positioned between the first plate opening and the sidewall opening to mitigate flow of fuel from the first plate opening to the sidewall opening and to mitigate flow of air from the sidewall opening to the first plate opening.

116. The fuel emission burner of example 114 or 115, further comprising any of the features recited in examples 56-109.

117. A fuel burner for combustion of fuel emission byproducts, the fuel burner comprising:

a housing forming a combustion chamber, the housing comprising:

a first plate with a first plate opening for burners configured to inject fuel into the combustion chamber;

a second plate with a second plate opening for exhausting fuel emissions from the combustion chamber, the first plate opening and the second plate opening aligned along a central axis of the housing; and a sidewall extending between the first plate and the second plate about the central axis and connected to the first plate and the second plate, the sidewall comprising a sidewall opening for directing air into the combustion chamber, the sidewall opening tangential to an inner surface of the sidewall to inject air into the combustion chamber tangential to the inner surface of the sidewall to direct air in an airflow direction along the inner surface of the sidewall and entrain fuel from the first plate opening into the air moving in the airflow direction along the inner surface; and a plurality of fins connected to the first plate, the plurality of fins radially extending in the combustion chamber proximate from the first plate opening toward the inner surface of the sidewall, wherein the plurality of fins are configured to direct fuel toward the inner surface of the sidewall as the air moves in the airflow direction along the inner surface and entrains fuel toward the inner surface for combustion of fuel emission byproducts along the sidewall.

118. The fuel burner of example 117, wherein a first radial extent of a first fin of the plurality of fins from the central axis is less than a second radial extent of a last fin of the plurality of fins from the central axis, wherein the first fin is positioned downstream of the sidewall opening along the airflow direction, and wherein the last fin is positioned upstream of the sidewall opening along the airflow direction.

119. The fuel burner of example 118, wherein the first radial extent of the first fin of the plurality of fins is less than the second radial extent of the last fin of the plurality of fins to minimize backpressure by the first fin on flow of air from the sidewall opening.

120. The fuel burner of example 118 or 119, wherein radial extents of other fins of the plurality of fins are longer relative to the first radial extent of the first fin to direct fuel toward the inner surface of the sidewall as the air moves in the airflow direction along the inner surface and entrains fuel toward the inner surface along the plurality of fins for combustion of fuel emission byproducts along the sidewall.

121. The fuel burner of any of examples 117 to 120, wherein a first axial extent of a first fin along the central axis is less than a second axial extent of a last fin along the central axis, wherein the first fin is positioned downstream of the sidewall opening along the airflow direction, and wherein the last fin is positioned upstream of the sidewall opening along the airflow direction.

122. The fuel burner of example 121, wherein the first axial extent of the first fin along the central axis is less than the second axial extent of the last fin along the central axis to allow air to flow from the sidewall opening to minimize backpressure by the first fin on flow of air from the sidewall opening.

123. The fuel burner of any of examples 117 to 122, further comprising any of the features recited in examples 56-109.

124. A particulate burner system for burning fuel emission byproducts, the system comprising:

a housing forming a combustion chamber, the housing comprising:

a bottom plate with a round bottom opening for burners configured to inject fuel into the combustion chamber;

a top plate with a round top opening for exhausting fuel emissions from the combustion chamber, the bottom opening and the top opening aligned along a central axis of the housing; and a round sidewall extending between the bottom plate and the top plate about the central axis and connected to the bottom plate and the top plate, the round sidewall comprising a sidewall opening for directing air into the combustion chamber, the round sidewall opening tangential to an inner periphery of the round sidewall to inject air into the combustion chamber tangential to the inner periphery of the round sidewall to direct air in a direction along the inner periphery of the round sidewall and entrain fuel from the burners into the air moving in the direction along the inner periphery, a plurality of fins positioned within the combustion chamber, the plurality of fins connected to the bottom plate, the plurality of fins radially extending in the combustion chamber from the round bottom opening toward the inner periphery of the round sidewall, wherein radial extents of the plurality of fins increase toward the inner periphery along the direction along the inner periphery of the round sidewall, wherein a first radial extent of a first fin of the plurality of fins is shorter than a second radial extent of a last fin of the plurality of fins, wherein a first line along the first radial extent of the first fin radially extends within a perimeter of the sidewall opening, wherein a second line along the second radial extent of the last fin radially extends outside of the perimeter of the sidewall opening, wherein the first fin is adjacent the last fin, and wherein a first axial extent of the first fin along the central axis is shorter than a second axial extent of the last fin along the central axis, wherein the first radial extent of the first fin of the plurality of fins is shorter than the second radial extent of the last fin of the plurality of fins and the first axial extent of the first fin along the central axis is shorter than the second axial extent of the last fin along the central axis to allow air to flow from the sidewall opening to minimize backpressure on flow of air from the sidewall opening, wherein radial extents of the plurality of fins increase toward the inner periphery along the direction along the inner periphery of the round sidewall to direct fuel further toward the inner periphery as the air moves in the direction along the inner periphery and entrains fuel toward the inner periphery along the plurality of fins for combustion of fuel emission byproducts along the round sidewall; and a Venturi device in fluid communication with the sidewall opening, the Venturi device comprising:

an inlet configured to receive a primary flow comprising compressed air;

an outlet in fluid communication with the sidewall opening to direct the primary flow through the sidewall opening into the combustion chamber; and a body disposed between the inlet and the outlet, the body comprising:

a converging portion and a diverging portion, wherein a movement of the primary flow through the converging portion and the diverging portion produces a Venturi effect, pulling the primary flow in through the inlet; and a secondary input disposed between the converging portion and the outlet, the secondary input configured to direct a secondary flow of fluid into the primary flow to create a vortex for producing a suction at the inlet to pull the primary flow through the inlet and into the body to increase the primary flow through the outlet.

125. The system of example 124, wherein the first radial extent of the first fin of the plurality of fins is the shortest relative to other fins of the plurality of fins.

126. The system of example 124 or 125, wherein the second radial extent of the last fin of the plurality of fins is the longest relative to other fins of the plurality of fins.

127. The system of any of examples 124 to 126, wherein radial extents of two or more first fins of the plurality of fins is the shortest relative to other fins of the plurality of fins, wherein radial extents of two or more last fins of the plurality of fins is the longest relative to the other fins of the plurality of fins, wherein the two or more first fins comprise the first fin of the plurality of fins, and wherein the two or more first fins are adjacent the two or more last fins.

128. The system of any of examples 124 to 127, wherein the first axial extent of the first fin of the plurality of fins is the shortest relative to other fins of the plurality of fins, wherein the second axial extent of the last fin of the plurality of fins is the longest relative to the other fins of the plurality of fins.

129. The system of any of examples 124 to 128, wherein axial extents of two or more first fins of the plurality of fins is the shortest relative to other fins of the plurality of fins, wherein axial extents of two or more last fins of the plurality of fins is the longest relative to the other fins of the plurality of fins, wherein the two or more first fins comprise the first fin of the plurality of fins, and wherein the two or more first fins are adjacent the two or more last fins.

130. The system of any of examples 124 to 129, wherein radial extents of the plurality of fins gradually increase toward the inner periphery along the direction along the inner periphery of the round sidewall.

131. The system of any of examples 124 to 130, wherein axial extents of the plurality of fins gradually increase toward the top plate along the central axis.

132. The system of any of examples 124 to 131, wherein the plurality of fins each have a curved shape, the curved shape curving in the direction along the inner periphery.

133. The system of any of examples 124 to 132132, wherein the plurality of fins each have a first thickness proximate the round bottom opening and a second thickness proximate inner periphery of the round sidewall, wherein the first thickness is greater than the second thickness.

134. The system of any of examples 124 to 133, wherein the plurality of fins each an edge that is rounded, the edge proximate the round bottom opening relative to the inner periphery of the round sidewall.

135. The system of any of examples 124 to 134, wherein the secondary flow is directed from the primary flow into the secondary input.

136. The system of any of examples 124 to 135, wherein the secondary flow comprises additional fuel injected into the secondary flow upstream of the secondary input.

137. The system of any of examples 124 to 136, wherein the inner periphery is configured to exert centrifugal forces on air directed from the sidewall opening for air to travel around the combustion chamber circularly along the inner periphery of the round sidewall, creating a vacuum that pulls fuel from the round bottom opening toward the inner periphery along the plurality of fins.

138. The system of any of examples 124 to 137, wherein a line extending from the sidewall opening along a central axis of the sidewall opening is tangential to the inner periphery of the round sidewall.

139. The system of any of examples 124 to 138, further comprising any of the features recited in examples 56-109.

140. A thruster system to propel a munition for deep earth penetration, the system comprising:

a transfer cone connected to a munition body, the transfer cone configured to direct a primary flow of fluid along a surface of the transfer cone from a surface of the munition body;

a nitrogen storage tank in at least one of the transfer cone or the munition body, the nitrogen storage tank configured to store nitrogen;

a stabilizer fin connected to at least one of the transfer cone or the munition body, the stabilizer fin extending radially outward relative to at least one of the surface of the transfer cone or the surface of the munition body to stabilize the munition body, the stabilizer fin comprising one or more channels along the stabilizer fin, the one or more channels connected to the nitrogen storage tank to direct nitrogen from the nitrogen storage tank along an extent of the stabilizer fin; and a Venturi device disposed fluidly downstream of the transfer cone, the Venturi device comprising:

an inlet configured to receive the primary flow from the surface of the transfer cone, wherein a vertex of the transfer cone is directed toward the inlet;

an outlet configured to eject the primary flow; and a body disposed between the inlet and the outlet, the body comprising:

a converging portion and a diverging portion, wherein a movement of the primary flow through the converging portion and the diverging portion produces a Venturi effect, pulling the primary flow in through the inlet; and a secondary input disposed between the converging portion and the outlet, the secondary input configured to direct a secondary flow of fluid into the primary flow to create a vortex for producing a suction at the inlet to pull the primary flow through the inlet and into the body to increase the primary flow through the outlet to propel the munition for deep earth penetration, the secondary input in fluid communication with the one or more channels, wherein the secondary flow of fluid comprises nitrogen directed from the nitrogen storage tank to the secondary input through the one or more channels along the stabilizer fin to provide thrust to the munition.

141. The system of example 140, wherein the nitrogen storage tank is configured to store liquid nitrogen that phase changes into a gas for injection into the primary flow from the secondary input.

142. The system of example 140 or 141, wherein the secondary flow of fluid consists of nitrogen directed from the nitrogen storage tank to the secondary input through the one or more channels along the stabilizer fin without other fluids passing through the secondary input.

143. The system of any of examples 140 to 142, wherein the secondary input comprises one or more pipes fluidly connected to the one or more channels for the secondary input to be in closed fluid communication with the one or more channels.

144. The system of example 143, wherein the one or more pipes increase in cross-sectional flow area from the one or more channels in a direction of flow of the secondary fluid through the secondary input.

145. The system of any of examples 140 to 144, wherein the stabilizer fin extends along the body of the Venturi device axially to the secondary input to connect to the body of the Venturi device at the secondary input, the one or more channels fluidly connecting to the secondary input at the connection between the stabilizer fin and the body of the Venturi device.

146. The system of example 140 or 141, wherein the secondary flow comprises ambient air directed from a surface of the stabilizer fin into the secondary input.

147. The system of example 146, wherein the secondary input comprises one or more pipes extending from the body of the Venturi device to a trailing edge of the stabilizer fin, the one or more pipes each comprising an opening at the trailing edge of the stabilizer fin to draw ambient air into the one or more pipes to direct ambient air into the secondary input.

148. The system of example 147, wherein the one or more pipes of the secondary input each comprise a funnel at the trailing edge of the stabilizer fin, the funnel configured to draw in ambient air around the surface stabilizer fin into the one or more pipes, the funnel having a larger diameter than a diameter of the corresponding pipe of the secondary input.

149. The system of any of examples 140 to 148, wherein the one or more channels comprise one or more tubes extending along the extent of the stabilizer fin.

150. The system of example 149, wherein the one or more tubes are in the stabilizer fin.

151. The system of any of examples 140 to 150, wherein the one or more channels are in the stabilizer fin.

152. The system of any of examples 140 to 151, further comprising a valve on each of the one or more channels, the valve configured to control flow of the nitrogen from the nitrogen storage tank to the secondary input.

153. The system of any of examples 140 to 152, further comprising a valve on the secondary input, the valve configured to control flow of the secondary flow through the secondary input.

154. The system of any of examples 140 to 153, wherein controlling flow of the secondary flow through the secondary input controls thrust to the munition.

155. The system of any of examples 140 to 154, further comprising an other stabilizer fin connected to at least one of the transfer cone or the munition body, the other stabilizer fin extending radially outward relative to at least one of the surface of the transfer cone or the surface of the munition body to stabilize the munition body, the other stabilizer fin comprising one or more channels along the other stabilizer fin, the one or more channels of the other stabilizer fin connected to the nitrogen storage tank to direct nitrogen from the nitrogen storage tank along an extent of the other stabilizer fin, wherein the secondary flow of fluid comprises nitrogen directed from the nitrogen storage tank to the secondary input through the one or more channels of the other stabilizer fin along the other stabilizer fin to provide thrust to the munition.

156. The system of example 155, wherein the other stabilizer fin is positioned 180 degrees apart from the stabilizer fin about a central axis of the munition body.

157. The system of example 155 or 156, wherein reducing the secondary flow through the secondary input proximate the other stabilizer fin causes lower pressure in the Venturi device proximate the other stabilizer fin relative to pressure in the Venturi device proximate the stabilizer fin, causing fluid flow through the Venturi device to flow toward the other stabilizer fin to result in a greater fluid flow proximate the other stabilizer through the outlet to provide thrust to the munition in a direction of the stabilizer fin.

158. The system of any of examples 140 to 157, wherein reducing the secondary flow through the secondary input proximate the stabilizer fin causes lower pressure in the Venturi device proximate the stabilizer fin relative to pressure distal to the stabilizer fin, causing fluid flow through the Venturi device to flow toward the stabilizer fin to result in a greater fluid flow proximate the stabilizer fin through the outlet to provide thrust to the munition in a direction away from the stabilizer fin.

159. The system of any of examples 140 to 158, wherein a perimeter of the transfer cone is outside the inlet.

160. The system of any of examples 140 to 159, wherein the vertex of the transfer cone is outside the inlet.

161. The system of any of examples 140 to 159, wherein the vertex of the transfer cone is inside the inlet.

162. The system of any of examples 140 or 161, wherein the Venturi device is connected to the stabilizer fin.

163. The system of example 162, wherein the Venturi device is connected to at least one of the transfer cone or the munition body via the stabilizer fin.

164. The system of any of examples 140 to 163, wherein the secondary input is adjustable to regulate an input of the secondary flow into the primary flow to control thrust to the munition.

165. A thruster system to propel a munition, the system comprising:

- a cone connected to a munition body, the cone configured to direct a primary flow of fluid along a surface of the cone from a surface of the munition body;
- a storage tank in at least one of the cone or the munition body, the storage tank configured to store a propellant fluid;
- a fin connected to at least one of the cone or the munition body, the fin extending radially outward relative to at least one of the surface of the cone or the surface of the munition body to stabilize the munition body, the fin comprising one or more channels along the fin, the one or more channels connected to the storage tank to direct the propellant fluid from the storage tank along an extent of the fin; and
- a Venturi device disposed fluidly downstream of the cone, the Venturi device comprising:
  - an inlet configured to receive the primary flow from the surface of the cone;
  - an outlet configured to eject the primary flow; and
  - a body disposed between the inlet and the outlet, the body comprising:
    - a converging portion and a diverging portion, wherein a movement of the primary flow through the converging portion and the diverging portion produces a Venturi effect, pulling the primary flow in through the inlet; and
    - a secondary input disposed between the converging portion and the outlet, the secondary input configured to direct a secondary flow of fluid into the primary flow to create a vortex for producing a suction at the inlet to pull the primary flow through the inlet and into the body to increase the primary flow through the outlet to propel the munition for deep earth penetration, the secondary input in fluid communication with the one or more channels,
  - wherein the secondary flow of fluid comprises the propellant fluid directed from the storage tank to the secondary input through the one or more channels along the fin to provide thrust to the munition.

166. The system of example 165, wherein a vertex of the cone is directed toward the inlet.

167. The system of example 165 or 166, wherein the storage tank is pressurized.

168. The system of any of examples 165 to 167, wherein the propellant fluid is liquid or gas.

169. The system of any of examples 165 to 168, wherein the propellant fluid is nitrogen.

170. The system of any of examples 165 to 169, further comprising any of the features recited in examples 140-164.

171. A thruster system to propel a munition, the system comprising:

- a munition body;
- a fin connected to the munition body, the fin extending radially outward relative to a surface of the munition body to stabilize the munition body; and
- a Venturi device disposed fluidly downstream of the munition body, the Venturi device comprising:
  - an inlet configured to receive a primary flow;
  - an outlet configured to eject the primary flow; and
  - a body disposed between the inlet and the outlet, the body comprising:
    - a converging portion and a diverging portion, wherein a movement of the primary flow through the converging portion and the diverging portion produces a Venturi effect, pulling the primary flow in through the inlet; and
    - a secondary input disposed between the converging portion and the outlet, the secondary input configured to direct a secondary flow of fluid into the primary flow to create a vortex for producing a suction at the inlet to pull the primary flow through the inlet and into the body to increase the primary flow through the outlet to propel the munition for deep earth penetration,
  - wherein the secondary flow comprises ambient air directed into the secondary input.

172. The system of example 171, wherein the secondary flow comprises ambient air directed from a surface of the stabilizer fin into the secondary input.

173. The system of example 171 or 172, further comprising a storage tank in the munition body, the storage tank configured to store a propellant fluid.

174. The system of example 173, wherein the fin comprises one or more channels along the fin, the one or more channels connected to the storage tank to direct the propellant fluid from the storage tank along an extent of the fin, wherein the secondary flow of fluid comprises the propellant fluid directed from the storage tank to the secondary input through the one or more channels along the fin to provide thrust to the munition.

175. The system of any of examples 171 to 174, further comprising any of the features recited in examples 140-164.

176. The system of any of examples 56 to 109, further comprising any of the features recited in examples 1-55.

177. The particulate burner of any of examples 110 to 113, further comprising any of the features recited in examples 1-55.

178. The fuel emission burner of any of examples 114 to 116, further comprising any of the features recited in examples 1-55.

179. The fuel burner of any of examples 117 to 123, further comprising any of the features recited in examples 1-55.

180. The system of any of examples 124 to 139, further comprising any of the features recited in examples 1-55.

181. The system of any of examples 140 to 164, further comprising any of the features recited in examples 1-55.

182. The system of any of examples 165 to 170, further comprising any of the features recited in examples 1-55.

183. The system of any of examples 171 to 174, further comprising any of the features recited in examples 1-55.

Methods of using the system(s) (including device(s), apparatus(es), assembly (ies), structure(s), and/or the like) of the foregoing examples are included; the methods of use can include using or assembling any one or more of the features disclosed herein to achieve functions and/or features of the system(s) as discussed in this disclosure. Methods of manufacturing the foregoing system(s) disclosed herein are included; the methods of manufacture can include providing, making, connecting, assembling, and/or installing any one or more of the features of the system(s) disclosed herein to achieve functions and/or features of the system(s) as discussed in this disclosure.

Terminology

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could." "might." or "may," unless specifically stated otherwise, or otherwise understood within the context as used, is generally intended to convey that certain configurations include or do not include, certain features, elements, and/or steps. Thus, such conditional language is not generally intended to imply that features, elements, and/or steps are in any way required for one or more configurations.

Conjunctive language, such as the phrase "at least one of X, Y, and Z." unless specifically stated otherwise, is otherwise understood with the context as used in general to convey that an item, term, etc. may be either X, Y, or Z. Thus, such conjunctive language is not generally intended to imply that certain configurations require the presence of at least one of X, at least one of Y, and at least one of Z.

Some configurations have been described in connection with the accompanying drawings. Components can be added, removed, and/or rearranged. Orientation references such as, for example, "top" and "bottom" are for ease of discussion and may be rearranged such that top features are proximate the bottom and bottom features are proximate the top. Further, the disclosure herein of any particular feature, aspect, method, property, characteristic, quality, attribute, element, or the like in connection with various configurations can be used in all other configurations set forth herein. Additionally, it will be recognized that any methods described herein may be practiced using any device suitable for performing the recited steps.

In summary, various configurations and examples of energy converting devices and methods have been disclosed. Although the systems and methods have been disclosed in the context of those configurations and examples, it will be understood by those skilled in the art that this disclosure extends beyond the specifically disclosed configurations to other alternative configurations and/or other uses of the configurations, as well as to certain modifications and equivalents thereof. This disclosure expressly contemplates that various features and aspects of the disclosed configurations can be combined with, or substituted for. one another. Accordingly, the scope of this disclosure should not be limited by the particular disclosed configurations described above, but should be determined only by a fair reading of the claims that follow.

What is claimed is:

1. A Venturi device, the Venturi device comprising:

an inlet configured to receive a primary flow of a fluid;

an outlet configured to eject the primary flow; and a body disposed between the inlet and the outlet, the body comprising:

a body wall comprising a converging portion and a diverging portion, wherein a movement of the primary flow through the converging portion and the diverging portion produces a Venturi effect, pulling the primary flow in through the inlet;

a first funnel disposed at least partially in the converging portion, the first funnel extending from the body wall toward a central axis of the body, the first funnel forming a first annular space between the first funnel and the body wall, the first funnel configured to create a first low pressure fluid in the first annular space relative to a high pressure fluid flow of the primary flow flowing through the first funnel to pull the primary flow through the inlet and into the body, wherein reduction in the high pressure fluid flow of the primary flow through the first funnel causes the first low pressure fluid to at least partially exit the first annular space for the first low pressure fluid to flow toward the outlet;

a second funnel disposed at least partially in the diverging portion, the second funnel extending from the body wall toward the central axis of the body, the second funnel forming a second annular space between the second funnel and the body wall, the second funnel configured to create a second low pressure fluid in the second annular space relative to the high pressure fluid flow of the primary flow flowing through the second funnel to pull the primary flow through the inlet and into the body, wherein reduction in the high pressure fluid flow of the primary flow through the second funnel causes the second low pressure fluid to at least partially exit the second annular space for the second low pressure fluid to flow toward the outlet, wherein the second annular space is larger than the first annular space, wherein the body is sealed about the central axis between the inlet and an exit of the second funnel for the body to seal the first annular space and the second annular space about the central axis;

a secondary input disposed between the converging portion and the outlet, the secondary input configured to direct a secondary flow of the fluid into the primary flow to create a vortex, pulling the primary flow through the inlet and into the body; and a conical interior surface disposed downstream of the secondary input relative to the primary flow of the fluid, the conical interior surface configured to direct the primary flow toward the outlet, the conical interior surface comprising a cross-sectional flow area that increases in size toward the outlet.

2. The Venturi device of claim 1, wherein the conical interior surface is a first conical interior surface and further comprising a second conical interior surface disposed between the diverging portion and the first conical interior surface, the second conical interior surface configured to direct the primary flow toward the outlet, the second conical interior surface comprising a cross-sectional flow area that decreases in size toward the outlet.

3. The Venturi device of claim 2, wherein the secondary input comprises an opening into the second conical interior surface to direct the secondary flow through the second conical interior surface such that the secondary flow is directed into the primary flow in the second conical interior surface along the central axis.

4. The Venturi device of claim 2, wherein the secondary input comprises an opening into the second conical interior surface to direct the secondary flow between the first conical interior surface and the second conical interior surface such that the secondary flow is directed into the primary flow between the first conical interior surface and the second conical interior surface.

5. The Venturi device of claim 2, wherein the cross-sectional flow area of the second conical interior surface converges to a size that is smaller than a cross-sectional flow area of the converging portion and a cross-sectional flow area of the diverging portion.

6. The Venturi device of claim 1, wherein an axial extent of the first funnel from end to end is substantially equal to an axial extent of the converging portion along the central axis.

7. The Venturi device of claim 1, wherein an axial extent of the second funnel is less than an axial extent of the diverging portion along the central axis.

8. The Venturi device of claim 7, wherein the axial extent of the second funnel is half the axial extent of the diverging portion along the central axis.

9. The Venturi device of claim 1, wherein the first funnel is connected to the body wall at the inlet.

10. The Venturi device of claim 1, wherein the second funnel is connected to the body wall between the converging portion and the diverging portion.

11. The Venturi device of claim 1, wherein the secondary input is configured to direct the secondary flow of the fluid into the primary flow at an angle relative to a direction of flow of the primary flow.

12. The Venturi device of claim 1, wherein the secondary input is configured to encircle the primary flow through the body.

13. The Venturi device of claim 1, wherein the secondary input comprises two or more openings circumferentially distributed about a flow path of the primary flow, the secondary input configured to direct the secondary flow radially inward toward the primary flow.

14. The Venturi device of claim 1, wherein a cross-sectional flow area of the first funnel continually decreases in size toward the central axis in a direction of flow of the primary flow.

15. The Venturi device of claim 1, wherein a cross-sectional flow area of the second funnel continually decreases in size toward the central axis in a direction of flow of the primary flow.

16. The Venturi device of claim 1, wherein a cross-sectional flow area at an exit of the first funnel is substantially the same as a cross-sectional flow area at an exit of the second funnel.

17. The Venturi device of claim 1, wherein the converging portion and the diverging portion are formed from a monolithic material without openings along the central axis.

18. The Venturi device of claim 1, wherein at least one of the converging portion or the diverging portion is formed from a material without openings along the central axis.

19. A Venturi device, the Venturi device comprising:

an inlet configured to receive a primary flow of a fluid;

an outlet configured to eject the primary flow; and a body disposed between the inlet and the outlet, the body comprising:

a body wall comprising a converging portion and a diverging portion, wherein a movement of the primary flow through the converging portion and the diverging portion produces a Venturi effect, pulling the primary flow in through the inlet;

a first funnel disposed at least partially in the converging portion, the first funnel extending from the body wall toward a central axis of the body, the first funnel forming a first annular space between the first funnel and the body wall, the first funnel configured to create a first low pressure fluid in the first annular space relative to a high pressure fluid flow of the primary flow flowing through the first funnel, wherein reduction in the high pressure fluid flow of the primary flow through the first funnel causes the first low pressure fluid to at least partially exit the first annular space for the first low pressure fluid to flow toward the outlet;

a second funnel disposed at least partially in the diverging portion, the second funnel converging from the body wall toward the central axis of the body within the diverging portion along the central axis, the second funnel forming a second annular space between the second funnel and the body wall, the second funnel configured to create a second low pressure fluid in the second annular space relative to the high pressure fluid flow of the primary flow flowing through the second funnel, wherein reduction in the high pressure fluid flow of the primary flow through the second funnel causes the second low pressure fluid to at least partially exit the second annular space for the second low pressure fluid to flow toward the outlet, wherein an exit of the second funnel is at or upstream an end of the diverging portion along a direction of the primary flow; and a secondary input disposed between the converging portion and the outlet, the secondary input configured to direct a secondary flow of the fluid into the primary flow to create a vortex, pulling the primary flow through the inlet and into the body.

20. The Venturi device of claim 19, further comprising a conical interior surface disposed downstream of the secondary input relative to the primary flow of the fluid, the conical interior surface configured to direct the primary flow toward the outlet, the conical interior surface comprising a cross-sectional flow area that increases in size toward the outlet.

21. The Venturi device of claim 19, wherein an entrance of the second funnel coincides along the central axis with a connection portion of the body between the converging portion and the diverging portion with the second funnel extending from the body wall toward the central axis of the body at the entrance of the second funnel.

22. The Venturi device of claim 19, wherein an axial extent of the second funnel from end to end is within the diverging portion along the central axis.

23. A Venturi device, the Venturi device comprising:
an inlet configured to receive a primary flow of a fluid;
an outlet configured to eject the primary flow; and
a body disposed between the inlet and the outlet, the body comprising:
a body wall comprising a converging portion and a diverging portion, wherein a movement of the primary flow through the converging portion and the diverging portion produces a Venturi effect, pulling the primary flow in through the inlet;
a funnel extending from the body wall toward a central axis of the body, the funnel forming a space between the funnel and the body wall, the funnel configured to create a low pressure fluid in the space relative to a high pressure fluid flow of the primary flow flowing through the funnel, wherein reduction in the high pressure fluid flow of the primary flow through the funnel causes the low pressure fluid to at least partially exit the space for the low pressure fluid to flow toward the outlet,
wherein the body is sealed about the central axis between the inlet and an exit of the funnel for the body to seal the space about the central axis; and
a secondary input disposed between the converging portion and the outlet, the secondary input configured to direct a secondary flow of the fluid into the primary flow to create a vortex, pulling the primary flow through the inlet and into the body.

24. The Venturi device of claim 23, wherein the funnel is disposed at least partially in the converging portion.

25. The Venturi device of claim 23, further comprising an other funnel extending from the body wall toward the central axis of the body, the other funnel forming an other space between the other funnel and the body wall, the other funnel configured to create an other low pressure fluid in the other space relative to the high pressure fluid flow of the primary flow flowing through the other funnel, wherein reduction in the high pressure fluid flow of the primary flow through the other funnel causes the other low pressure fluid to at least partially exit the other space for the other low pressure fluid to flow toward the outlet.

26. The Venturi device of claim 25, wherein the other funnel is disposed at least partially in the diverging portion.

* * * * *